(12) United States Patent
Kuo

(10) Patent No.: US 12,032,225 B2
(45) Date of Patent: Jul. 9, 2024

(54) OPTICAL IMAGING LENS ASSEMBLY, IMAGE CAPTURING UNIT AND ELECTRONIC DEVICE

(71) Applicant: LARGAN PRECISION CO., LTD., Taichung (TW)

(72) Inventor: Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 595 days.

(21) Appl. No.: 17/244,606

(22) Filed: Apr. 29, 2021

(65) Prior Publication Data
US 2022/0326482 A1 Oct. 13, 2022

(30) Foreign Application Priority Data

Apr. 7, 2021 (TW) .................................. 110112564

(51) Int. Cl.
*G02B 9/64* (2006.01)
*G02B 1/04* (2006.01)
*G02B 3/04* (2006.01)
*G02B 13/18* (2006.01)

(52) U.S. Cl.
CPC .............. *G02B 9/64* (2013.01); *G02B 1/041* (2013.01); *G02B 3/04* (2013.01); *G02B 13/18* (2013.01)

(58) Field of Classification Search
CPC . G02B 9/64; G02B 1/041; G02B 3/04; G02B 13/18; G02B 13/0045; G02B 13/06
See application file for complete search history.

(56) References Cited

U.S. PATENT DOCUMENTS

| 2020/0012078 A1 | 1/2020 | Kuo |
| 2022/0026691 A1 | 1/2022 | Chang et al. |

(Continued)

FOREIGN PATENT DOCUMENTS

| CN | 111830676 A | | 10/2020 |
| CN | 211698392 U | * | 10/2020 |
| CN | 211698392 U | | 10/2020 |

(Continued)

OTHER PUBLICATIONS

Gross, "Handbook of Optical Systems ", 2007, Wiley-VCH, vol. 3, p. 377, Retrieved Jan. 30, 2024. (Year: 2007).*

(Continued)

*Primary Examiner* — Joseph P Martinez
*Assistant Examiner* — Ray Alexander Dean
(74) *Attorney, Agent, or Firm* — Maschoff Brennan

(57) ABSTRACT

An optical imaging lens assembly includes eight lens elements which are, in order from an object side to an image side along an optical path: a first lens element, a second lens element, a third lens element, a fourth lens element, a fifth lens element, a sixth lens element, a seventh lens element and an eighth lens element. The first lens element has an object-side surface being concave in a paraxial region thereof and having at least one inflection point in an off-axis region thereof. The seventh lens element has negative refractive power. The eighth lens element has an image-side surface being concave in a paraxial region thereof and having at least one inflection point in an off-axis region thereof. At least one lens surface of at least one of the second to seventh lens elements is aspheric.

12 Claims, 26 Drawing Sheets

(56) References Cited

U.S. PATENT DOCUMENTS

| | | |
|---|---|---|
| 2022/0214528 A1 | 7/2022 | Matsumura et al. |
| 2022/0221694 A1 | 7/2022 | Shobayashi et al. |

FOREIGN PATENT DOCUMENTS

| | | |
|---|---|---|
| CN | 212543902 U | 2/2021 |
| CN | 112698493 A | 4/2021 |
| CN | 112711122 A | 4/2021 |
| CN | 112748557 A | 5/2021 |
| CN | 214011616 U | 8/2021 |

OTHER PUBLICATIONS

Taiwan Office Action dated Nov. 30, 2021 as received in application No. 110112564.
1Chinese Office Action dated Mar. 30, 2023 as received in application No. 202110544462.X.

* cited by examiner

OPTICAL IMAGING LENS ASSEMBLY, IMAGE CAPTURING UNIT AND ELECTRONIC DEVICE

RELATED APPLICATIONS

This application claims priority to Taiwan Application 110112564, filed on Apr. 7, 2021, which is incorporated by reference herein in its entirety.

BACKGROUND

Technical Field

The present disclosure relates to an optical imaging lens assembly, an image capturing unit and an electronic device, more particularly to an optical imaging lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical imaging lens assembly includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The object-side surface of the first lens element is concave in a paraxial region thereof and has at least one inflection point in an off-axis region thereof. The seventh lens element has negative refractive power. The image-side surface of the eighth lens element is concave in a paraxial region thereof and has at least one inflection point in an off-axis region thereof. At least one of the object-side surface and the image-side surface of at least one of the second lens element, the third lens element, the fourth lens element, the fifth lens element, the sixth lens element and the seventh lens element is aspheric.

When an axial distance between the sixth lens element and the seventh lens element is T67, and an axial distance between the seventh lens element and the eighth lens element is T78, the following condition is satisfied:

$$1.0 < (T67+T78)/|T67-T78| < 6.0.$$

According to one aspect of the present disclosure, an optical imaging lens assembly includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The first lens element has negative refractive power. The object-side surface of the first lens element is concave in a paraxial region thereof and has at least one inflection point in an off-axis region thereof. The seventh lens element has negative refractive power. The image-side surface of the eighth lens element is concave in a paraxial region thereof and has at least one inflection point in an off-axis region thereof. At least one of the object-side surface and the image-side surface of at least one of the second lens element, the third lens element, the fourth lens element, the fifth lens element, the sixth lens element and the seventh lens element is aspheric.

When a central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, a central thickness of the seventh lens element is CT7, and a central thickness of the eighth lens element is CT8, the following condition is satisfied:

$$0 < (CT1+CT2+CT3+CT4+CT5+CT6)/(CT7+CT8) < 6.5.$$

According to one aspect of the present disclosure, an optical imaging lens assembly includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The object-side surface of the first lens element is concave in a paraxial region thereof and has at least one inflection point in an off-axis region thereof. The seventh lens element has negative refractive power. The image-side surface of the eighth lens element is concave in a paraxial region thereof and has at least one inflection point in an off-axis region thereof. At least one of the object-side surface and the image-side surface of at least one of the second lens element, the third lens element, the fourth lens element, the fifth lens element, the sixth lens element and the seventh lens element is aspheric.

When a focal length of the seventh lens element is f7, and a focal length of the eighth lens element is f8, the following condition is satisfied:

$$|f7/f8| < 1.7.$$

According to another aspect of the present disclosure, an image capturing unit includes one of the aforementioned optical imaging lens assemblies and an image sensor, wherein the image sensor is disposed on an image surface of the optical imaging lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An optical imaging lens assembly includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

Figure 23:
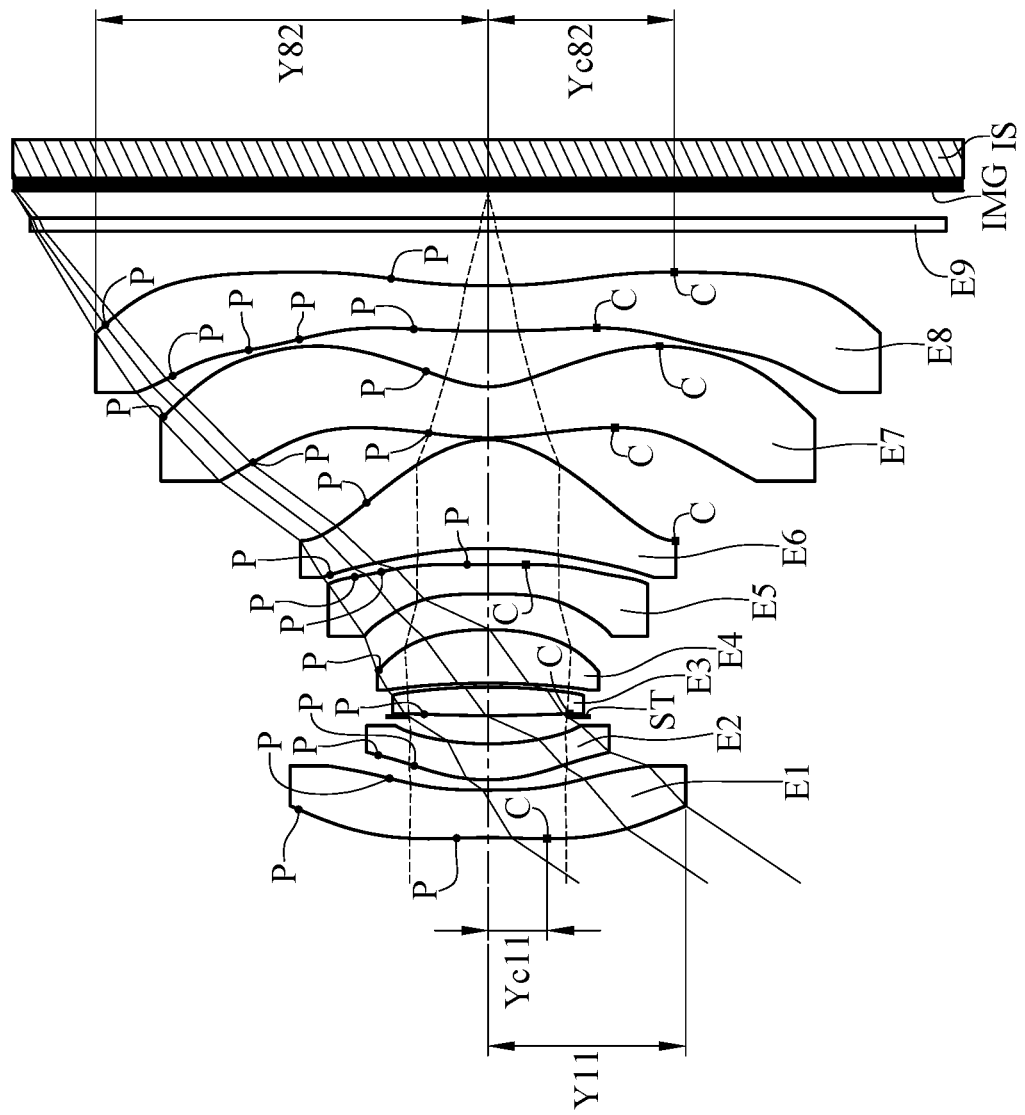
FIG. 23 shows a schematic view of Y11, Yc11, Y82, Yc82 and inflection points and critical points of lens elements according to the 1st embodiment of the present disclosure.

The first lens element can have negative refractive power. Therefore, it is favorable for adjusting the refractive power arrangement of the optical imaging lens assembly so as to enlarge the field of view. The object-side surface of the first lens element is concave in a paraxial region thereof. Therefore, it is favorable for adjusting the surface shape and refractive power of the first lens element so as to enlarge the field of view and reduce the object-side outer diameter of the optical imaging lens assembly. The object-side surface of the first lens element has at least one inflection point in an off-axis region thereof. Therefore, it is favorable for adjusting the surface shape of the first lens element so as to enlarge the field of view and reduce the outer diameter. Please refer to FIG. 23, which shows a schematic view of non-axial inflection points P of the lens elements according to the 1st embodiment of the present disclosure.

The object-side surface of the second lens element can be convex in a paraxial region thereof. Therefore, it is favorable for collaborating with the first lens element so as to reduce surface reflection. The image-side surface of the second lens element can be concave in a paraxial region thereof. Therefore, it is favorable for adjusting surface shape so as to correct aberrations such as astigmatism.

The image-side surface of the fourth lens element can be convex in a paraxial region thereof. Therefore, it is favorable for adjusting the travelling direction of light so as to balance the size distribution between the object side and image side of the optical imaging lens assembly.

The sixth lens element can have positive refractive power. Therefore, it is favorable for reducing the total track length of the optical imaging lens assembly. The image-side surface of the sixth lens element can be convex in a paraxial region thereof. Therefore, it is favorable for adjusting the travelling direction of light so as to enlarge the image surface of the optical imaging lens assembly.

The seventh lens element has negative refractive power. Therefore, it is favorable for balancing the refractive power distribution at the image side of the optical imaging lens assembly so as to correct aberrations such as spherical aberration.

The image-side surface of the eighth lens element is concave in a paraxial region thereof. Therefore, it is favorable for adjusting the surface shape of the eighth lens element so as to correct aberrations and adjust the back focal length of the optical imaging lens assembly. The image-side surface of the eighth lens element has at least one inflection point in an off-axis region thereof. Therefore, it is favorable for adjusting surface shape of the eighth lens element so as to correct off-axis aberrations such as field curvature.

At least one of the object-side surface and the image-side surface of at least one of the second lens element, the third lens element, the fourth lens element, the fifth lens element, the sixth lens element and the seventh lens element is aspheric. Therefore, aspheric lens surface(s) is favorable for correcting off-axis aberrations and reducing the size of lens element. Moreover, at least one of the second lens element, the third lens element, the fourth lens element, the fifth lens element, the sixth lens element and the seventh lens element can have at least one inflection point in an off-axis region thereof. Furthermore, at least one of the object-side surface and the image-side surface of the at least one lens element can have at least one inflection point in an off-axis region thereof. Therefore, it is favorable for increasing the shape variation of lens element so as to correct aberrations and reduce the size of the optical imaging lens assembly. Moreover, at least one of the object-side surface and the image-side surface of the seventh lens element can have at least one inflection point in an off-axis region thereof. Therefore, it is favorable for correcting off-axis aberrations and enlarging the image surface.

According to the present disclosure, at least one lens element of the optical imaging lens assembly can have at least one critical point in an off-axis region thereof. Furthermore, at least one of the object-side surface and the image-side surface of the at least one lens element can have at least one critical point in an off-axis region thereof. Therefore, it is favorable for increasing the shape variation of lens element so as to improve image quality, reduce the size and enlarge the field of view. Moreover, the object-side surface of the first lens element can have at least one convex critical point in the off-axis region thereof. Therefore, it is favorable for adjusting surface shape of the first lens element so as to obtain a wide-field-of-view configuration and maintain a compact size at the object side of the optical imaging lens assembly. Moreover, when a vertical distance between a critical point on the object-side surface of the first lens element and an optical axis is Yc11, and a maximum effective radius of the object-side surface of the first lens element is Y11, at least one convex critical point on the object-side surface of the first lens element in the off-axis region can satisfy the following condition: 0.10<Yc11/Y11<0.50. Therefore, it is favorable for adjusting surface shape of the first lens element so as to reduce the size. Moreover, the image-side surface of the eighth lens element can have at least one convex critical point in the off-axis region thereof. Therefore, it is favorable for adjusting the incident angle of light on the image surface so as to improve image quality at the peripheral region of the image surface. Moreover, when a vertical distance between a critical point on the image-side surface of the eighth lens element and the optical axis is Yc82, and a maximum effective radius of the image-side surface of the eighth lens element is Y82, at least one convex critical point on the image-side surface of the eighth lens element in the off-axis region can satisfy the following condition: 0.20≤Yc82/Y82<0.90. Therefore, it is favorable for adjusting surface shape of the eighth lens element so as to improve image quality. Please refer to FIG. 23, which shows a schematic view of Y11, Yc11, Y82 and Yc82 and non-axial critical points C of the first lens element E1, the third lens element E3, the fifth lens element E5, the sixth lens element E6, the seventh lens element E7 and the eighth lens element E8 according to the 1st embodiment of the present disclosure.

When an axial distance between the sixth lens element and the seventh lens element is T67, and an axial distance between the seventh lens element and the eighth lens element is T78, the following condition can be satisfied: 1.0<(T67+T78)/|T67−T78|<6.0. Therefore, it is favorable for adjusting the distribution of lens elements at the image side of the optical imaging lens assembly so as to reduce the size of the image side of the optical imaging lens assembly. Moreover, the following condition can also be satisfied: 1.0<(T67+T78)/|T67−T78|<4.5. Moreover, the following condition can also be satisfied: 1.0<(T67+T78)/|T67−T78|<3.0. Moreover, the following condition can also be satisfied: 1.0<(T67+T78)/|T67−T78|<1.5.

When a central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, a central thickness of the seventh lens element is CT7, and a central thickness of the eighth lens element is CT8, the following condition can be satisfied: 0<(CT1+CT2+CT3+CT4+CT5+CT6)/(CT7+CT8)<6.5. Therefore, it is favorable for adjusting the distribution of lens elements of the optical imaging lens assembly so as to adjust the size distribution and obtain a wide-field-of-view configuration. Moreover, the following condition can also be satisfied: 1.5<(CT1+CT2+CT3+CT4+CT5+CT6)/(CT7+CT8)<5.0. Moreover, the following condition can also be satisfied: 2.0<(CT1+CT2+CT3+CT4+CT5+CT6)/(CT7+CT8)<3.7.

When a focal length of the seventh lens element is f7, and a focal length of the eighth lens element is f8, the following condition can be satisfied: |f7/f8|<1.7. Therefore, it is favorable for the seventh and eighth lens elements to collaborate with each other so as to correct aberrations. Moreover, the following condition can also be satisfied: |f7/f8|<1.3. Moreover, the following condition can also be satisfied: |f7/f8|<0.90.

When an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, and an Abbe number of the eighth lens element is V8, the following condition can be satisfied: 1.2<(V1+V4+V6+V8)/(V2+V3+V5+V7)<3.2. Therefore, it is favorable for adjusting the material distribution of lens elements of the optical imaging lens assembly so as to correct aberrations such as chromatic aberration.

When an axial distance between the fourth lens element and the fifth lens element is T45, and an axial distance between the fifth lens element and the sixth lens element is T56, the following condition can be satisfied: 1.0<T45/T56<3.0. Therefore, it is favorable for the fourth, fifth and sixth lens elements to collaborate with one another so as to obtain a balance between the field of view and size distribution of the optical imaging lens assembly.

When a focal length of the optical imaging lens assembly is f, and an axial distance between the object-side surface of the first lens element and the image surface is TL, the following condition can be satisfied: 1.2<TL/f<4.5. Therefore, it is favorable for obtaining a balance between the total track length and the field of view. Moreover, the following condition can also be satisfied: 1.6<TL/f<3.5.

When the axial distance between the object-side surface of the first lens element and the image surface is TL, and an entrance pupil diameter of the optical imaging lens assembly is EPD, the following condition can be satisfied: 3.0<TL/EPD<6.5. Therefore, it is favorable for obtaining a balance between the total track length and the aperture size of the optical imaging lens assembly.

When the focal length of the optical imaging lens assembly is f, a focal length of the sixth lens element is f6, and the focal length of the seventh lens element is f7, the following condition can be satisfied: $1.4 < f/f6 - f/f7 < 4.0$. Therefore, it is favorable for the refractive power of the sixth lens element and that of the seventh lens element to collaborate with each other so as to correct aberrations.

When a focal length of the first lens element is f1, and the focal length of the seventh lens element is f7, the following condition can be satisfied: $0.78 \leq f1/f7 < 5.00$. Therefore, it is favorable for balancing the refractive power distribution between the object side and image side of the optical imaging lens assembly. Moreover, the following condition can also be satisfied: $1.10 < f1/f7 \leq 4.59$.

When the focal length of the optical imaging lens assembly is f, the focal length of the first lens element is f1, a focal length of the second lens element is f2, a focal length of the third lens element is f3, a focal length of the fourth lens element is f4, a focal length of the fifth lens element is f5, the focal length of the sixth lens element is f6, the focal length of the seventh lens element is f7, and the focal length of the eighth lens element is f8, at least one of the following conditions can be satisfied: $-0.90 < f/f1 < -0.10$; $-0.50 < f/f2 < 0.70$; $-1.0 < f/f3 < 1.0$; $-1.0 < f/f4 < 1.2$; $-0.80 < f/f5 < 0.80$; $0.70 < f/f6 < 2.4$; $-1.60 < f/f7 < -0.40$; and $-0.50 < f/f8 < 0.50$. Therefore, it is favorable for adjusting the refractive power distribution of the optical imaging lens assembly so as to enlarge the field of view and correct aberrations. Moreover, the following condition can also be satisfied: $-0.70 < f/f1 < -0.20$. Moreover, the following condition can also be satisfied: $-0.20 < f/f4 < 1.0$. Moreover, the following condition can also be satisfied: $0.91 \leq f/f6 < 2.1$.

When a curvature radius of the object-side surface of the first lens element is R1, and a curvature radius of the image-side surface of the eighth lens element is R16, the following condition can be satisfied: $-6.0 < R1/R16 < 0$. Therefore, it is favorable for adjusting surface shape of the first and eighth lens elements so as to reduce the size, enlarge the field of view and enlarge the image surface. Moreover, the following condition can also be satisfied: $-3.0 < R1/R16 < -0.10$. Moreover, the following condition can also be satisfied: $-1.0 < R1/R16 < -0.15$.

When a curvature radius of the image-side surface of the sixth lens element is R12, and the focal length of the optical imaging lens assembly is f, the following condition can be satisfied: $-1.8 < R12/f < -0.10$. Therefore, it is favorable for adjusting surface shape and refractive power of the sixth lens element so as to reduce the size. Moreover, the following condition can also be satisfied: $-0.55 < R12/f < -0.15$.

When the axial distance between the fourth lens element and the fifth lens element is T45, the axial distance between the fifth lens element and the sixth lens element is T56, and the central thickness of the fifth lens element is CT5, the following condition can be satisfied: $0.25 < (T45+T56)/CT5 < 5.0$. Therefore, it is favorable for adjusting position of the fifth lens element in the optical imaging lens assembly so as to balance the size distribution between the object side and image side of the optical imaging lens assembly. Moreover, the following condition can also be satisfied: $0.75 < (T45+T56)/CT5 < 3.5$. Moreover, the following condition can also be satisfied: $1.1 < (T45+T56)/CT5 < 2.5$.

When the focal length of the first lens element is f1, and the central thickness of the first lens element is CT1, the following condition can be satisfied: $-50 < f1/CT1 < -5.0$. Therefore, it is favorable for adjusting surface shape and refractive power of the first lens element so as to enlarge the field of view and reduce the size of the first lens element. Moreover, the following condition can also be satisfied: $-40 < f1/CT1 < -7.5$.

When the focal length of the seventh lens element is f7, and the central thickness of the seventh lens element is CT7, the following condition can be satisfied: $-12.34 \leq f7/CT7 < -2.00$. Therefore, it is favorable for adjusting surface shape and refractive power of the seventh lens element so as to correct aberrations.

When the focal length of the optical imaging lens assembly is f, and a composite focal length of the first lens element and the second lens element is f12, the following condition can be satisfied: $f12/f < -1.5$. Therefore, it is favorable for adjusting the refractive power at the object side of the optical imaging lens assembly so as to enlarge the field of view. Moreover, the following condition can also be satisfied: $f12/f < -2.5$.

When a curvature radius of the object-side surface of the second lens element is R3, a curvature radius of the image-side surface of the second lens element is R4, and the focal length of the optical imaging lens assembly is f, the following condition can be satisfied: $0.50 < R3/f + R4/f < 2.4$. Therefore, it is favorable for adjusting surface shape and refractive power of the second lens element so as to reduce the size of the object side of the optical imaging lens assembly. Moreover, the following condition can also be satisfied: $1.0 < R3/f + R4/f < 2.0$.

When a curvature radius of the image-side surface of the fourth lens element is R8, and the focal length of the optical imaging lens assembly is f, the following condition can be satisfied: $-3.5 < R8/f < -0.50$. Therefore, it is favorable for adjusting surface shape and refractive power of the fourth lens element so as to obtain a balance between the requirements on the field of view and the size distribution of the optical imaging lens assembly.

When the axial distance between the object-side surface of the first lens element and the image surface is TL, and a maximum image height of the optical imaging lens assembly (which can be half of a diagonal length of an effective photosensitive area of an image sensor) is ImgH, the following condition can be satisfied: $1.0 < TL/ImgH < 2.0$. Therefore, it is favorable for obtaining a balance between the total track length and the image surface size.

When half of a maximum field of view of the optical imaging lens assembly is HFOV, the following condition can be satisfied: $45.0$ degrees $<$ HFOV $< 85.0$ degrees. Therefore, it is favorable for obtaining a wide-field-of-view configuration and also preventing aberrations, such as distortion, generated due to overly large field of view. Moreover, the following condition can also be satisfied: $50.0$ degrees $<$ HFOV $< 80.0$ degrees.

When the Abbe number of the first lens element is V1, the Abbe number of the second lens element is V2, the Abbe number of the third lens element is V3, the Abbe number of the fourth lens element is V4, the Abbe number of the fifth lens element is V5, the Abbe number of the sixth lens element is V6, the Abbe number of the seventh lens element is V7, the Abbe number of the eighth lens element is V8, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the i-th lens element is Ni, and a minimum value of Vi/Ni is min(Vi/Ni), the following condition can be satisfied: $8.50<\min(Vi/Ni)<12.5$, wherein i=1, 2, 3, 4, 5, 6, 7 or 8. Therefore, it is favorable for adjusting the material distribution of lens elements of the optical imaging lens assembly so as to reduce the size and correct aberrations.

When an f-number of the optical imaging lens assembly is Fno, the following condition can be satisfied: $1.0<Fno<3.0$. Therefore, it is favorable for obtaining a balance between the requirements on the illuminance and depth of field. Moreover, the following condition can also be satisfied: $1.5<Fno<2.5$.

When the maximum effective radius of the object-side surface of the first lens element is Y11, and the maximum effective radius of the image-side surface of the eighth lens element is Y82, the following condition can be satisfied: $0.35<Y11/Y82<1.0$. Therefore, it is favorable for adjusting the travelling direction of light so as to obtain a balance among the field of view, size and image quality.

When the focal length of the optical imaging lens assembly is f, the focal length of the third lens element is f3, the focal length of the fourth lens element is f4, and the focal length of the fifth lens element is f5, the following condition can be satisfied: $0.25<f/f3+f/f4+f/f5<1.0$. Therefore, it is favorable for the third, fourth and fifth lens elements to collaborate with one another so as to correct aberrations.

When the focal length of the optical imaging lens assembly is f, the focal length of the sixth lens element is f6, the focal length of the seventh lens element is f7, and the focal length of the eighth lens element is f8, the following condition can be satisfied: $0.25<f/f6+f/f7+f/f8<0.90$. Therefore, it is favorable for adjusting the refractive power distribution at the image side of the optical imaging lens assembly so as to reduce the size.

When the central thickness of the second lens element is CT2, the central thickness of the third lens element is CT3, and the central thickness of the fourth lens element is CT4, the following condition can be satisfied: $0.75<(CT2+CT4)/CT3<7.0$. Therefore, it is favorable for the second, third and fourth lens elements to collaborate with one another so as to obtain a wide-field-of-view configuration. Moreover, the following condition can also be satisfied: $1.2<(CT2+CT4)/CT3<6.5$.

When an axial distance between the first lens element and the second lens element is T12, an axial distance between the second lens element and the third lens element is T23, and an axial distance between the third lens element and the fourth lens element is T34, the following condition can be satisfied: $0.30<(T12+T34)/T23<3.5$. Therefore, it is favorable for adjusting the distribution of lens elements at the object side of the optical imaging lens assembly so as to reduce the size of the object side of the optical imaging lens assembly.

When the focal length of the optical imaging lens assembly is f, a curvature radius of the object-side surface of the seventh lens element is R13, and a curvature radius of the image-side surface of the seventh lens element is R14, the following condition can be satisfied: $4.51 \leq f/|R13|+f/|R14|<8.00$. Therefore, it is favorable for adjusting surface shape and refractive power of the seventh lens element so as to improve the image quality.

According to the present disclosure, the aforementioned features and conditions can be utilized in numerous combinations so as to achieve corresponding effects.

According to the present disclosure, the lens elements of the optical imaging lens assembly can be made of either glass or plastic material. When the lens elements are made of glass material, the refractive power distribution of the optical imaging lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the optical imaging lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the optical imaging lens assembly, based on the corresponding image sensor, can be flat or curved, especially a curved surface being concave facing towards the object side of the optical imaging lens assembly.

According to the present disclosure, an image correction unit, such as a field flattener, can be optionally disposed between the lens element closest to the image side of the optical imaging lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 24:
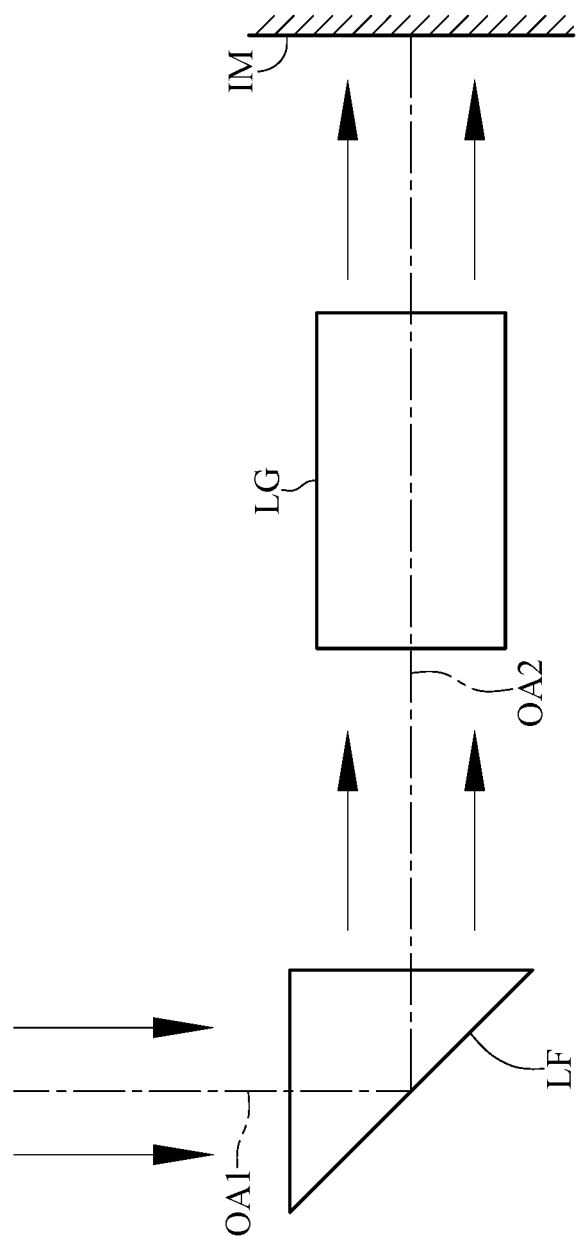
FIG. 24 shows a schematic view of a configuration of a light-folding element in an optical imaging lens assembly according to one embodiment of the present disclosure.
Figure 25:
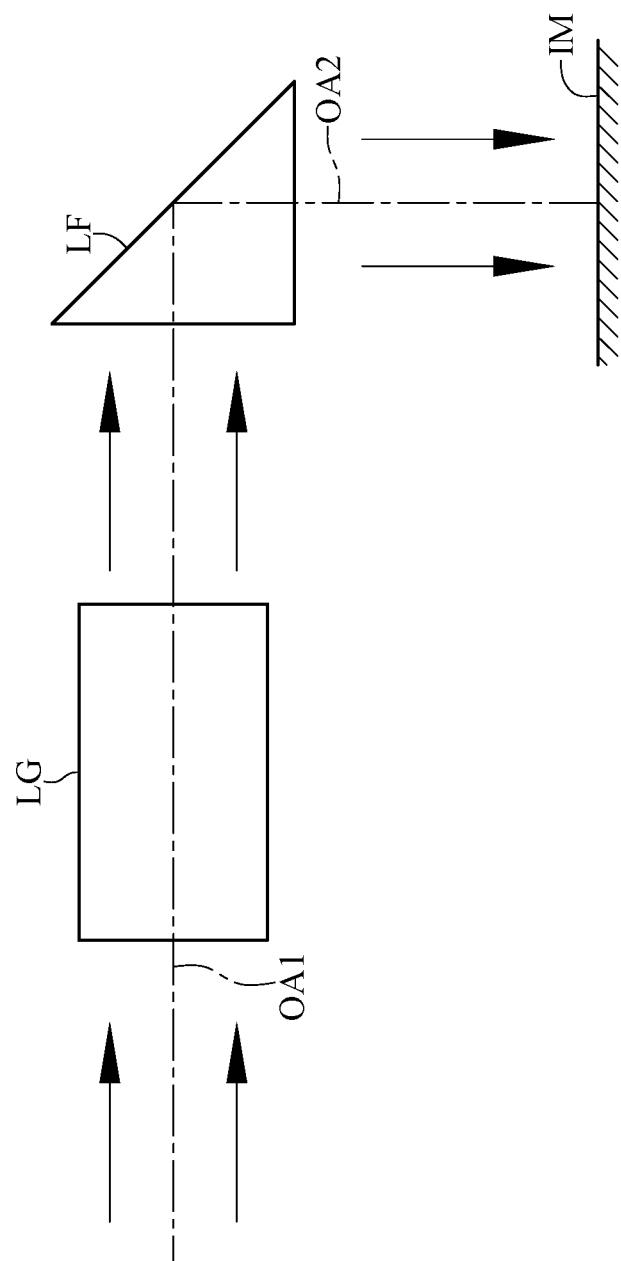
FIG. 25 shows a schematic view of another configuration of a light-folding element in an optical imaging lens assembly according to one embodiment of the present disclosure.
Figure 26:
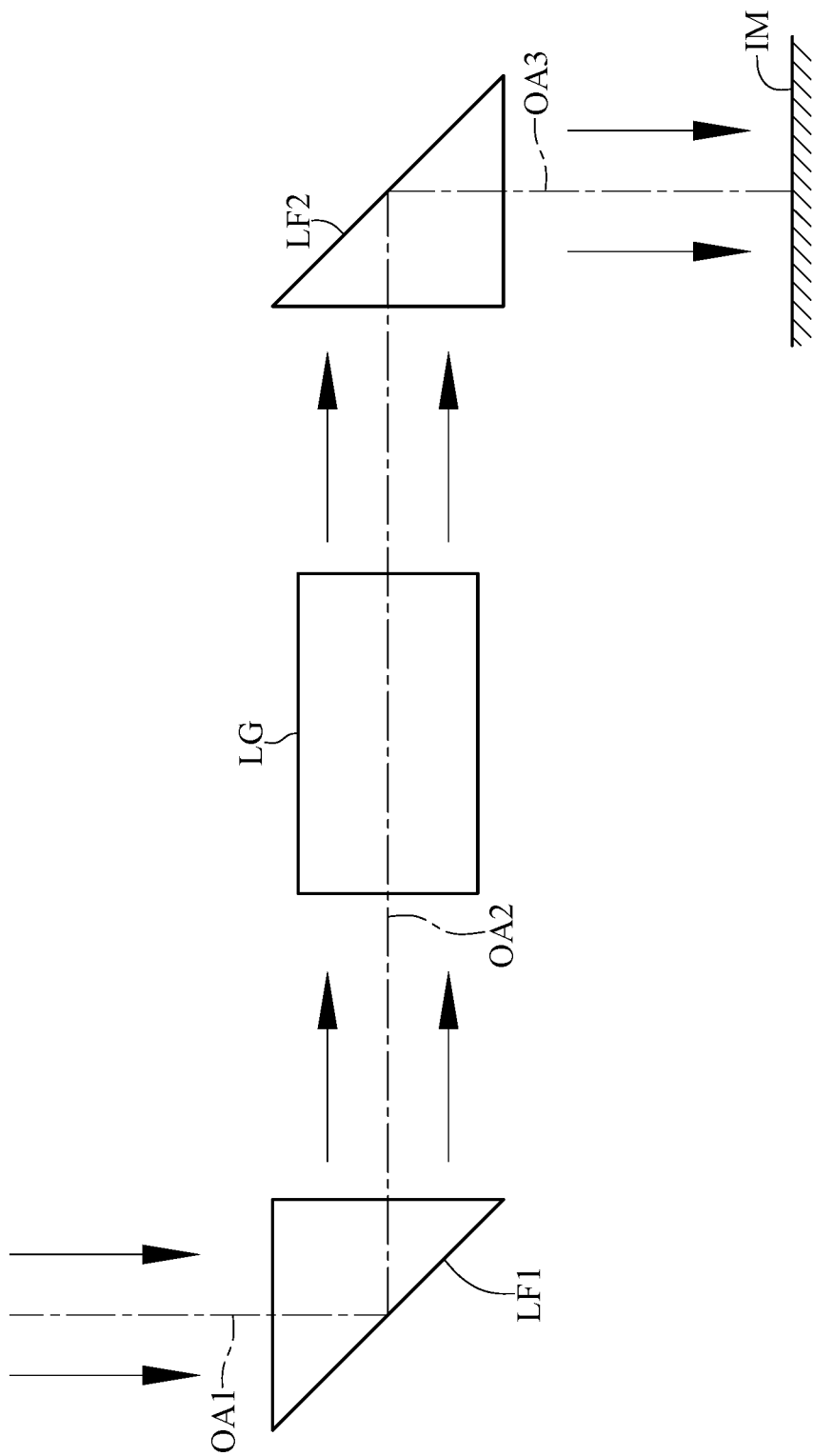
FIG. 26 shows a schematic view of a configuration of two light-folding elements in an optical imaging lens assembly according to one embodiment of the present disclosure.

According to the present disclosure, at least one light-folding element, such as a prism or a mirror, can be optionally disposed between an imaged object and the image surface on the imaging optical path, such that the optical imaging lens assembly can be more flexible in space arrangement, and therefore the dimensions of an electronic device is not restricted by the total track length of the optical imaging lens assembly. Specifically, please refer to FIG. 24 and FIG. 25. FIG. 24 shows a schematic view of a configuration of a light-folding element in an optical imaging lens assembly according to one embodiment of the present disclosure, and FIG. 25 shows a schematic view of another configuration of a light-folding element in an optical imaging lens assembly according to one embodiment of the present disclosure. In FIG. 24 and FIG. 25, the optical imaging lens assembly can have, in order from an imaged object (not shown in the figures) to an image surface IM along an optical path, a first optical axis OA1, a light-folding element LF and a second optical axis OA2. The light-folding element LF can be disposed between the imaged object and a lens group LG of the optical imaging lens assembly as shown in FIG. 24 or disposed between a lens group LG of the optical imaging lens assembly and the image surface IM as shown in FIG. 25. Furthermore, please refer to FIG. 26, which shows a schematic view of a configuration of two light-folding elements in an optical imaging lens assembly according to one embodiment of the present disclosure. In FIG. 26, the optical imaging lens assembly can have, in order from an imaged object (not shown in the figure) to an image surface IM along an optical path, a first optical axis OA1, a first light-folding element LF1, a second optical axis OA2, a second light-folding element LF2 and a third optical axis OA3. The first light-folding element LF1 is disposed between the imaged object and a lens group LG of the optical imaging lens assembly, the second light-folding element LF2 is disposed between the lens group LG of the optical imaging lens assembly and the image surface IM. The optical imaging lens assembly can be optionally provided with three or more light-folding elements, and the present disclosure is not limited to the type, amount and position of the light-folding elements of the embodiments disclosed in the aforementioned figures.

According to the present disclosure, the optical imaging lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical imaging lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical imaging lens assembly and thereby provides a wider field of view for the same.

According to the present disclosure, the optical imaging lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
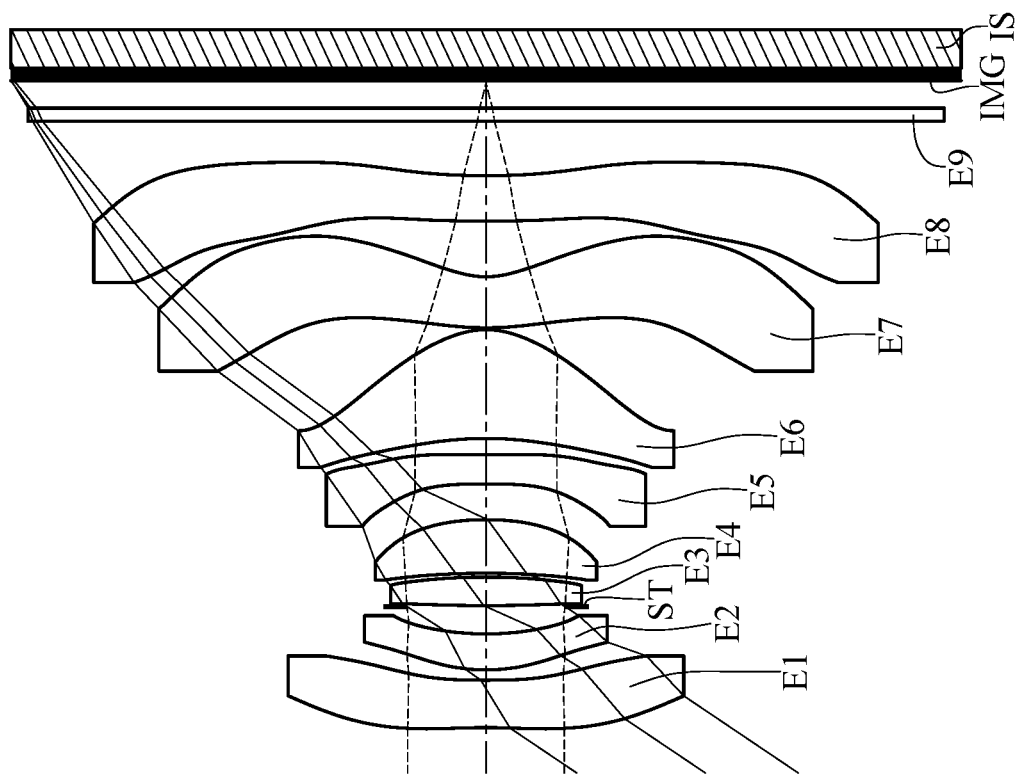
FIG. 1 is a schematic view of an image capturing unit according to the 1st embodiment of the present disclosure.
Figure 2:
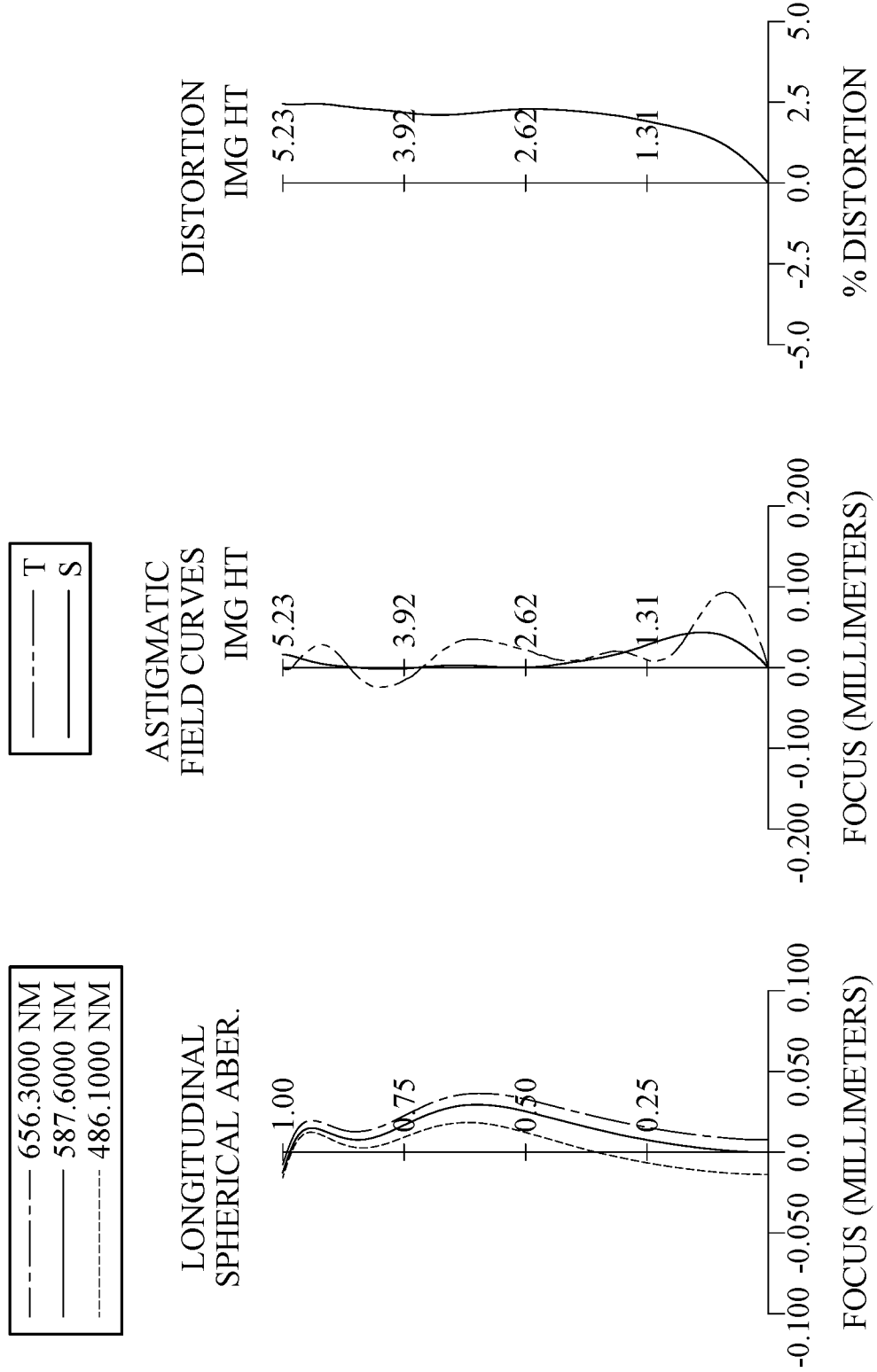
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the optical imaging lens assembly (its reference numeral is omitted) of the present disclosure and an image sensor IS. The optical imaging lens assembly includes, in order from an object side to an image side along an optical axis, a first lens element E1, a second lens element E2, an aperture stop ST, a third lens element E3, a fourth lens element E4, a fifth lens element E5, a sixth lens element E6, a seventh lens element E7, an eighth lens element E8, a filter E9 and an image surface IMG. The optical imaging lens assembly includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points in an off-axis region thereof. The image-side surface of the first lens element E1 has one inflection point in an off-axis region thereof. The object-side surface of the first lens element E1 has one critical point in the off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points in an off-axis region thereof.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has one inflection point in an off-axis region thereof. The object-side surface of the third lens element E3 has one critical point in the off-axis region thereof.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The image-side surface of the fourth lens element E4 has one inflection point in an off-axis region thereof.

The fifth lens element E5 with negative refractive power has an object-side surface being concave in a paraxial region thereof and an image-side surface being concave in a paraxial region thereof. The fifth lens element E5 is made of plastic material and has the object-side surface and the image-side surface being both aspheric. The image-side surface of the fifth lens element E5 has three inflection points in an off-axis region thereof. The image-side surface of the fifth lens element E5 has one critical point in the off-axis region thereof.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point in an off-axis region thereof. The image-side surface of the sixth lens element E6 has one inflection point in an off-axis region thereof. The image-side surface of the sixth lens element E6 has one critical point in the off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has two inflection points in an off-axis region thereof. The image-side surface of the seventh lens element E7 has two inflection points in an off-axis region thereof. The object-side surface of the seventh lens element E7 has one critical point in the off-axis region thereof. The image-side surface of the seventh lens element E7 has one critical point in the off-axis region thereof.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has four inflection points in an off-axis region thereof. The image-side surface of the eighth lens element E8 has two inflection points in an off-axis region thereof. The object-side surface of the eighth lens element E8 has one critical point in the off-axis region thereof. The image-side surface of the eighth lens element E8 has one critical point in the off-axis region thereof.

The filter E9 is made of glass material and located between the eighth lens element E8 and the image surface IMG, and will not affect the focal length of the optical imaging lens assembly. The image sensor IS is disposed on or near the image surface IMG of the optical imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,
X is the displacement in parallel with an optical axis from an axial vertex on the aspheric surface to a point at a distance of Y from the optical axis on the aspheric surface;
Y is the vertical distance from the point on the aspheric surface to the optical axis;
R is the curvature radius;
k is the conic coefficient; and
Ai is the i-th aspheric coefficient, and in the embodiments, i may be, but is not limited to, 4, 6, 8, 10, 12, 14, 16, 18, 20, 22 and 24.

In the optical imaging lens assembly of the image capturing unit according to the 1st embodiment, when a focal length of the optical imaging lens assembly is f, an f-number of the optical imaging lens assembly is Fno, and half of a maximum field of view of the optical imaging lens assembly is HFOV, these parameters have the following values: f=3.43 millimeters (mm), Fno=1.99, HFOV=56.0 degrees (deg.).

When an Abbe number of the first lens element E1 is V1, an Abbe number of the second lens element E2 is V2, an Abbe number of the third lens element E3 is V3, an Abbe number of the fourth lens element E4 is V4, an Abbe number of the fifth lens element E5 is V5, an Abbe number of the sixth lens element E6 is V6, an Abbe number of the seventh lens element E7 is V7, and an Abbe number of the eighth lens element E8 is V8, the following condition is satisfied: (V1+V4+V6+V8)/(V2+V3+V5+V7)=1.49.

When the Abbe number of the first lens element E1 is V1, the Abbe number of the second lens element E2 is V2, the Abbe number of the third lens element E3 is V3, the Abbe number of the fourth lens element E4 is V4, the Abbe number of the fifth lens element E5 is V5, the Abbe number of the sixth lens element E6 is V6, the Abbe number of the seventh lens element E7 is V7, the Abbe number of the eighth lens element E8 is V8, an Abbe number of the i-th lens element is Vi, a refractive index of the first lens element E1 is N1, a refractive index of the second lens element E2 is N2, a refractive index of the third lens element E3 is N3, a refractive index of the fourth lens element E4 is N4, a refractive index of the fifth lens element E5 is N5, a refractive index of the sixth lens element E6 is N6, a refractive index of the seventh lens element E7 is N7, a refractive index of the eighth lens element E8 is N8, a refractive index of the i-th lens element is Ni, and a minimum value of Vi/Ni is min(Vi/Ni), the following condition is satisfied: min(Vi/Ni)=11.65, wherein i=1, 2, 3, 4, 5, 6, 7 and 8. In this embodiment, a ratio (V5/N5) of the Abbe number of the fifth lens element E5 to the refractive index of the fifth lens element E5 is smaller than ratios of Abbe number to refractive index of the other lens elements in the optical imaging lens assembly, and min(Vi/Ni) is equal to V5/N5.

When a central thickness of the first lens element E1 is CT1, a central thickness of the second lens element E2 is CT2, a central thickness of the third lens element E3 is CT3, a central thickness of the fourth lens element E4 is CT4, a central thickness of the fifth lens element E5 is CT5, a central thickness of the sixth lens element E6 is CT6, a central thickness of the seventh lens element E7 is CT7, and a central thickness of the eighth lens element E8 is CT8, the following condition is satisfied: (CT1+CT2+CT3+CT4+CT5+CT6)/(CT7+CT8)=3.14.

When the central thickness of the second lens element E2 is CT2, the central thickness of the third lens element E3 is CT3, and the central thickness of the fourth lens element E4 is CT4, the following condition is satisfied: (CT2+CT4)/CT3=3.14.

When an axial distance between the first lens element E1 and the second lens element E2 is T12, an axial distance between the second lens element E2 and the third lens element E3 is T23, and an axial distance between the third lens element E3 and the fourth lens element E4 is T34, the following condition is satisfied: (T12+T34)/T23=0.50n this embodiment, an axial distance between two adjacent lens elements is a distance in a paraxial region between two adjacent lens surfaces of the two adjacent lens elements.

When an axial distance between the fourth lens element E4 and the fifth lens element E5 is T45, an axial distance between the fifth lens element E5 and the sixth lens element E6 is T56, and the central thickness of the fifth lens element E5 is CT5, the following condition is satisfied: (T45+T56)/CT5=1.80.

When an axial distance between the sixth lens element E6 and the seventh lens element E7 is T67, and an axial distance between the seventh lens element E7 and the eighth lens element E8 is T78, the following condition is satisfied: (T67+T78)/|T67−T78|=1.07.

When the axial distance between the fourth lens element E4 and the fifth lens element E5 is T45, and the axial distance between the fifth lens element E5 and the sixth lens element E6 is T56, the following condition is satisfied: T45/T56=2.19.

When an axial distance between the object-side surface of the first lens element E1 and the image surface IMG is TL, and an entrance pupil diameter of the optical imaging lens assembly is EPD, the following condition is satisfied: TL/EPD=4.14.

When the axial distance between the object-side surface of the first lens element E1 and the image surface IMG is TL, and the focal length of the optical imaging lens assembly is f, the following condition is satisfied: TL/f=2.08.

When the axial distance between the object-side surface of the first lens element E1 and the image surface IMG is TL, and a maximum image height of the optical imaging lens assembly is ImgH, the following condition is satisfied: TL/ImgH=1.36.

When a curvature radius of the object-side surface of the first lens element E1 is R1, and a curvature radius of the image-side surface of the eighth lens element E8 is R16, the following condition is satisfied: R1/R16=−0.81.

When a curvature radius of the image-side surface of the sixth lens element E6 is R12, and the focal length of the optical imaging lens assembly is f, the following condition is satisfied: R12/f=−0.26.

When a curvature radius of the object-side surface of the second lens element E2 is R3, a curvature radius of the image-side surface of the second lens element E2 is R4, and the focal length of the optical imaging lens assembly is f, the following condition is satisfied: R3/f+R4/f=1.57.

When a curvature radius of the image-side surface of the fourth lens element E4 is R8, and the focal length of the optical imaging lens assembly is f, the following condition is satisfied: R8/f=−0.85.

When a focal length of the seventh lens element E7 is f7, and a focal length of the eighth lens element E8 is f8, the following condition is satisfied: |f7/f8|=0.11.

When the focal length of the optical imaging lens assembly is f, a curvature radius of the object-side surface of the seventh lens element E7 is R13, and a curvature radius of the image-side surface of the seventh lens element E7 is R14, the following condition is satisfied: f/|R13|+f/|R14|=4.75.

When the focal length of the optical imaging lens assembly is f, a focal length of the first lens element E1 is f1, a focal length of the second lens element E2 is f2, a focal length of the third lens element E3 is f3, a focal length of the fourth lens element E4 is f4, a focal length of the fifth lens element E5 is f5, a focal length of the sixth lens element E6 is f6, the focal length of the seventh lens element E7 is f7, and the focal length of the eighth lens element E8 is f8, the following conditions are satisfied: f/f1=−0.36; f/f2=0.33; f/f3=0.38; f/f4=0.45; f/f5=−0.42; f/f6=1.85; f/f7=−1.36; and f/f8=−0.15.

When the focal length of the optical imaging lens assembly is f, the focal length of the third lens element E3 is f3, the focal length of the fourth lens element E4 is f4, and the focal length of the fifth lens element E5 is f5, the following condition is satisfied: f/f3+f/f4+f/f5=0.42.

When the focal length of the optical imaging lens assembly is f, the focal length of the sixth lens element E6 is f6, the focal length of the seventh lens element E7 is f7, and the focal length of the eighth lens element E8 is f8, the following condition is satisfied: f/f6+f/f7+f/f8=0.34.

When the focal length of the optical imaging lens assembly is f, the focal length of the sixth lens element E6 is f6, and the focal length of the seventh lens element E7 is f7, the following condition is satisfied: f/f6−f/f7=3.21.

When the focal length of the first lens element E1 is f1, and the central thickness of the first lens element E1 is CT1, the following condition is satisfied: f1/CT1=−18.33.

When the focal length of the first lens element E1 is f1, and the focal length of the seventh lens element E7 is f7, the following condition is satisfied: f1/f7=3.80.

When the focal length of the optical imaging lens assembly is f, and a composite focal length of the first lens element E1 and the second lens element E2 is f12, the following condition is satisfied: f12/f=−33.86.

When the focal length of the seventh lens element E7 is f7, and the central thickness of the seventh lens element E7 is CT7, the following condition is satisfied: f7/CT7=−4.47.

When a maximum effective radius of the object-side surface of the first lens element E1 is Y11, and a maximum effective radius of the image-side surface of the eighth lens element E8 is Y82, the following condition is satisfied: Y11/Y82=0.50.

When a vertical distance between the critical point on the object-side surface of the first lens element E1 and the optical axis is Yc11, and the maximum effective radius of the object-side surface of the first lens element E1 is Y11, the following condition is satisfied: Yc11/Y11=0.30.

When a vertical distance between the critical point on the image-side surface of the eighth lens element E8 and the optical axis is Yc82, and the maximum effective radius of the image-side surface of the eighth lens element E8 is Y82, the following condition is satisfied: Yc82/Y82=0.47.

The detailed optical data of the 1st embodiment are shown in Table 1 and the aspheric surface data are shown in Table 2 below.

TABLE 1

1st Embodiment
f = 3.43 mm, Fno = 1.99, HFOV = 56.0 deg.

| Surface # |           | Curvature Radius |       | Thickness | Material | Index | Abbe # | Focal Length |
|-----------|-----------|------------------|-------|-----------|----------|-------|--------|--------------|
| 0         | Object    | Plano            |       | Infinity  |          |       |        |              |
| 1         | Lens 1    | −7.0652          | (ASP) | 0.523     | Plastic  | 1.544 | 56.0   | −9.58        |
| 2         |           | 20.4206          | (ASP) | 0.114     |          |       |        |              |
| 3         | Lens 2    | 2.1666           | (ASP) | 0.396     | Plastic  | 1.566 | 37.4   | 10.34        |
| 4         |           | 3.2126           | (ASP) | 0.300     |          |       |        |              |
| 5         | Ape. Stop | Plano            |       | 0.012     |          |       |        |              |
| 6         | Lens 3    | 14.0920          | (ASP) | 0.314     | Plastic  | 1.544 | 56.0   | 8.95         |
| 7         |           | −7.3766          | (ASP) | 0.043     |          |       |        |              |
| 8         | Lens 4    | −9.5241          | (ASP) | 0.590     | Plastic  | 1.544 | 56.0   | 7.55         |
| 9         |           | −2.9320          | (ASP) | 0.395     |          |       |        |              |
| 10        | Lens 5    | −10.4253         | (ASP) | 0.320     | Plastic  | 1.669 | 19.5   | −8.25        |
| 11        |           | 11.8684          | (ASP) | 0.180     |          |       |        |              |
| 12        | Lens 6    | −4.1280          | (ASP) | 1.200     | Plastic  | 1.544 | 56.0   | 1.85         |
| 13        |           | −0.8937          | (ASP) | 0.020     |          |       |        |              |
| 14        | Lens 7    | 3.2532           | (ASP) | 0.563     | Plastic  | 1.566 | 37.4   | −2.52        |
| 15        |           | 0.9294           | (ASP) | 0.614     |          |       |        |              |
| 16        | Lens 8    | 28.9145          | (ASP) | 0.500     | Plastic  | 1.544 | 56.0   | −23.28       |
| 17        |           | 8.7533           | (ASP) | 0.600     |          |       |        |              |
| 18        | Filter    | Plano            |       | 0.145     | Glass    | 1.517 | 64.2   | —            |
| 19        |           | Plano            |       | 0.303     |          |       |        |              |
| 20        | Image     | Plano            |       | —         |          |       |        |              |

Note:
Reference wavelength is 587.6 nm (d-line).

TABLE 2

Aspheric Coefficients

| Surface # | 1 | 2 | 3 | 4 |
|---|---|---|---|---|
| k =   | 6.14701E+00     | −8.75069E+00    | −3.42444E+00    | 6.28343E+00     |
| A4 =  | 1.21933723E−01  | 2.25983608E−01  | 1.26691792E−01  | −1.22166519E−02 |
| A6 =  | −7.64793590E−02 | −2.67060240E−01 | −2.24343678E−01 | 5.31166010E−04  |
| A8 =  | 4.36109942E−02  | 2.04103158E−01  | 1.57900050E−01  | −6.75116187E−02 |
| A10 = | −1.86321861E−02 | −1.11504311E−01 | −7.22578076E−02 | 1.13727528E−01  |
| A12 = | 5.56138096E−03  | 4.06451996E−02  | 2.23284909E−02  | −4.94976279E−02 |
| A14 = | −1.07695159E−03 | −9.15713542E−03 | −3.17525333E−03 | 2.26985805E−03  |
| A16 = | 1.19612663E−04  | 1.15092550E−03  | —               | —               |
| A18 = | −5.72003994E−06 | −6.22574568E−05 | —               | —               |

| Surface # | 6 | 7 | 8 | 9 |
|---|---|---|---|---|
| k =   | 6.18472E+01     | 5.80949E+00     | 1.13488E+01     | −2.27158E+00    |
| A4 =  | −2.42843948E−02 | −2.82398504E−02 | −1.11630718E−02 | −7.86394826E−02 |
| A6 =  | 4.61885479E−02  | 3.27015448E−02  | −1.93444276E−02 | −3.07944627E−02 |
| A8 =  | −1.77983634E−01 | 3.12324587E−02  | 1.35782181E−01  | 8.31717456E−02  |
| A10 = | 4.20334877E−01  | −1.14695112E−01 | −2.51607491E−01 | −1.66100350E−01 |
| A12 = | −4.67943422E−01 | 1.32989848E−01  | 2.08351537E−01  | 1.82292387E−01  |
| A14 = | 1.81728717E−01  | −6.23327918E−02 | −6.99960111E−02 | −1.08633628E−01 |
| A16 = | —               | —               | 3.49519468E−03  | 2.62868387E−02  |

| Surface # | 10 | 11 | 12 | 13 |
|---|---|---|---|---|
| k =   | 0.00000E+00     | 0.00000E+00     | −7.53023E−01    | −3.59527E+00    |
| A4 =  | −1.79063448E−01 | −1.48786013E−01 | −2.39893176E−02 | −9.60823445E−02 |
| A6 =  | 2.13162517E−02  | 1.40205822E−01  | 1.03116949E−01  | 2.75577181E−02  |
| A8 =  | 5.89984050E−02  | −1.71067329E−01 | −1.42542574E−01 | 2.42867709E−02  |
| A10 = | −1.84246944E−01 | 1.56754744E−01  | 1.16393002E−01  | −3.26938861E−02 |
| A12 = | 3.10281755E−01  | −8.42017895E−02 | −5.88668538E−02 | 1.88336581E−02  |
| A14 = | −2.49832908E−01 | 2.60963723E−02  | 1.84408702E−02  | −6.11038430E−03 |
| A16 = | 9.64728017E−02  | −4.39673897E−03 | −3.47491218E−03 | 1.13867986E−03  |
| A18 = | −1.47513092E−02 | 3.12364608E−04  | 3.58412537E−04  | −1.12734990E−04 |
| A20 = | —               | —               | −1.52284137E−05 | 4.54581092E−06  |

| Surface # | 14 | 15 | 16 | 17 |
|---|---|---|---|---|
| k =   | −1.94776E+01    | −5.09894E+00    | 2.02220E+01     | −1.89290E+00    |
| A4 =  | −2.37499583E−02 | −5.00828432E−02 | 4.74733404E−02  | 3.15455283E−02  |
| A6 =  | −1.42158660E−02 | 1.81945331E−02  | −4.99280159E−02 | −2.64789433E−02 |
| A8 =  | 2.35200828E−02  | −5.04469182E−03 | 1.91621510E−02  | 7.83491702E−03  |
| A10 = | −1.50507963E−02 | 8.56868654E−04  | −4.37156387E−03 | −1.22210694E−03 |

TABLE 2-continued

| Aspheric Coefficients | | | |
|---|---|---|---|
| A12 = | 5.43702796E−03 | −1.17881500E−04 | 6.72416812E−04 | 1.00100264E−04 |
| A14 = | −1.23533500E−03 | 2.13232856E−05 | −7.18739733E−05 | −2.25358299E−06 |
| A16 = | 1.83310152E−04 | −3.65062082E−06 | 5.28122524E−06 | −3.56644797E−07 |
| A18 = | −1.77079651E−05 | 3.98222414E−07 | −2.58295180E−07 | 3.91808527E−08 |
| A20 = | 1.06853997E−06 | −2.50198106E−08 | 7.93735608E−09 | −1.82198512E−09 |
| A22 = | −3.63313131E−08 | 8.34244235E−10 | −1.36823163E−10 | 4.27064806E−11 |
| A24 = | 5.26318644E−10 | −1.14795217E−11 | 9.90128815E−13 | −4.11825535E−13 |

In Table 1, the curvature radius, the thickness and the focal length are shown in millimeters (mm). Surface numbers 0-20 represent the surfaces sequentially arranged from the object side to the image side along the optical axis. In Table 2, k represents the conic coefficient of the equation of the aspheric surface profiles. A4-A24 represent the aspheric coefficients ranging from the 4th order to the 24th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
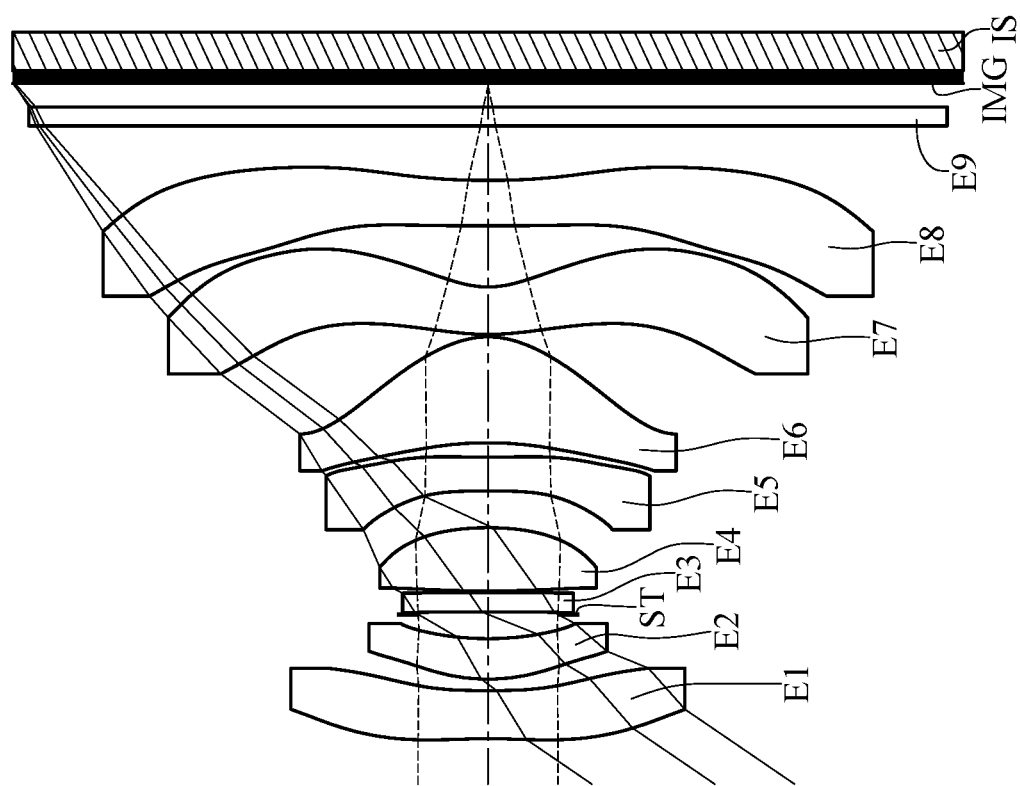
FIG. 3 is a schematic view of an image capturing unit according to the 2nd embodiment of the present disclosure.
Figure 4:
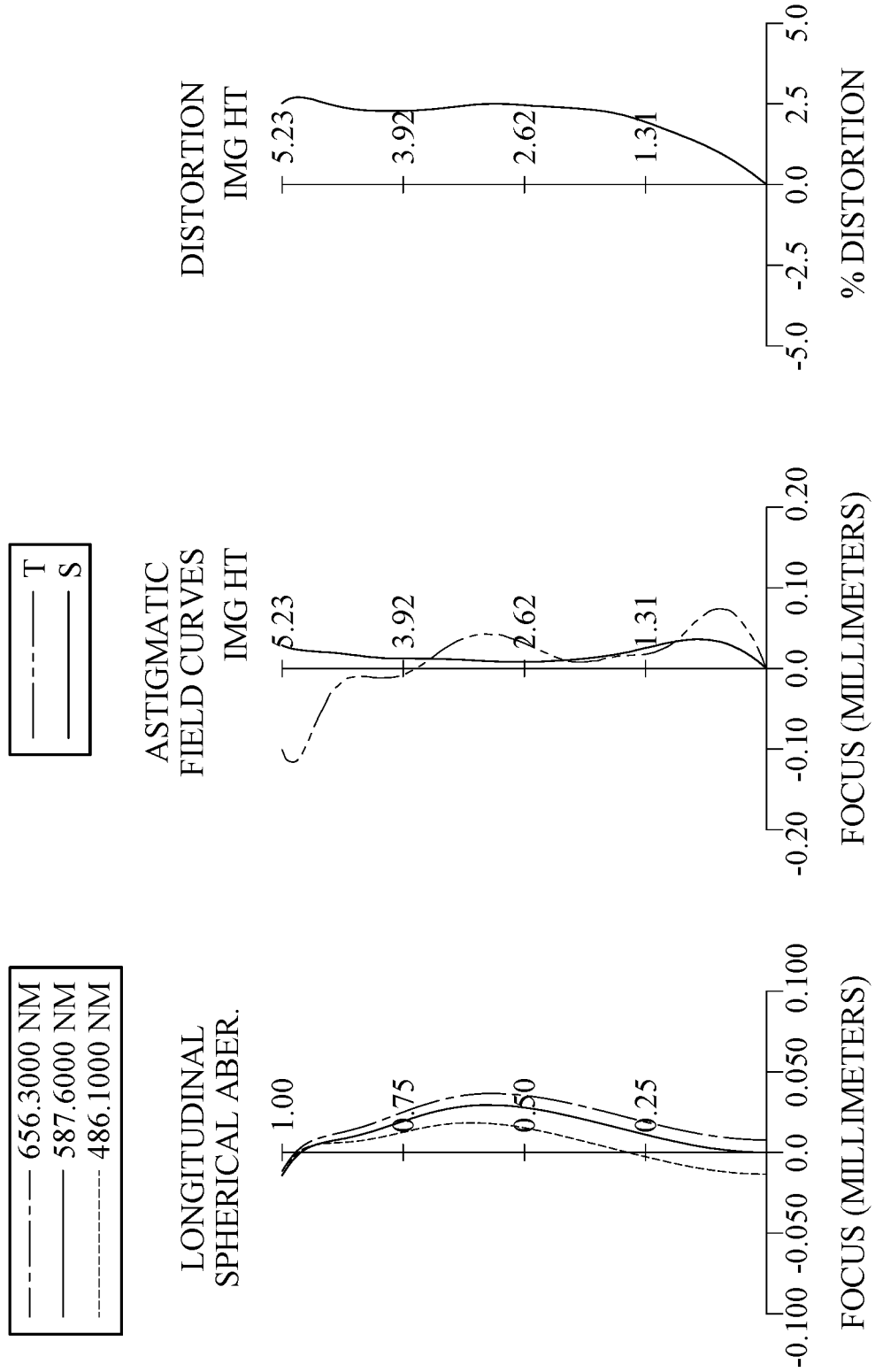
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the optical imaging lens assembly (its reference numeral is omitted) of the present disclosure and an image sensor IS. The optical imaging lens assembly includes, in order from an object side to an image side along an optical axis, a first lens element E1, a second lens element E2, an aperture stop ST, a third lens element E3, a fourth lens element E4, a fifth lens element E5, a sixth lens element E6, a seventh lens element E7, an eighth lens element E8, a filter E9 and an image surface IMG. The optical imaging lens assembly includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points in an off-axis region thereof. The image-side surface of the first lens element E1 has one inflection point in an off-axis region thereof. The object-side surface of the first lens element E1 has one critical point in the off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points in an off-axis region thereof.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The object-side surface of the third lens element E3 has one inflection point in an off-axis region thereof. The image-side surface of the third lens element E3 has four inflection points in an off-axis region thereof. The image-side surface of the third lens element E3 has one critical point in the off-axis region thereof.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points in an off-axis region thereof.

The fifth lens element E5 with negative refractive power has an object-side surface being concave in a paraxial region thereof and an image-side surface being concave in a paraxial region thereof. The fifth lens element E5 is made of plastic material and has the object-side surface and the image-side surface being both aspheric. The image-side surface of the fifth lens element E5 has three inflection points in an off-axis region thereof. The image-side surface of the fifth lens element E5 has one critical point in the off-axis region thereof.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric. The image-side surface of the sixth lens element E6 has one inflection point in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has two inflection points in an off-axis region thereof. The image-side surface of the seventh lens element E7 has two inflection points in an off-axis region thereof. The object-side surface of the seventh lens element E7 has one critical point in the off-axis region thereof. The image-side surface of the seventh lens element E7 has one critical point in the off-axis region thereof.

The eighth lens element E8 with negative refractive power has an object-side surface being concave in a paraxial region thereof and an image-side surface being concave in a paraxial region thereof. The eighth lens element E8 is made of plastic material and has the object-side surface and the image-side surface being both aspheric. The object-side surface of the eighth lens element E8 has five inflection points in an off-axis region thereof. The image-side surface of the eighth lens element E8 has one inflection point in an off-axis region thereof. The object-side surface of the eighth lens element E8 has two critical points in the off-axis region thereof. The image-side surface of the eighth lens element E8 has one critical point in the off-axis region thereof.

The filter E9 is made of glass material and located between the eighth lens element E8 and the image surface IMG, and will not affect the focal length of the optical imaging lens assembly. The image sensor IS is disposed on or near the image surface IMG of the optical imaging lens assembly.

The detailed optical data of the 2nd embodiment are shown in Table 3 and the aspheric surface data are shown in Table 4 below.

TABLE 3

2nd Embodiment
f = 3.47 mm, Fno = 2.25, HFOV = 55.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −6.9622 | (ASP) | 0.531 | Plastic | 1.545 | 56.1 | −10.09 |
| 2 | | 26.8117 | (ASP) | 0.126 | | | | |
| 3 | Lens 2 | 2.2036 | (ASP) | 0.446 | Plastic | 1.566 | 37.4 | 10.07 |
| 4 | | 3.3306 | (ASP) | 0.268 | | | | |
| 5 | Ape. Stop | Plano | | 0.026 | | | | |
| 6 | Lens 3 | −201.2072 | (ASP) | 0.210 | Plastic | 1.650 | 21.8 | −193.88 |
| 7 | | 336.8996 | (ASP) | 0.021 | | | | |
| 8 | Lens 4 | 11.0718 | (ASP) | 0.698 | Plastic | 1.544 | 56.0 | 4.46 |
| 9 | | −3.0343 | (ASP) | 0.405 | | | | |
| 10 | Lens 5 | −14.7732 | (ASP) | 0.373 | Plastic | 1.680 | 18.2 | −8.84 |
| 11 | | 10.2493 | (ASP) | 0.158 | | | | |
| 12 | Lens 6 | −4.0165 | (ASP) | 1.168 | Plastic | 1.544 | 56.0 | 1.97 |
| 13 | | −0.9313 | (ASP) | 0.027 | | | | |
| 14 | Lens 7 | 2.6825 | (ASP) | 0.522 | Plastic | 1.566 | 37.4 | −2.89 |
| 15 | | 0.9446 | (ASP) | 0.676 | | | | |
| 16 | Lens 8 | −140.5586 | (ASP) | 0.500 | Plastic | 1.544 | 56.0 | −16.61 |
| 17 | | 9.6708 | (ASP) | 0.600 | | | | |
| 18 | Filter | Plano | | 0.210 | Glass | 1.517 | 64.2 | — |
| 19 | | Plano | | 0.259 | | | | |
| 20 | Image | Plano | | — | | | | |

Note:
Reference wavelength is 587.6 nm (d-line).

TABLE 4

Aspheric Coefficients

| Surface # | 1 | 2 | 3 | 4 |
|---|---|---|---|---|
| k = | 6.50130E+00 | −2.15491E+01 | −3.24618E+00 | 6.77523E+00 |
| A4 = | 1.24141699E−01 | 2.38086283E−01 | 1.39614092E−01 | −5.47800853E−03 |
| A6 = | −7.89378666E−02 | −2.99918571E−01 | −2.82812528E−01 | −2.27234019E−02 |
| A8 = | 4.52238998E−02 | 2.44660919E−01 | 2.64256437E−01 | −6.04879593E−02 |
| A10 = | −1.93366482E−02 | −1.40707832E−01 | −1.70776776E−01 | 2.29555196E−01 |
| A12 = | 5.81543450E−03 | 5.38133904E−02 | 6.72603107E−02 | −2.75141901E−01 |
| A14 = | −1.13142158E−03 | −1.28406161E−02 | −1.08603821E−02 | 1.30442112E−01 |
| A16 = | 1.25685863E−04 | 1.73271659E−03 | — | — |
| A18 = | −5.97444387E−06 | −1.01548806E−04 | — | — |

| Surface # | 6 | 7 | 8 | 9 |
|---|---|---|---|---|
| k = | −9.00000E+01 | −9.00000E+01 | −8.96636E+01 | −1.98551E+00 |
| A4 = | −9.24585024E−03 | −2.44356063E−02 | −1.54985879E−02 | −8.50634914E−02 |
| A6 = | 1.70671252E−02 | 6.53042062E−02 | 1.95408311E−02 | −2.50891567E−02 |
| A8 = | −9.85087394E−02 | −5.64391104E−02 | 4.47835435E−02 | 9.43206658E−02 |
| A10 = | 3.37713980E−01 | −1.46004002E−02 | −1.38016195E−01 | −1.94578240E−01 |
| A12 = | −5.69105010E−01 | 2.53090704E−02 | 9.10176041E−02 | 2.22281901E−01 |
| A14 = | 3.40874411E−01 | 7.34501459E−04 | 4.41883361E−03 | −1.40536358E−01 |
| A16 = | — | — | −1.32298665E−02 | 3.55306316E−02 |

| Surface # | 10 | 11 | 12 | 13 |
|---|---|---|---|---|
| k = | 0.00000E+00 | 0.00000E+00 | −1.40410E+00 | −3.59778E+00 |
| A4 = | −1.84891869E−01 | −1.52324798E−01 | −4.09197749E−02 | −1.34763296E−01 |
| A6 = | 7.33279312E−02 | 1.50965567E−01 | 1.44165242E−01 | 1.16130378E−01 |
| A8 = | −6.88472604E−02 | −1.77204313E−01 | −2.00478352E−01 | −8.01336912E−02 |

TABLE 4-continued

| Aspheric Coefficients | | | | |
|---|---|---|---|---|
| A10 = | 2.26311194E−02 | 1.53604156E−01 | 1.72273585E−01 | 4.07950757E−02 |
| A12 = | 1.09994024E−01 | −7.84896082E−02 | −9.36862209E−02 | −1.27399027E−02 |
| A14 = | −1.36924831E−01 | 2.29294363E−02 | 3.19691775E−02 | 2.24191915E−03 |
| A16 = | 6.07269646E−02 | −3.58211194E−03 | −6.62654289E−03 | −1.84958770E−04 |
| A18 = | −9.66573913E−03 | 2.32019375E−04 | 7.61802149E−04 | 1.61240587E−06 |
| A20 = | — | — | −3.71963661E−05 | 4.58294117E−07 |

| Surface # | 14 | 15 | 16 | 17 |
|---|---|---|---|---|
| k = | −2.40394E+01 | −5.16927E+00 | 9.00000E+01 | −4.03167E+00 |
| A4 = | −2.28106872E−02 | −6.71695497E−02 | 4.13817333E−02 | 3.25300168E−02 |
| A6 = | −5.48048341E−03 | 3.72685953E−02 | −4.28508718E−02 | −2.52115123E−02 |
| A8 = | 1.18246609 E−02 | −1.64949588E−02 | 1.79381626E−02 | 7.39932876E−03 |
| A10 = | −8.67048182E−03 | 5.02375429E−03 | −4.88864088E−03 | −1.22434610E−03 |
| A12 = | 3.58724865E−03 | −1.09893966E−03 | 9.43599961E−04 | 1.22638751E−04 |
| A14 = | −9.30755508E−04 | 1.77229962E−04 | −1.28025688E−04 | −7.24239354E−06 |
| A16 = | 1.57168803 E−04 | −2.06993896E−05 | 1.19281554E−05 | 2.01604560E−07 |
| A18 = | −1.72755793E−05 | 1.67206132E−06 | −7.41321203E−07 | 2.12286011E−09 |
| A20 = | 1.19301533E−06 | −8.73442564E−08 | 2.92585289E−08 | −3.44982223E−10 |
| A22 = | −4.70310011E−08 | 2.63239124E−09 | −6.61886550E−10 | 9.96119074E−12 |
| A24 = | 8.07399225E−10 | −3.45945698E−11 | 6.52478557E−12 | −1.00833244E−13 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.47 | f/|R13| + f/|R14| | 4.96 |
| Fno | 2.25 | f/f1 | −0.34 |
| HFOV [deg.] | 55.7 | f/f2 | 0.34 |
| (V1 + V4 + V6 + V8)/(V2 + V3 + V5 + V7) | 1.95 | f/f3 | −0.02 |
| min(Vi/Ni) | 10.81 | f/f3 + f/f4 + f/f5 | 0.37 |
| (CT1 + CT2 + CT3 + CT4 + CT5 + CT6)/(CT7 + CT8) | 3.35 | f/f4 | 0.78 |
| (CT2 + CT4)/CT3 | 5.45 | f/f5 | −0.39 |
| (T12 + T34)/T23 | 0.50 | f/f6 | 1.76 |
| (T45 + T56)/CT5 | 1.51 | f/f6 + f/f7 + f/f8 | 0.35 |
| (T67 + T78)/|T67 − T78| | 1.08 | f/f6 − f/f7 | 2.96 |
| T45/T56 | 2.56 | f/f7 | −1.20 |
| TL/EPD | 4.69 | f/f8 | −0.21 |
| TL/f | 2.08 | f1/CT1 | −19.00 |
| TL/ImgH | 1.38 | f1/f7 | 3.49 |
| R1/R16 | −0.72 | f12/f | −428.33 |
| R12/f | −0.27 | f7/CT7 | −5.53 |
| R3/f + R4/f | 1.60 | Y11/Y82 | 0.51 |
| R8/f | −0.88 | Yc11/Y11 | 0.30 |
| |f7/f8| | 0.17 | Yc82/Y82 | 0.46 |

3rd Embodiment

Figure 5:
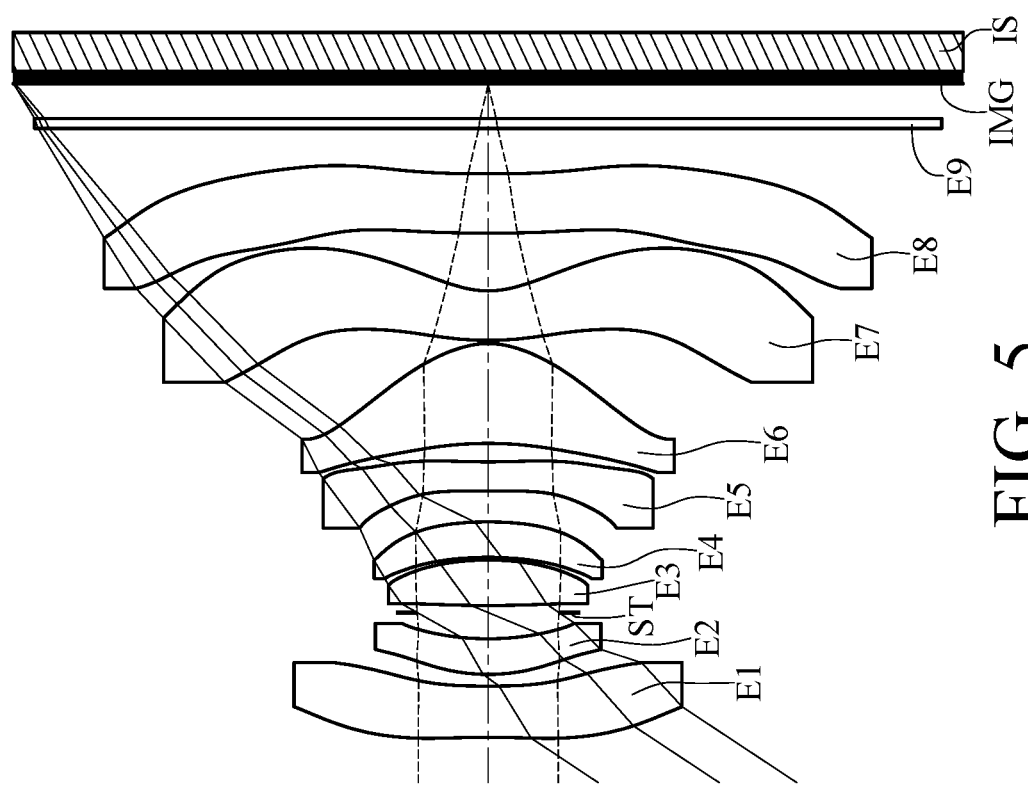
FIG. 5 is a schematic view of an image capturing unit according to the 3rd embodiment of the present disclosure.
Figure 6:
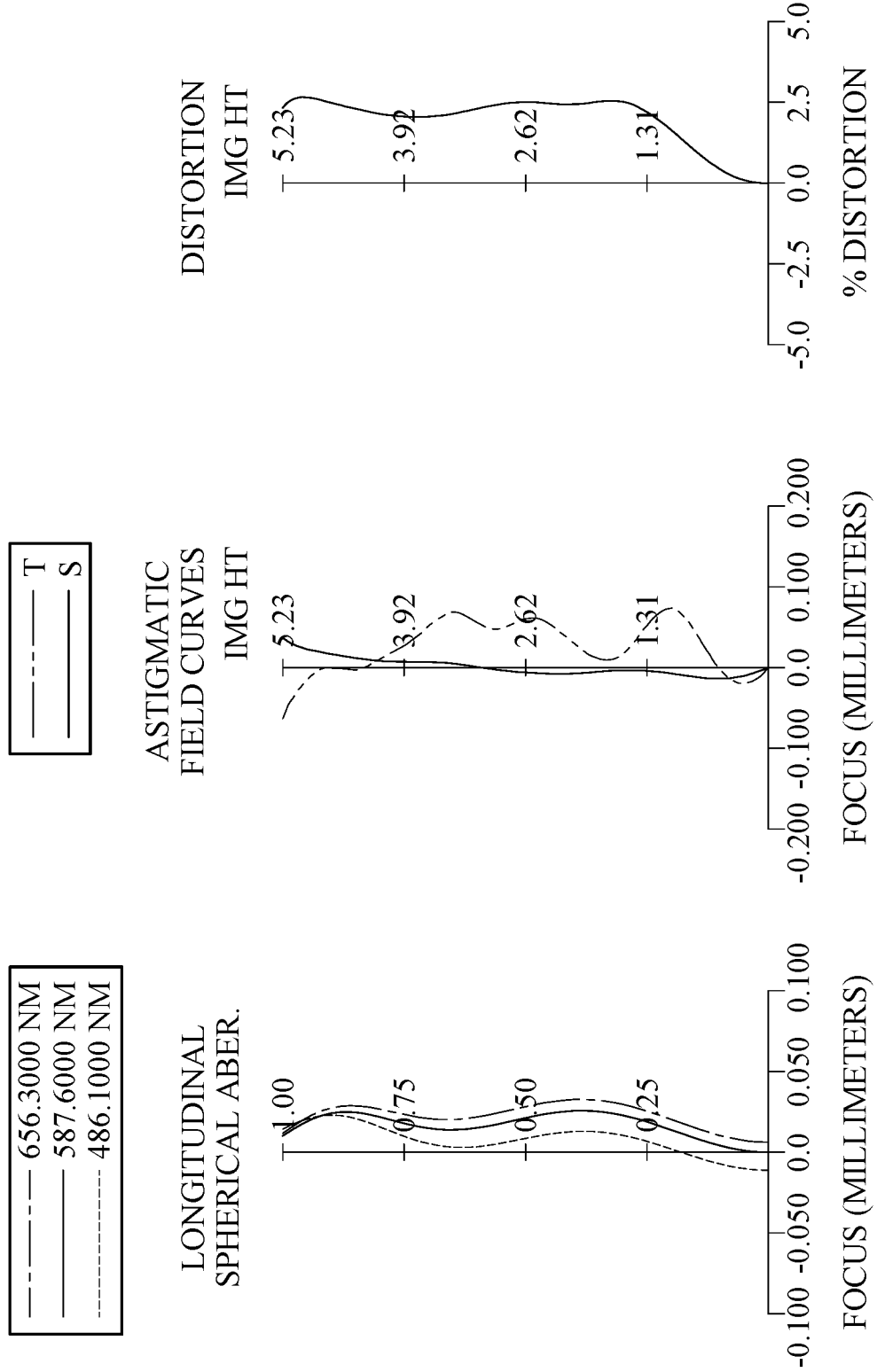
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the optical imaging lens assembly (its reference numeral is omitted) of the present disclosure and an image sensor IS. The optical imaging lens assembly includes, in order from an object side to an image side along an optical axis, a first lens element E1, a second lens element E2, an aperture stop ST, a third lens element E3, a fourth lens element E4, a fifth lens element E5, a sixth lens element E6, a seventh lens element E7, an eighth lens element E8, a filter E9 and an image surface IMG. The optical imaging lens assembly includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points in an off-axis region thereof. The image-side surface of the first lens element E1 has one inflection point in an off-axis region thereof. The object-side surface of the first lens element E1 has one critical point in the off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point in the off-axis region thereof.

The third lens element E3 with positive refractive power has an object-side surface being convex in a paraxial region thereof and an image-side surface being convex in a paraxial region thereof. The third lens element E3 is made of glass material and has the object-side surface and the image-side surface being both aspheric. The object-side surface of the third lens element E3 has one inflection point in an off-axis region thereof. The object-side surface of the third lens element E3 has one critical point in the off-axis region thereof.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The image-side surface of the fourth lens element E4 has one inflection point in an off-axis region thereof.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point in an off-axis region thereof. The image-side surface of the fifth lens element E5 has three inflection points in an off-axis region thereof. The object-side surface of the fifth lens element E5 has one critical point in the off-axis region thereof. The image-side surface of the fifth lens element E5 has one critical point in the off-axis region thereof.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point in an off-axis region thereof. The image-side surface of the sixth lens element E6 has one inflection point in an off-axis region thereof. The image-side surface of the sixth lens element E6 has one critical point in the off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has two inflection points in an off-axis region thereof. The image-side surface of the seventh lens element E7 has two inflection points in an off-axis region thereof. The object-side surface of the seventh lens element E7 has one critical point in the off-axis region thereof. The image-side surface of the seventh lens element E7 has one critical point in the off-axis region thereof.

The eighth lens element E8 with positive refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has four inflection points in an off-axis region thereof. The image-side surface of the eighth lens element E8 has two inflection points in an off-axis region thereof. The object-side surface of the eighth lens element E8 has one critical point in the off-axis region thereof. The image-side surface of the eighth lens element E8 has one critical point in the off-axis region thereof.

The filter E9 is made of glass material and located between the eighth lens element E8 and the image surface IMG, and will not affect the focal length of the optical imaging lens assembly. The image sensor IS is disposed on or near the image surface IMG of the optical imaging lens assembly.

The detailed optical data of the 3rd embodiment are shown in Table 5 and the aspheric surface data are shown in Table 6 below.

TABLE 5

3rd Embodiment
f = 3.38 mm, Fno = 2.19, HFOV = 56.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −7.1748 | (ASP) | 0.564 | Plastic | 1.562 | 44.6 | −9.24 |
| 2 | | 19.3260 | (ASP) | 0.128 | | | | |
| 3 | Lens 2 | 2.1715 | (ASP) | 0.393 | Plastic | 1.587 | 28.3 | 10.84 |
| 4 | | 3.0748 | (ASP) | 0.289 | | | | |
| 5 | Ape. Stop | Plano | | 0.078 | | | | |
| 6 | Lens 3 | 13.0503 | (ASP) | 0.501 | Glass | 1.542 | 62.9 | 4.39 |
| 7 | | −2.8711 | (ASP) | 0.030 | | | | |
| 8 | Lens 4 | −3.4338 | (ASP) | 0.390 | Plastic | 1.544 | 56.0 | −120.62 |
| 9 | | −3.7684 | (ASP) | 0.342 | | | | |
| 10 | Lens 5 | 114.8571 | (ASP) | 0.320 | Plastic | 1.669 | 19.5 | −11.91 |
| 11 | | 7.4407 | (ASP) | 0.204 | | | | |
| 12 | Lens 6 | −4.3373 | (ASP) | 1.100 | Plastic | 1.544 | 56.0 | 1.94 |
| 13 | | −0.9260 | (ASP) | 0.035 | | | | |
| 14 | Lens 7 | 3.3439 | (ASP) | 0.545 | Plastic | 1.582 | 30.2 | −2.55 |
| 15 | | 0.9655 | (ASP) | 0.637 | | | | |
| 16 | Lens 8 | 25.7120 | (ASP) | 0.655 | Plastic | 1.544 | 56.0 | 297.48 |
| 17 | | 30.2940 | (ASP) | 0.500 | | | | |
| 18 | Filter | Plano | | 0.110 | Glass | 1.517 | 64.2 | — |
| 19 | | Plano | | 0.383 | | | | |
| 20 | Image | Plano | | — | | | | |

Note:
Reference wavelength is 587.6 nm (d-line).

TABLE 6

Aspheric Coefficients

| Surface # | 1 | 2 | 3 | 4 |
|---|---|---|---|---|
| k = | 6.25052E+00 | −2.98343E+00 | −3.47385E+00 | 5.91286E+00 |
| A4 = | 1.19189569E−01 | 2.41385313E−01 | 1.44542811E−01 | −7.64493791E−03 |
| A6 = | −7.18609959E−02 | −3.13201415E−01 | −3.03454164E−01 | −2.51573122E−02 |
| A8 = | 3.91793288E−02 | 2.92742753E−01 | 3.54586977E−01 | −1.91594509E−02 |
| A10 = | −1.57976953E−02 | −2.05691852E−01 | −3.16915329E−01 | 1.06189060E−01 |
| A12 = | 4.40693160E−03 | 9.64163655E−02 | 1.61714946E−01 | −1.69573135E−01 |
| A14 = | −7.94780175E−04 | −2.77036918E−02 | −3.26225012E−02 | 1.01397087E−01 |
| A16 = | 8.22588895E−05 | 4.39812956E−03 | — | — |
| A18 = | −3.68504100E−06 | −2.95510094E−04 | — | — |

| Surface # | 6 | 7 | 8 | 9 |
|---|---|---|---|---|
| k = | 5.07100E+01 | 2.32591E+00 | 2.05512E+00 | −2.52123E+00 |
| A4 = | −2.03221163E−02 | 7.17153277E−02 | 7.31827053E−02 | −5.04747009E−02 |
| A6 = | 5.53088311E−02 | −3.72896444E−01 | −3.66659412E−01 | −1.21258222E−01 |
| A8 = | −2.15478507E−01 | 9.06294560E−01 | 8.70079963E−01 | 2.40870690E−01 |
| A10 = | 3.56409534E−01 | −1.33943679E+00 | −1.32896801E+00 | −2.94957191E−01 |
| A12 = | −2.75275665E−01 | 1.05468216E+00 | 1.16216530E+00 | 2.15808504E−01 |
| A14 = | 7.65235497E−02 | −3.31228813E−01 | −4.95941610E−01 | −9.26236362E−02 |
| A16 = | — | — | 7.44236408 E−02 | 1.80962337E−02 |

| Surface # | 10 | 11 | 12 | 13 |
|---|---|---|---|---|
| k = | 0.00000E+00 | 0.00000E+00 | −3.72471E−01 | −3.75120E+00 |
| A4 = | −1.83726341E−01 | −1.57047960E−01 | −5.70036968E−02 | −1.11085195E−01 |
| A6 = | 1.98053818E−01 | 1.95341477E−01 | 1.37177797E−01 | 1.10288399E−01 |
| A8 = | −5.13061807E−01 | −2.62958845E−01 | −1.18152508E−01 | −1.53848136E−01 |
| A10 = | 7.03972282E−01 | 2.26003053E−01 | 5.63099024E−02 | 1.52110571E−01 |
| A12 = | −4.78300258E−01 | −1.10637065E−01 | −1.64888236E−02 | −8.61254802E−02 |
| A14 = | 1.63223088E−01 | 3.07018280E−02 | 3.08563071E−03 | 2.84712060E−02 |
| A16 = | −2.40175363E−02 | −4.53358177E−03 | −3.61331735E−04 | −5.46240988E−03 |
| A18 = | 5.49496902E−04 | 2.76083237E−04 | 2.04857841E−05 | 5.64572763E−04 |
| A20 = | — | — | 1.65698320E−07 | −2.43323191E−05 |

| Surface # | 14 | 15 | 16 | 17 |
|---|---|---|---|---|
| k = | −1.56012E+01 | −4.89621E+00 | 2.26004E+01 | 6.56866E+00 |
| A4 = | 3.63408808E−02 | −2.30899202E−02 | 3.85054538E−02 | 5.34421170E−02 |
| A6 = | −1.13673410E−01 | −1.36311882E−02 | −3.59352981E−02 | −3.46787877E−02 |
| A8 = | 9.68403054E−02 | 1.29725487E−02 | 1.05911509E−02 | 9.43269119E−03 |
| A10 = | −4.70067806E−02 | −5.25492128E−03 | −1.52101563E−03 | −1.44312870E−03 |
| A12 = | 1.45196177E−02 | 1.24678964E−03 | 9.31125991E−05 | 1.29956744E−04 |
| A14 = | −3.00200440E−03 | −1.86929054E−04 | 4.01424822E−06 | −6.25135216E−06 |
| A16 = | 4.23034218E−04 | 1.81808977E−05 | −1.25443421E−06 | 5.74062601E−08 |
| A18 = | −4.02295710E−05 | −1.14406483E−06 | 1.09159793E−07 | 1.07043108E−08 |
| A20 = | 2.47418166E−06 | 4.49291973E−08 | −5.02890268E−09 | −6.16783924E−10 |
| A22 = | −8.89636969E−08 | −1.00020040E−09 | 1.23401575E−10 | 1.43523197E−11 |
| A24 = | 1.42227158E−09 | 9.62330635E−12 | −1.27126899E−12 | −1.28315165E−13 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.38 | f/|R13| + f/|R14| | 4.51 |
| Fno | 2.19 | f/f1 | −0.37 |
| HFOV [deg.] | 56.5 | f/f2 | 0.31 |
| (V1 + V4 + V6 + V8)/(V2 + V3 + V5 + V7) | 1.51 | f/f3 | 0.77 |
| min(Vi/Ni) | 11.65 | f/f3 + f/f4 + f/f5 | 0.46 |
| (CT1 + CT2 + CT3 + CT4 + CT5 + CT6)/(CT7 + CT8) | 2.72 | f/f4 | −0.03 |

-continued

| 3rd Embodiment | | | |
|---|---|---|---|
| (CT2 + CT4)/CT3 | 1.56 | f/f5 | −0.28 |
| (T12 + T34)/T23 | 0.43 | f/f6 | 1.74 |
| (T45 + T56)/CT5 | 1.71 | f/f6 + f/f7 + f/f8 | 0.42 |
| (T67 + T78)/|T67 − T78| | 1.12 | f/f6 − f/f7 | 3.07 |
| T45/T56 | 1.68 | f/f7 | −1.33 |
| TL/EPD | 4.67 | f/f8 | 0.01 |
| TL/f | 2.13 | f1/CT1 | −16.39 |
| TL/ImgH | 1.38 | f1/f7 | 3.63 |
| R1/R16 | −0.24 | f12/f | −17.22 |
| R12/f | −0.27 | f7/CT7 | −4.67 |
| R3/f + R4/f | 1.55 | Y11/Y82 | 0.51 |
| R8/f | −1.12 | Yc11/Y11 | 0.30 |
| |f7/f8| | 0.01 | Yc82/Y82 | 0.39 |

4th Embodiment

Figure 7:
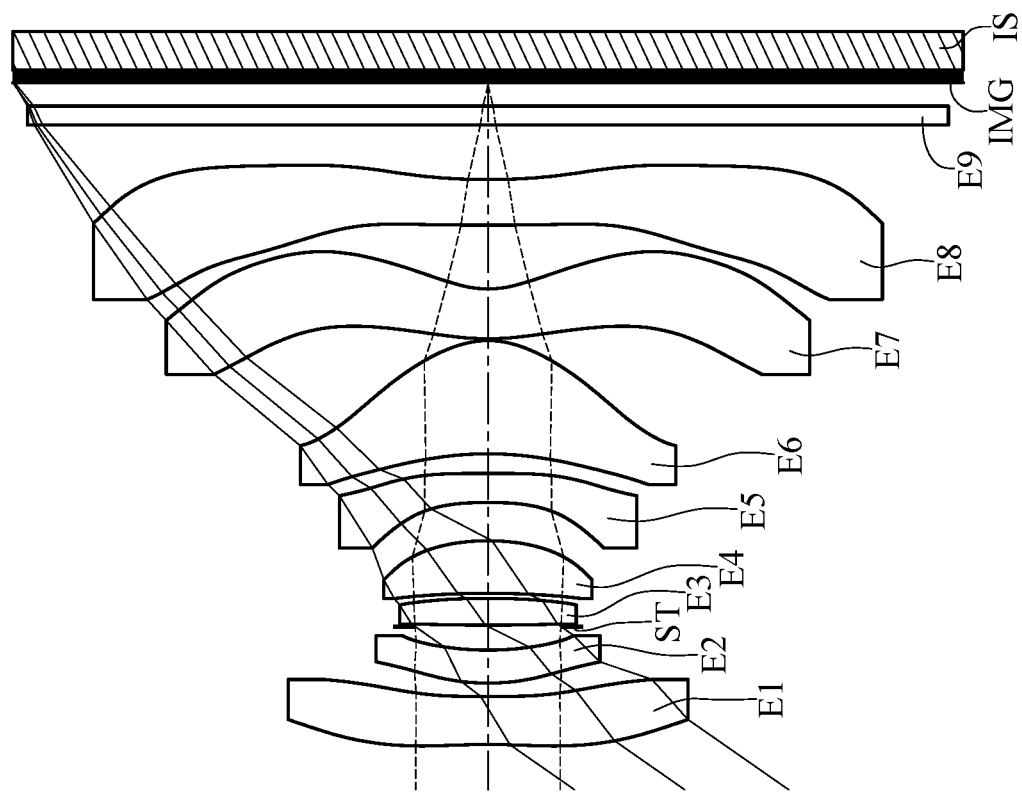
FIG. 7 is a schematic view of an image capturing unit according to the 4th embodiment of the present disclosure.
Figure 8:
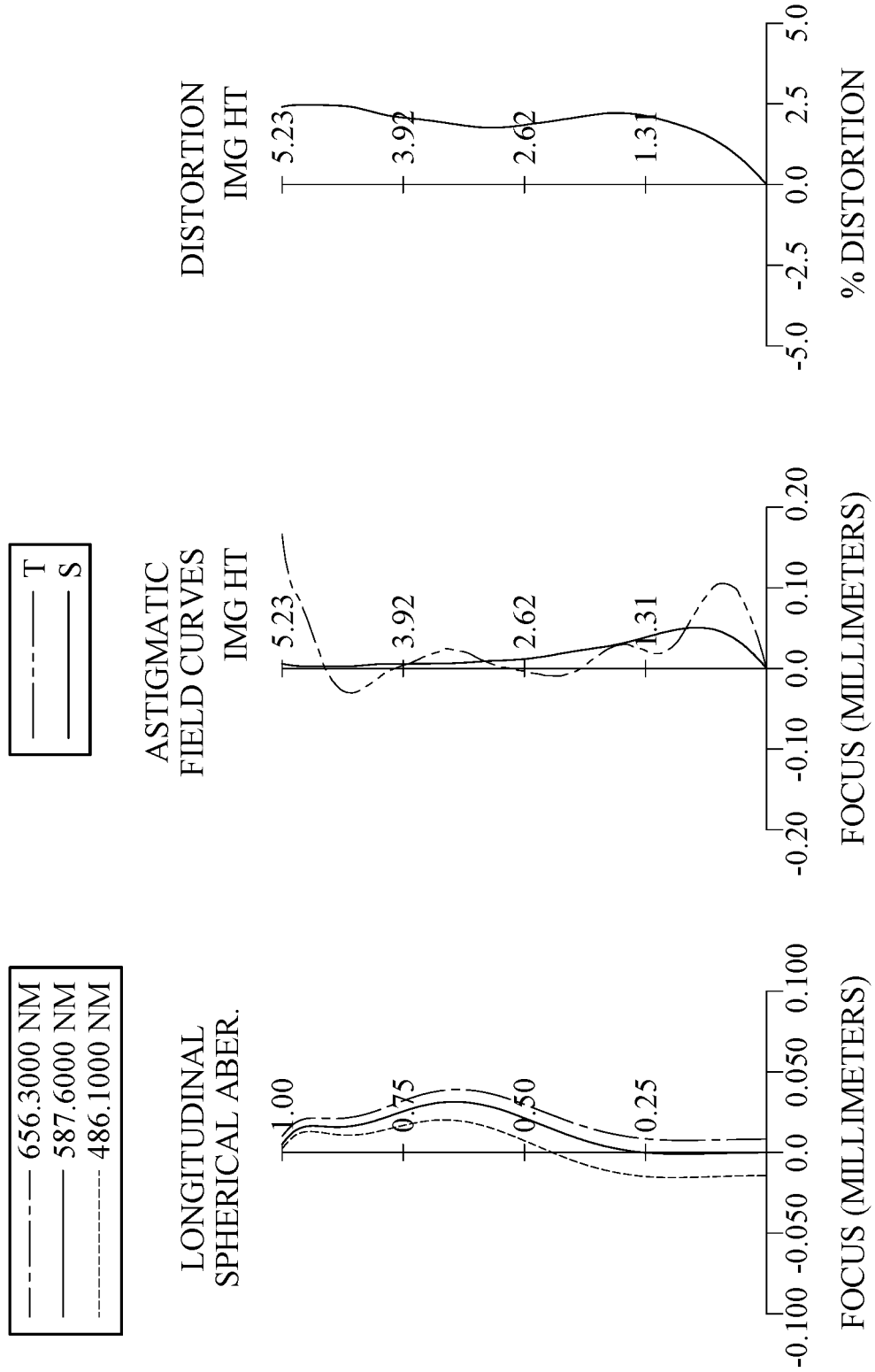
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the optical imaging lens assembly (its reference numeral is omitted) of the present disclosure and an image sensor IS. The optical imaging lens assembly includes, in order from an object side to an image side along an optical axis, a first lens element E1, a second lens element E2, an aperture stop ST, a third lens element E3, a fourth lens element E4, a fifth lens element E5, a sixth lens element E6, a seventh lens element E7, an eighth lens element E8, a filter E9 and an image surface IMG. The optical imaging lens assembly includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being convex in a paraxial region thereof. The first lens element E1 is made of plastic material and has the object-side surface and the image-side surface being both aspheric. The object-side surface of the first lens element E1 has one inflection point in an off-axis region thereof. The image-side surface of the first lens element E1 has three inflection points in an off-axis region thereof. The object-side surface of the first lens element E1 has one critical point in the off-axis region thereof. The image-side surface of the first lens element E1 has one critical point in the off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point in an off-axis region thereof.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has one inflection point in an off-axis region thereof.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The image-side surface of the fourth lens element E4 has one inflection point in an off-axis region thereof.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric. The image-side surface of the fifth lens element E5 has two inflection points in an off-axis region thereof.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point in an off-axis region thereof. The image-side surface of the sixth lens element E6 has one inflection point in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has three inflection points in an off-axis region thereof. The image-side surface of the seventh lens element E7 has one inflection point in an off-axis region thereof. The object-side surface of the seventh lens element E7 has one critical point in the off-axis region thereof. The image-side surface of the seventh lens element E7 has one critical point in the off-axis region thereof.

The eighth lens element E8 with negative refractive power has an object-side surface being concave in a paraxial region thereof and an image-side surface being concave in a paraxial region thereof. The eighth lens element E8 is made of plastic material and has the object-side surface and the image-side surface being both aspheric. The object-side surface of the eighth lens element E8 has five inflection points in an off-axis region thereof. The image-side surface of the eighth lens element E8 has two inflection points in an off-axis region thereof. The object-side surface of the eighth lens element E8 has two critical points in the off-axis region thereof. The image-side surface of the eighth lens element E8 has one critical point in the off-axis region thereof.

The filter E9 is made of glass material and located between the eighth lens element E8 and the image surface IMG, and will not affect the focal length of the optical imaging lens assembly. The image sensor IS is disposed on or near the image surface IMG of the optical imaging lens assembly.

The detailed optical data of the 4th embodiment are shown in Table 7 and the aspheric surface data are shown in Table 8 below.

TABLE 7

4th Embodiment
f = 3.56 mm, Fno = 2.24, HFOV = 55.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −6.7187 | (ASP) | 0.530 | Plastic | 1.545 | 56.1 | −14.06 |
| 2 | | −56.1227 | (ASP) | 0.146 | | | | |
| 3 | Lens 2 | 2.5048 | (ASP) | 0.364 | Plastic | 1.582 | 30.2 | 14.20 |
| 4 | | 3.4007 | (ASP) | 0.260 | | | | |
| 5 | Ape. Stop | Plano | | 0.015 | | | | |
| 6 | Lens 3 | 18.5333 | (ASP) | 0.296 | Plastic | 1.544 | 56.0 | 10.49 |
| 7 | | −8.1990 | (ASP) | 0.055 | | | | |

TABLE 7-continued

4th Embodiment
f = 3.56 mm, Fno = 2.24, HFOV = 55.0 deg.

| Surface # | | Curvature Radius | | Thickness | Material | Index | Abbe # | Focal Length |
|---|---|---|---|---|---|---|---|---|
| 8 | Lens 4 | −10.3459 | (ASP) | 0.579 | Plastic | 1.544 | 56.0 | 5.85 |
| 9 | | −2.4807 | (ASP) | 0.423 | | | | |
| 10 | Lens 5 | −4.2143 | (ASP) | 0.320 | Plastic | 1.660 | 20.4 | −6.55 |
| 11 | | −169.2470 | (ASP) | 0.216 | | | | |
| 12 | Lens 6 | −3.6540 | (ASP) | 1.248 | Plastic | 1.544 | 56.0 | 2.03 |
| 13 | | −0.9513 | (ASP) | 0.020 | | | | |
| 14 | Lens 7 | 2.7263 | (ASP) | 0.548 | Plastic | 1.566 | 37.4 | −3.07 |
| 15 | | 0.9834 | (ASP) | 0.706 | | | | |
| 16 | Lens 8 | −194.5028 | (ASP) | 0.502 | Plastic | 1.544 | 56.0 | −15.05 |
| 17 | | 8.5545 | (ASP) | 0.600 | | | | |
| 18 | Filter | Plano | | 0.210 | Glass | 1.517 | 64.2 | — |
| 19 | | Plano | | 0.256 | | | | |
| 20 | Image | Plano | | — | | | | |

Note:
Reference wavelength is 587.6 nm (d-line).

TABLE 8

Aspheric Coefficients

| Surface # | 1 | 2 | 3 | 4 |
|---|---|---|---|---|
| k = | 6.09010E+00 | 8.13986E+01 | −4.01731E+00 | 7.45038E+00 |
| A4 = | 1.08306736E−01 | 2.06469191E−01 | 1.15416546E−01 | −1.39293342E−02 |
| A6 = | −6.10839004E−02 | −2.37164009E−01 | −2.25398500E−01 | 2.10509288E−02 |
| A8 = | 3.05482699E−02 | 1.78568501E−01 | 1.68304985E−01 | −2.00809699E−01 |
| A10 = | −1.12646671E−02 | −9.60690450E−02 | −7.39997468E−02 | 4.67761248E−01 |
| A12 = | 2.87768607E−03 | 3.50253164E−02 | 1.96575591E−02 | −4.33933957E−01 |
| A14 = | −4.74913794E−04 | −8.06713155E−03 | −2.34707068E−03 | 1.61814135E−01 |
| A16 = | 4.46767066E−05 | 1.05163977E−03 | — | — |
| A18 = | −1.78152429E−06 | −5.88648021E−05 | — | — |

| Surface # | 6 | 7 | 8 | 9 |
|---|---|---|---|---|
| k = | 5.90463E+01 | 1.34161E+01 | −7.14790E+00 | −1.96557E+00 |
| A4 = | −2.29358374E−02 | −2.52876752E−02 | 6.67060950E−04 | −7.65987315E−02 |
| A6 = | 3.48778080E−02 | −4.80169861E−03 | −7.68327492E−02 | −7.42177019E−02 |
| A8 = | −1.26957164E−01 | 1.58150543E−01 | 3.29543838E−01 | −2.25523253E−03 |
| A10 = | 3.12293895E−01 | −4.03042510E−01 | −6.56270507E−01 | −5.30684558E−02 |
| A12 = | −3.38245567E−01 | 4.77977271E−01 | 6.36801852E−01 | 1.02265983E−01 |
| A14 = | 1.19203904E−01 | −2.24363660E−01 | −2.73625206E−01 | −9.02866400E−02 |
| A16 = | — | — | 3.30247255E−02 | 3.05160427E−02 |

| Surface # | 10 | 11 | 12 | 13 |
|---|---|---|---|---|
| k = | 0.00000E+00 | 0.00000E+00 | −8.58820E−01 | −3.43135E+00 |
| A4 = | −1.68831410E−01 | −1.22763368E−01 | −5.58657847E−03 | −8.30096360E−02 |
| A6 = | −1.84359232E−02 | 1.00470526E−01 | 7.48988430E−02 | 5.94993594E−04 |
| A8 = | 2.09474430E−01 | −1.22330605E−01 | −1.46182371E−01 | 6.17778891E−02 |
| A10 = | −5.08173024E−01 | 1.19972796E−01 | 1.55475174E−01 | −7.01507727E−02 |
| A12 = | 6.60287825E−01 | −7.27140546E−02 | −9.84697702E−02 | 4.06039316E−02 |
| A14 = | −4.62434233E−01 | 2.69139541E−02 | 3.86894772E−02 | −1.32412012E−02 |
| A16 = | 1.70547910E−01 | −5.56580544E−03 | −9.37741895E−03 | 2.44361621E−03 |
| A18 = | −2.65790085E−02 | 4.85299579E−04 | 1.29367067E−03 | −2.37534604E−04 |
| A20 = | — | — | −7.77891663E−05 | 9.41469940E−06 |

| Surface # | 14 | 15 | 16 | 17 |
|---|---|---|---|---|
| k = | −2.02179E+01 | −5.40613E+00 | −7.29074E+01 | −2.05484E+00 |
| A4 = | −2.19904917E−02 | −5.52689551E−02 | 4.76901185E−02 | 4.09436788E−02 |
| A6 = | −2.12526843E−03 | 2.67305057E−02 | −5.09013083E−02 | −3.48051424E−02 |
| A8 = | 6.52036086E−03 | −1.19344492E−02 | 2.04104747E−02 | 1.16405659E−02 |
| A10 = | −4.18686108E−03 | 3.97208529E−03 | −5.00334860E−03 | −2.33305706E−03 |
| A12 = | 1.43476394E−03 | −9.98563080E−04 | 8.47603839E−04 | 3.14426107E−04 |
| A14 = | −3.07344109E−04 | 1.82396637E−04 | −1.01724575E−04 | −2.97077285E−05 |
| A16 = | 4.38435356E−05 | −2.29878438E−05 | 8.55781206E−06 | 1.97670838E−06 |
| A18 = | −4.23970715E−06 | 1.90985891E−06 | −4.91681957E−07 | −9.06317233E−08 |
| A20 = | 2.71492165E−07 | −9.90412154E−08 | 1.83936039E−08 | 2.71933752E−09 |
| A22 = | −1.05106794E−08 | 2.89454273E−09 | −4.05215036E−10 | −4.79596206E−11 |
| A24 = | 1.86931062E−10 | −3.63411451E−11 | 4.00583204E−12 | 3.76496137E−13 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.56 | f/|R13| + f/|R14| | 4.93 |
| Fno | 2.24 | f/f1 | −0.25 |
| HFOV [deg.] | 55.0 | f/f2 | 0.25 |
| (V1 + V4 + V6 + V8)/(V2 + V3 + V5 + V7) | 1.56 | f/f3 | 0.34 |
| min(Vi/Ni) | 12.29 | f/f3 + f/f4 + f/f5 | 0.41 |
| (CT1 + CT2 + CT3 + CT4 + CT5 + CT6)/(CT7 + CT8) | 3.18 | f/f4 | 0.61 |
| (CT2 + CT4)/CT3 | 3.19 | f/f5 | −0.54 |
| (T12 + T34)/T23 | 0.73 | f/f6 | 1.75 |
| (T45 + T56)/CT5 | 2.00 | f/f6 + f/f7 + f/f8 | 0.35 |
| (T67 + T78)/|T67 − T78| | 1.06 | f/f6 − f/f7 | 2.91 |
| T45/T56 | 1.96 | f/f7 | −1.16 |
| TL/EPD | 4.59 | f/f8 | −0.24 |
| TL/f | 2.05 | f1/CT1 | −26.53 |
| TL/ImgH | 1.39 | f1/f7 | 4.59 |
| R1/R16 | −0.79 | f12/f | −342.61 |
| R12/f | −0.27 | f7/CT7 | −5.59 |
| R3/f + R4/f | 1.66 | Y11/Y82 | 0.51 |
| R8/f | −0.70 | Yc11/Y11 | 0.33 |
| |f7/f8| | 0.20 | Yc82/Y82 | 0.46 |

5th Embodiment

Figure 9:
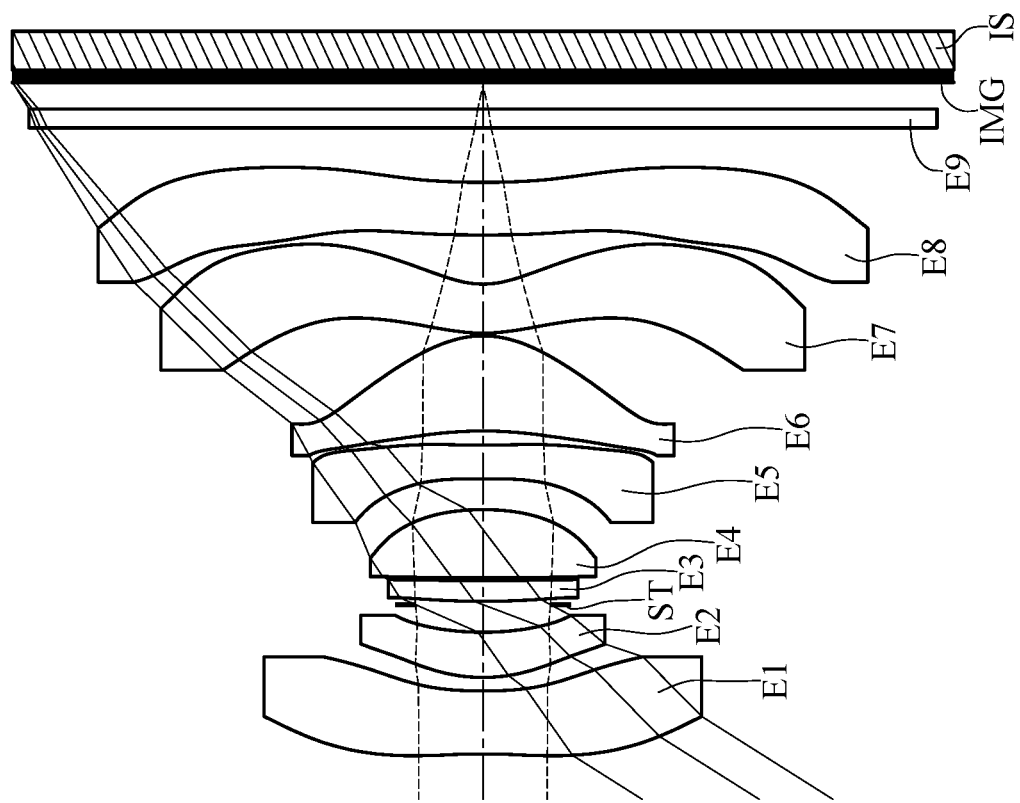
FIG. 9 is a schematic view of an image capturing unit according to the 5th embodiment of the present disclosure.
Figure 10:
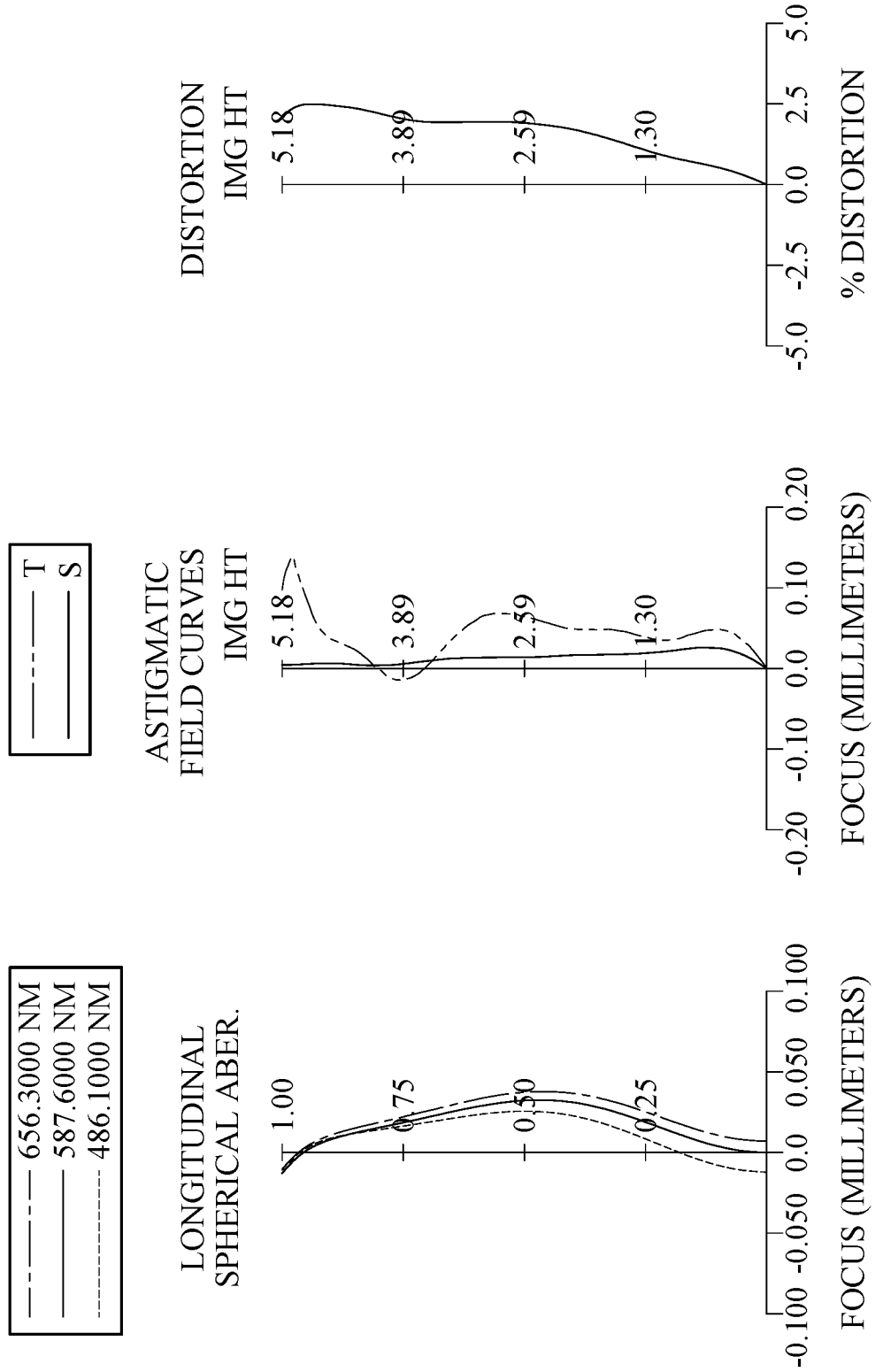
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the optical imaging lens assembly (its reference numeral is omitted) of the present disclosure and an image sensor IS. The optical imaging lens assembly includes, in order from an object side to an image side along an optical axis, a first lens element E1, a second lens element E2, an aperture stop ST, a third lens element E3, a fourth lens element E4, a fifth lens element E5, a sixth lens element E6, a seventh lens element E7, an eighth lens element E8, a filter E9 and an image surface IMG. The optical imaging lens assembly includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points in an off-axis region thereof. The image-side surface of the first lens element E1 has one inflection point in an off-axis region thereof. The object-side surface of the first lens element E1 has one critical point in the off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has three inflection points in an off-axis region thereof.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points in an off-axis region thereof. The image-side surface of the third lens element E3 has two inflection points in an off-axis region thereof.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has one inflection point in an off-axis region thereof.

The fifth lens element E5 with negative refractive power has an object-side surface being concave in a paraxial region thereof and an image-side surface being concave in a paraxial region thereof. The fifth lens element E5 is made of plastic material and has the object-side surface and the image-side surface being both aspheric. The image-side surface of the fifth lens element E5 has three inflection points in an off-axis region thereof. The image-side surface of the fifth lens element E5 has one critical point in the off-axis region thereof.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has two inflection points in an off-axis region thereof. The image-side surface of the sixth lens element E6 has two inflection points in an off-axis region thereof. The image-side surface of the sixth lens element E6 has one critical point in the off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point in an off-axis region thereof. The image-side surface of the seventh lens element E7 has two inflection points in an off-axis region thereof. The object-side surface of the seventh lens element E7 has one critical point in the off-axis region thereof. The image-side surface of the seventh lens element E7 has one critical point in the off-axis region thereof.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has four inflection points in an off-axis region thereof. The image-side surface of the eighth lens element E8 has two inflection points in an off-axis region thereof. The object-side surface of the eighth lens element E8 has one critical point in the off-axis region thereof. The image-side surface of the eighth lens element E8 has one critical point in the off-axis region thereof.

The filter E9 is made of glass material and located between the eighth lens element E8 and the image surface IMG, and will not affect the focal length of the optical imaging lens assembly. The image sensor IS is disposed on or near the image surface IMG of the optical imaging lens assembly.

The detailed optical data of the 5th embodiment are shown in Table 9 and the aspheric surface data are shown in Table 10 below.

TABLE 9

5th Embodiment
f = 3.20 mm, Fno = 2.26, HFOV = 57.7 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | −6.1080 | (ASP) | 0.694 | Plastic | 1.545 | 56.1 | −5.61 |
| 2 |  | 6.3595 | (ASP) | 0.149 |  |  |  |  |
| 3 | Lens 2 | 1.8954 | (ASP) | 0.498 | Plastic | 1.562 | 44.6 | 7.32 |
| 4 |  | 3.1846 | (ASP) | 0.305 |  |  |  |  |
| 5 | Ape. Stop | Plano |  | 0.036 |  |  |  |  |
| 6 | Lens 3 | 8.4093 | (ASP) | 0.230 | Plastic | 1.562 | 44.6 | 17.80 |
| 7 |  | 52.2861 | (ASP) | 0.030 |  |  |  |  |
| 8 | Lens 4 | 43.9798 | (ASP) | 0.751 | Plastic | 1.544 | 56.0 | 4.70 |
| 9 |  | −2.7014 | (ASP) | 0.340 |  |  |  |  |
| 10 | Lens 5 | −21.6194 | (ASP) | 0.370 | Plastic | 1.669 | 19.5 | −8.05 |
| 11 |  | 7.2253 | (ASP) | 0.157 |  |  |  |  |
| 12 | Lens 6 | −4.2367 | (ASP) | 1.048 | Plastic | 1.544 | 56.0 | 2.45 |
| 13 |  | −1.1027 | (ASP) | 0.030 |  |  |  |  |
| 14 | Lens 7 | 1.8148 | (ASP) | 0.540 | Plastic | 1.614 | 25.6 | −3.94 |
| 15 |  | 0.9201 | (ASP) | 0.543 |  |  |  |  |
| 16 | Lens 8 | 23.3371 | (ASP) | 0.580 | Plastic | 1.544 | 56.0 | −34.85 |
| 17 |  | 10.3690 | (ASP) | 0.600 |  |  |  |  |
| 18 | Filter | Plano |  | 0.210 | Glass | 1.517 | 64.2 | — |
| 19 |  | Plano |  | 0.291 |  |  |  |  |
| 20 | Image | Plano |  | — |  |  |  |  |

Note:
Reference wavelength is 587.6 nm (d-line).

TABLE 10

Aspheric Coefficients

| Surface # | 1 | 2 | 3 | 4 |
|---|---|---|---|---|
| k = | 4.46305E+00 | −2.72442E+01 | −2.97640E+00 | 5.83620E+00 |
| A4 = | 1.10148526E−01 | 2.14548020E−01 | 1.13079099E−01 | 1.42865151E−02 |
| A6 = | −6.02085798E−02 | −2.27490542E−01 | −1.86827155E−01 | −1.03994558E−01 |
| A8 = | 2.90027872E−02 | 1.62506220E−01 | 1.46184500E−01 | 2.91820958E−01 |
| A10 = | −1.01067626E−02 | −8.82105977E−02 | −9.88977540E−02 | −4.81555289E−01 |
| A12 = | 2.40975654E−03 | 3.21323316E−02 | 4.57849168E−02 | 4.25878499E−01 |
| A14 = | −3.67253576E−04 | −6.94334163E−03 | −8.60334615E−03 | −1.37131863E−01 |
| A16 = | 3.19186753E−05 | 7.75780389E−04 | — | — |
| A18 = | −1.19430056E−06 | −3.30263381E−05 | — | — |

| Surface # | 6 | 7 | 8 | 9 |
|---|---|---|---|---|
| k = | 3.96129E+01 | 3.65890E+01 | −9.00000E+01 | −9.84639E−01 |
| A4 = | −1.02982824E−02 | −2.91545516E−04 | 1.67273369E−03 | −1.06644218E−01 |
| A6 = | −3.77065842E−02 | −4.12663888E−02 | −5.61849083E−02 | 5.00329615E−02 |
| A8 = | 1.10343518E−01 | 1.96161501E−01 | 2.17341828E−01 | −5.58959644E−02 |
| A10 = | −1.96476445E−01 | −3.25375790E−01 | −3.43100542E−01 | 2.74951239E−02 |
| A12 = | 1.13597669E−01 | 2.25426195E−01 | 2.44592871E−01 | −4.91631068E−03 |
| A14 = | −2.59113007E−04 | −5.46371866E−02 | −6.47748404E−02 | −9.83746711E−03 |
| A16 = | — | — | — | 5.17686511E−03 |

| Surface # | 10 | 11 | 12 | 13 |
|---|---|---|---|---|
| k = | 0.00000E+00 | 0.00000E+00 | −1.07026E+00 | −4.07406E+00 |
| A4 = | −2.13201203E−01 | −1.85911359E−01 | 5.21648661E−03 | −2.05200165E−01 |
| A6 = | 9.42746465E−02 | 1.93292021E−01 | 3.52449221E−02 | 3.18873741E−01 |
| A8 = | 2.91677111E−02 | −1.55150581E−01 | 5.55449411E−04 | −3.61902059E−01 |
| A10 = | −1.24185256E−01 | 9.32317244E−02 | −4.53814534E−02 | 2.90514740E−01 |
| A12 = | 1.65606357E−01 | −3.71376078E−02 | 4.13140445E−02 | −1.58279993E−01 |
| A14 = | −1.23280111E−01 | 8.97193984E−03 | −1.73072226E−02 | 5.70403837E−02 |
| A16 = | 4.57242216E−02 | −1.18029132E−03 | 3.89735962E−03 | −1.32503484E−02 |

TABLE 10-continued

| Aspheric Coefficients | | | | |
|---|---|---|---|---|
| A18 = | −6.56606757E−03 | 6.32844451E−05 | −4.57342931E−04 | 1.90230547E−03 |
| A20 = | — | — | 2.18586640E−05 | −1.53555723E−04 |
| A22 = | — | — | — | 5.33463382E−06 |

| Surface # | 14 | 15 | 16 | 17 |
|---|---|---|---|---|
| k = | −1.17596E+01 | −4.41003E+00 | 2.58995E+01 | 4.85849E−02 |
| A4 = | −7.38436347E−02 | −7.82830452E−02 | 4.98830990E−02 | 3.81042712E−02 |
| A6 = | 6.06390562E−02 | 4.19262385E−02 | −5.07448244E−02 | −2.84206634E−02 |
| A8 = | −4.96003325E−02 | −1.88817373E−02 | 1.95578305E−02 | 8.71379783E−03 |
| A10 = | 3.13808732E−02 | 6.55937426E−03 | −4.49748661E−03 | −1.58488465E−03 |
| A12 = | −1.43477291E−02 | −1.76281938E−03 | 7.02931146E−04 | 1.88690966E−04 |
| A14 = | 4.54751361E−03 | 3.56695599E−04 | −7.75921649E−05 | −1.54375965E−05 |
| A16 = | −9.86578099E−04 | −5.20376066E−05 | 6.01610143E−06 | 8.89874462E−07 |
| A18 = | 1.45553670E−04 | 5.27970483E−06 | −3.18501296E−07 | −3.62635086E−08 |
| A20 = | −1.43425548E−05 | −3.60092933E−07 | 1.09257821E−08 | 1.01140034E−09 |
| A22 = | 9.02645820E−07 | 1.56869829E−08 | −2.18712722E−10 | −1.74253049E−11 |
| A24 = | −3.27712872E−08 | −3.93735130E−10 | 1.94132749E−12 | 1.39126284E−13 |
| A26 = | 5.21164568E−10 | 4.32916551E−12 | — | — |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.20 | f/|R13| + f/|R14| | 5.24 |
| Fno | 2.26 | f/f1 | −0.57 |
| HFOV [deg.] | 57.7 | f/f2 | 0.44 |
| (V1 + V4 + V6 + V8)/(V2 + V3 + V5 + V7) | 1.67 | f/f3 | 0.18 |
| min(Vi/Ni) | 11.65 | f/f3 + f/f4 + f/f5 | 0.46 |
| (CT1 + CT2 + CT3 + CT4 + CT5 + CT6)/(CT7 + CT8) | 3.21 | f/f4 | 0.68 |
| (CT2 + CT4)/CT3 | 5.43 | f/f5 | −0.40 |
| (T12 + T34)/T23 | 0.52 | f/f6 | 1.31 |
| (T45 + T56)/CT5 | 1.34 | f/f6 + f/f7 + f/f8 | 0.40 |
| (T67 + T78)/|T67 − T78| | 1.12 | f/f6 − f/f7 | 2.12 |
| T45/T56 | 2.17 | f/f7 | −0.81 |
| TL/EPD | 5.23 | f/f8 | −0.09 |
| TL/f | 2.31 | f1/CT1 | −8.08 |
| TL/ImgH | 1.43 | f1/f7 | 1.42 |
| R1/R16 | −0.59 | f12/f | −7.34 |
| R12/f | −0.34 | f7/CT7 | −7.30 |
| R3/f + R4/f | 1.59 | Y11/Y82 | 0.57 |
| R8/f | −0.84 | Yc11/Y11 | 0.32 |
| |f7/f8| | 0.11 | Yc82/Y82 | 0.52 |

6th Embodiment

Figure 11:
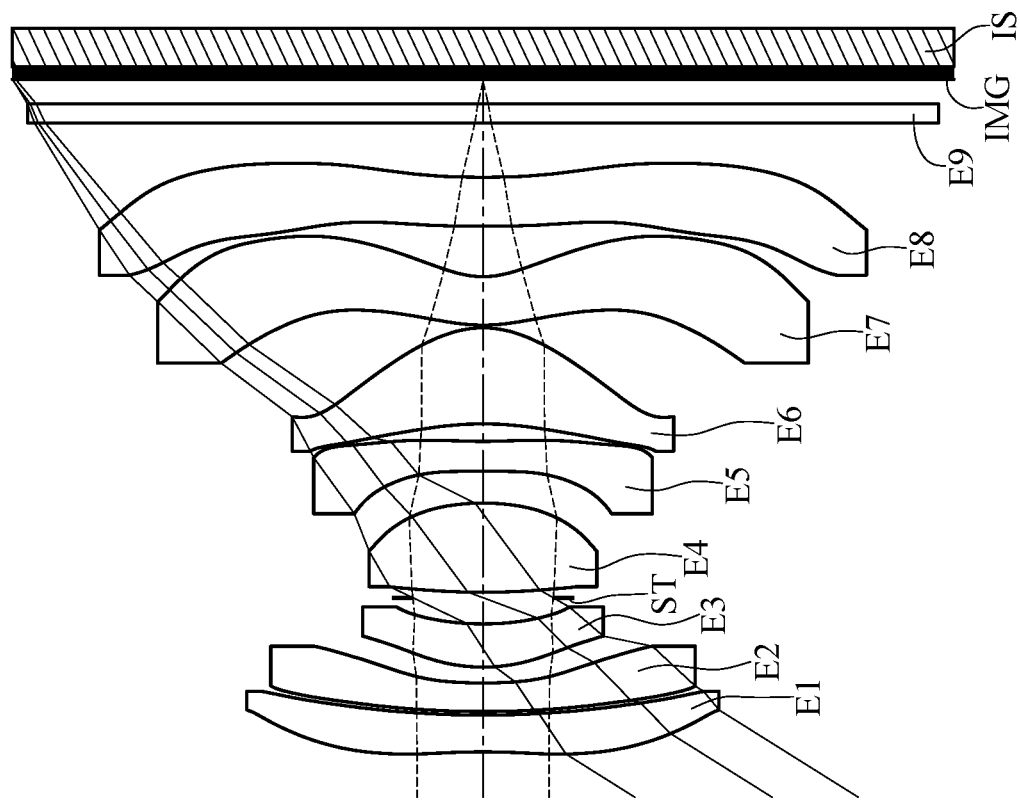
FIG. 11 is a schematic view of an image capturing unit according to the 6th embodiment of the present disclosure.
Figure 12:
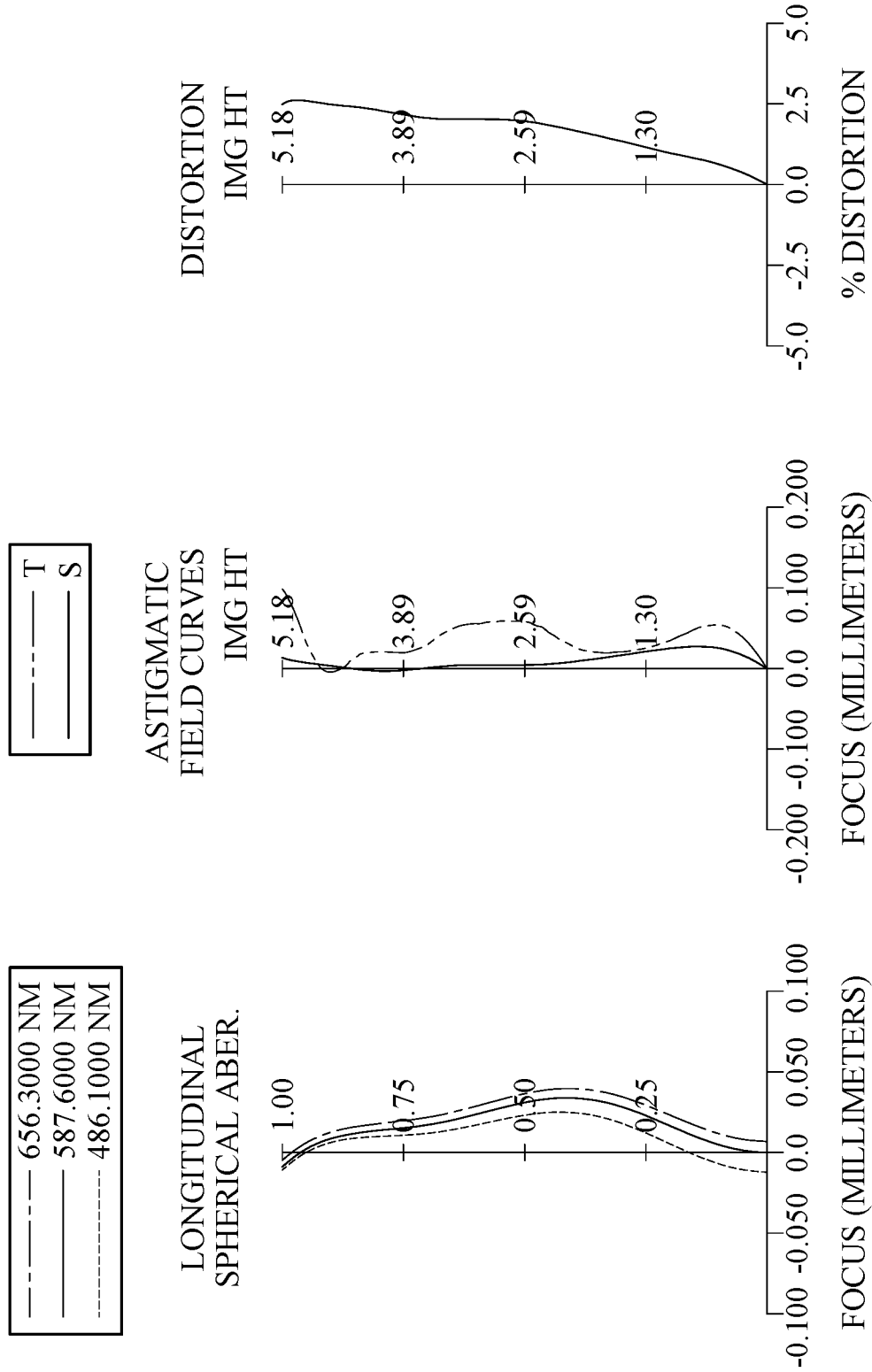
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the optical imaging lens assembly (its reference numeral is omitted) of the present disclosure and an image sensor IS. The optical imaging lens assembly includes, in order from an object side to an image side along an optical axis, a first lens element E1, a second lens element E2, a third lens element E3, an aperture stop ST, a fourth lens element E4, a fifth lens element E5, a sixth lens element E6, a seventh lens element E7, an eighth lens element E8, a filter E9 and an image surface IMG. The optical imaging lens assembly includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has two inflection points in an off-axis region thereof. The image-side surface of the first lens element E1 has two inflection points in an off-axis region thereof. The object-side surface of the first lens element E1 has one critical point in the off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The image-side surface of the second lens element E2 has three inflection points in an off-axis region thereof.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point in an off-axis region thereof.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The image-side surface of the fourth lens element E4 has one inflection point in an off-axis region thereof.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point in an off-axis region thereof. The image-side surface of the fifth lens element E5 has three inflection points in an off-axis region thereof. The object-side surface of the fifth lens element E5 has one critical point in the off-axis region thereof. The image-side surface of the fifth lens element E5 has one critical point in the off-axis region thereof.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has two inflection points in an off-axis region thereof. The image-side surface of the sixth lens element E6 has two inflection points in an off-axis region thereof. The image-side surface of the sixth lens element E6 has one critical point in the off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has two inflection points in an off-axis region thereof. The image-side surface of the seventh lens element E7 has two inflection points in an off-axis region thereof. The object-side surface of the seventh lens element E7 has one critical point in the off-axis region thereof. The image-side surface of the seventh lens element E7 has one critical point in the off-axis region thereof.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has four inflection points in an off-axis region thereof. The image-side surface of the eighth lens element E8 has two inflection points in an off-axis region thereof. The object-side surface of the eighth lens element E8 has one critical point in the off-axis region thereof. The image-side surface of the eighth lens element E8 has one critical point in the off-axis region thereof.

The filter E9 is made of glass material and located between the eighth lens element E8 and the image surface IMG, and will not affect the focal length of the optical imaging lens assembly. The image sensor IS is disposed on or near the image surface IMG of the optical imaging lens assembly.

The detailed optical data of the 6th embodiment are shown in Table 11 and the aspheric surface data are shown in Table 12 below.

TABLE 11

6th Embodiment
f = 3.17 mm, Fno = 2.18, HFOV = 57.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −6.0623 | (ASP) | 0.405 | Plastic | 1.545 | 56.1 | −7.18 |
| 2 | | 11.2758 | (ASP) | 0.039 | | | | |
| 3 | Lens 2 | 10.8486 | (ASP) | 0.315 | Plastic | 1.544 | 56.0 | −40.67 |
| 4 | | 7.2047 | (ASP) | 0.175 | | | | |
| 5 | Lens 3 | 1.9866 | (ASP) | 0.476 | Plastic | 1.562 | 44.6 | 8.39 |
| 6 | | 3.1384 | (ASP) | 0.288 | | | | |
| 7 | Ape. Stop | Plano | | 0.061 | | | | |
| 8 | Lens 4 | 7.9435 | (ASP) | 0.983 | Plastic | 1.544 | 56.0 | 3.71 |
| 9 | | −2.5878 | (ASP) | 0.350 | | | | |
| 10 | Lens 5 | 120.5679 | (ASP) | 0.330 | Plastic | 1.669 | 19.5 | −9.48 |
| 11 | | 6.0186 | (ASP) | 0.193 | | | | |
| 12 | Lens 6 | −3.6018 | (ASP) | 1.059 | Plastic | 1.544 | 56.0 | 2.43 |
| 13 | | −1.0687 | (ASP) | 0.030 | | | | |
| 14 | Lens 7 | 1.9004 | (ASP) | 0.533 | Plastic | 1.614 | 25.6 | −3.65 |
| 15 | | 0.9188 | (ASP) | 0.557 | | | | |
| 16 | Lens 8 | 23.3347 | (ASP) | 0.540 | Plastic | 1.544 | 56.0 | −35.76 |
| 17 | | 10.5234 | (ASP) | 0.600 | | | | |
| 18 | Filter | Plano | | 0.210 | Glass | 1.517 | 64.2 | — |
| 19 | | Plano | | 0.270 | | | | |
| 20 | Image | Plano | | — | | | | |

Note:
Reference wavelength is 587.6 nm (d-line).

TABLE 12

Aspheric Coefficients

| Surface # | 1 | 2 | 3 | 4 |
|---|---|---|---|---|
| k = | 3.21637E+00 | 0.00000E+00 | 0.00000E+00 | −1.94717E+01 |
| A4 = | 9.48280808E−02 | −7.86665859E−04 | 1.77625208E−03 | 1.98615911E−01 |
| A6 = | −4.77547394E−02 | −2.07516562E−03 | −3.70370701E−03 | −1.97674962E−01 |
| A8 = | 2.15124837E−02 | 3.99465713E−03 | 5.30270573E−03 | 1.41652019E−01 |

TABLE 12-continued

Aspheric Coefficients

| | | | | |
|---|---|---|---|---|
| A10 = | −7.10507575E−03 | −2.34153439E−03 | −3.45763529E−03 | −8.33487624E−02 |
| A12 = | 1.62382678E−03 | 6.19815579E−04 | 1.06274959E−03 | 3.32820473E−02 |
| A14 = | −2.39359644E−04 | −7.69984441E−05 | −1.54286412E−04 | −7.75924537E−03 |
| A16 = | 2.02283241E−05 | 3.65523794E−06 | 8.61230768E−06 | 9.25604352E−04 |
| A18 = | −7.37783638E−07 | — | — | −4.22354743E−05 |

| Surface # | 5 | 6 | 8 | 9 |
|---|---|---|---|---|
| k = | −2.89794E+00 | 5.59959E+00 | 3.81624E+01 | −1.51386E+00 |
| A4 = | 1.21517035E−01 | 1.80518872E−02 | −1.27545785E−02 | −8.57772033E−02 |
| A6 = | −2.08608812E−01 | −1.04649520E−01 | −1.34135102E−02 | −3.07208848E−02 |
| A8 = | 2.03030317E−01 | 3.21475383E−01 | 3.74363074E−02 | 1.56116272E−01 |
| A10 = | −1.73619932E−01 | −5.81414469E−01 | −9.85281618E−02 | −3.14979843E−01 |
| A12 = | 8.79182608E−02 | 5.36064721E−01 | 9.73650748E−02 | 3.18668083E−01 |
| A14 = | −1.72413126E−02 | −1.72104772E−01 | −3.07029875E−02 | −1.69277086E−01 |
| A16 = | — | — | — | 3.68404993E−02 |

| Surface # | 10 | 11 | 12 | 13 |
|---|---|---|---|---|
| k = | 0.00000E+00 | 0.00000E+00 | −1.66881E+00 | −4.02869E+00 |
| A4 = | −2.25989652E−01 | −1.90168514E−01 | 1.76245879E−02 | −1.68428536E−01 |
| A6 = | 2.07905197E−01 | 2.16199593E−01 | −7.74610615E−03 | 2.34090722E−01 |
| A8 = | −3.04239204E−01 | −2.05719381E−01 | 6.80265610E−02 | −2.66116193E−01 |
| A10 = | 3.55529988E−01 | 1.41172212E−01 | −1.03324957E−01 | 2.19451919E−01 |
| A12 = | −2.45202768E−01 | −6.15816761E−02 | 7.09384185E−02 | −1.21157041E−01 |
| A14 = | 9.33877597E−02 | 1.60559344E−02 | −2.64263204E−02 | 4.36540927E−02 |
| A16 = | −1.89746631E−02 | −2.28479526E−03 | 5.52501927E−03 | −1.00713472E−02 |
| A18 = | 1.67433160E−03 | 1.35149687E−04 | −6.07912294E−04 | 1.43515865E−03 |
| A20 = | — | — | 2.70976863E−05 | −1.15454229E−04 |
| A22 = | — | — | — | 4.02748604E−06 |

| Surface # | 14 | 15 | 16 | 17 |
|---|---|---|---|---|
| k = | −1.16391E+01 | −4.34413E+00 | 2.48966E+01 | −9.87701E−02 |
| A4 = | −5.05813494E−02 | −7.81566841E−02 | 4.93709413E−02 | 3.88573626E−02 |
| A6 = | 1.00268478E−02 | 3.76203225E−02 | −4.98227816E−02 | −2.91274984E−02 |
| A8 = | 1.43504340E−03 | −1.42111528E−02 | 1.88863794E−02 | 8.82204532E−03 |
| A10 = | 6.61084702E−04 | 4.19471480E−03 | −4.23158360E−03 | −1.55048730E−03 |
| A12 = | −2.16226941E−03 | −1.03751195E−03 | 6.39148397E−04 | 1.71638143E−04 |
| A14 = | 1.22148812E−03 | 2.09862068E−04 | −6.78187353E−05 | −1.22212667E−05 |
| A16 = | −3.52069901E−04 | −3.17887465E−05 | 5.03782708E−06 | 5.47811419E−07 |
| A18 = | 6.11760819E−05 | 3.36689964E−06 | −2.54801560E−07 | −1.41685923E−08 |
| A20 = | −6.68095726E−06 | −2.38210008E−07 | 8.32539131E−09 | 1.51119292E−10 |
| A22 = | 4.49709460E−07 | 1.06732174E−08 | −1.58275973E−10 | 1.17756833E−12 |
| A24 = | −1.70509774E−08 | −2.73322975E−10 | 1.33128991E−12 | −3.27453148E−14 |
| A26 = | 2.78078284E−10 | 3.04457558E−12 | — | — |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | |
|---|---|
| f [mm] | 3.17 |
| Fno | 2.18 |
| HFOV [deg.] | 57.9 |
| (V1 + V4 + V6 + V8)/(V2 + V3 + V5 + V7) | 1.54 |
| min(Vi/Ni) | 11.65 |
| (CT1 + CT2 + CT3 + CT4 + CT5 + CT6)/(CT7 + CT8) | 3.33 |
| (CT2 + CT4)/CT3 | 2.73 |
| (T12 + T34)/T23 | 2.22 |
| (T45 + T56)/CT5 | 1.65 |
| (T67 + T78)/|T67 − T78| | 1.11 |
| f/|R13| + f/|R14| | 5.11 |
| f/f1 | −0.44 |
| f/f2 | −0.08 |
| f/f3 | 0.38 |
| f/f4 | 0.85 |
| f/f5 | −0.33 |
| f/f6 | 1.30 |
| f/f6 + f/f7 + f/f8 | 0.34 |
| f/f6 − f/f7 | 2.17 |

| 6th Embodiment | |
|---|---|
| T45/T56 | 1.81 |
| TL/EPD | 5.11 |
| TL/f | 2.34 |
| TL/ImgH | 1.43 |
| R1/R16 | −0.58 |
| R12/f | −0.34 |
| R3/f + R4/f | 5.70 |
| R8/f | −0.82 |
| |f7/f8| | 0.10 |
| f/f7 | −0.87 |
| f/f8 | −0.09 |
| f1/CT1 | −17.72 |
| f1/f7 | 1.97 |
| f2/f | −1.89 |
| f7/CT7 | −6.85 |
| Y11/Y82 | 0.62 |
| Yc11/Y11 | 0.33 |
| Yc82/Y82 | 0.49 |

7th Embodiment

Figure 13:
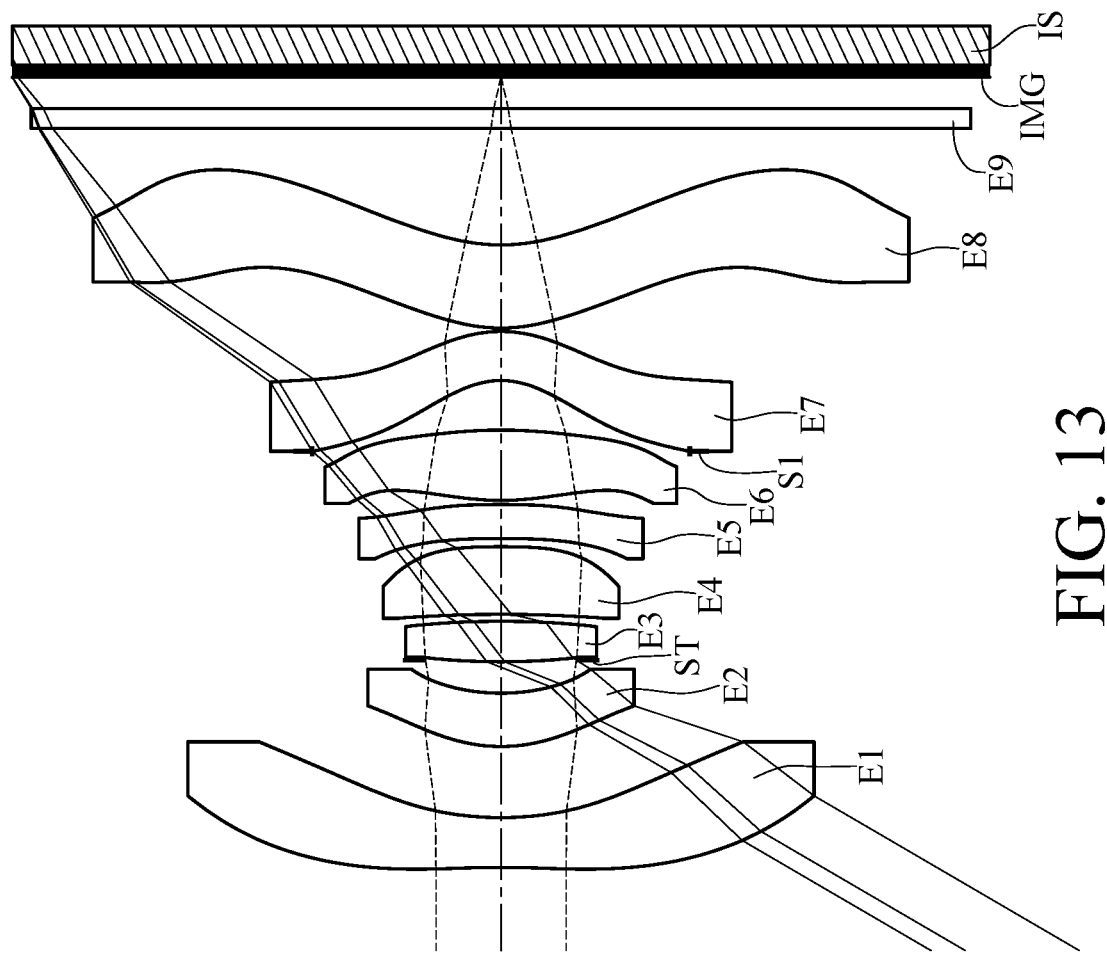
FIG. 13 is a schematic view of an image capturing unit according to the 7th embodiment of the present disclosure.
Figure 14:
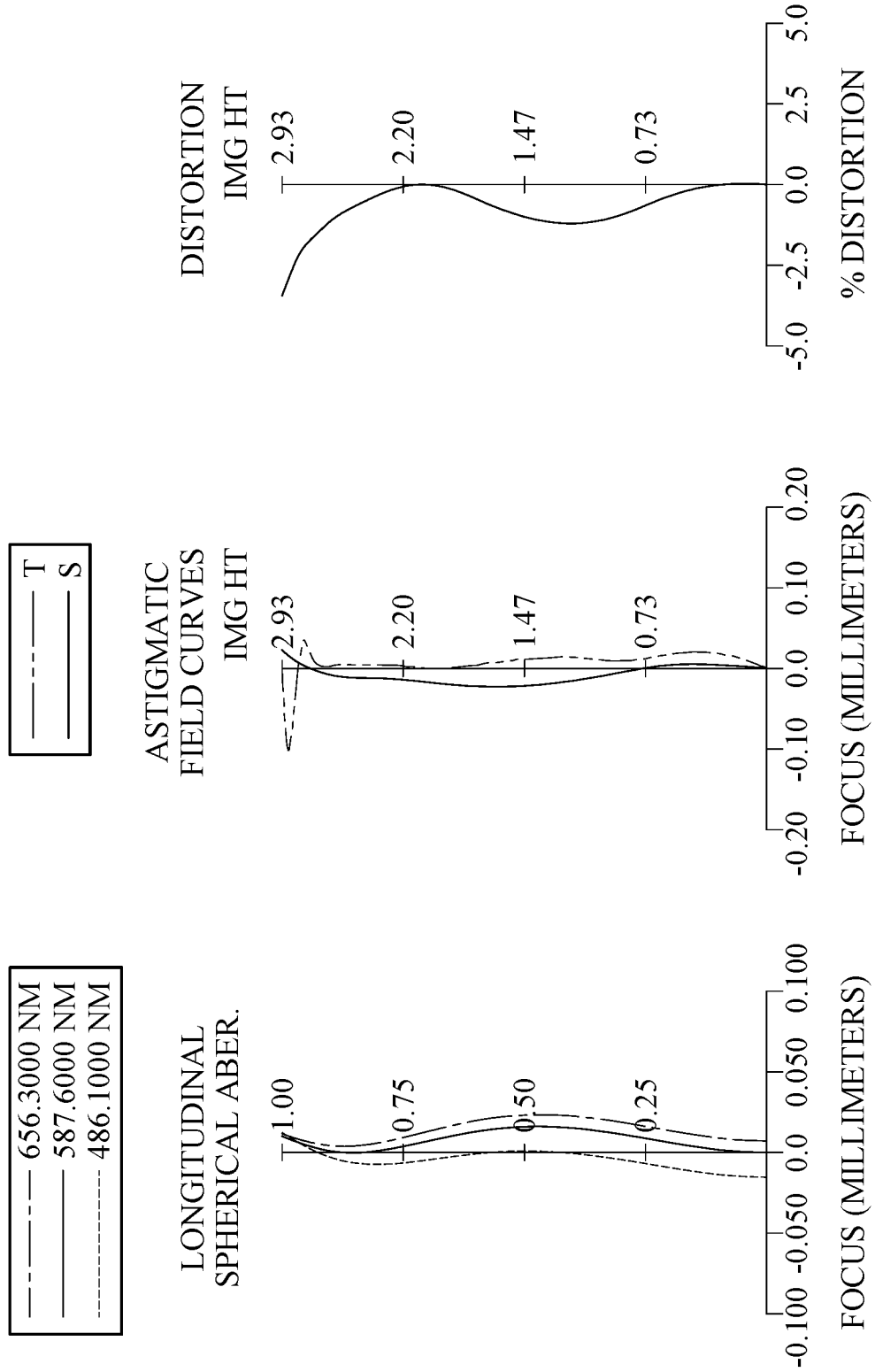
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the optical imaging lens assembly (its reference numeral is omitted) of the present disclosure and an image sensor IS. The optical imaging lens assembly includes, in order from an object side to an image side along an optical axis, a first lens element E1, a second lens element E2, an aperture stop ST, a third lens element E3, a fourth lens element E4, a fifth lens element E5, a sixth lens element E6, a stop S1, a seventh lens element E7, an eighth lens element E8, a filter E9 and an image surface IMG. The optical imaging lens assembly includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has one inflection point in an off-axis region thereof. The image-side surface of the first lens element E1 has two inflection points in an off-axis region thereof. The object-side surface of the first lens element E1 has one critical point in the off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point in an off-axis region thereof.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The image-side surface of the fifth lens element E5 has two inflection points in an off-axis region thereof.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point in an off-axis region thereof. The image-side surface of the sixth lens element E6 has one inflection point in an off-axis region thereof. The object-side surface of the sixth lens element E6 has one critical point in the off-axis region thereof.

The seventh lens element E7 with negative refractive power has an object-side surface being concave in a paraxial region thereof and an image-side surface being convex in a paraxial region thereof. The seventh lens element E7 is made of plastic material and has the object-side surface and the image-side surface being both aspheric. The object-side surface of the seventh lens element E7 has one inflection point in an off-axis region thereof. The image-side surface of the seventh lens element E7 has two inflection points in an off-axis region thereof.

The eighth lens element E8 with positive refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has two inflection points in an off-axis region thereof. The image-side surface of the eighth lens element E8 has three inflection points in an off-axis region thereof. The object-side surface of the eighth lens element E8 has two critical points in the off-axis region thereof. The image-side surface of the eighth lens element E8 has one critical point in the off-axis region thereof.

The filter E9 is made of glass material and located between the eighth lens element E8 and the image surface IMG, and will not affect the focal length of the optical imaging lens assembly. The image sensor IS is disposed on or near the image surface IMG of the optical imaging lens assembly.

The detailed optical data of the 7th embodiment are shown in Table 13 and the aspheric surface data are shown in Table 14 below.

TABLE 13

7th Embodiment
f = 1.77 mm, Fno = 2.27, HFOV = 59.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −5.6155 | (ASP) | 0.300 | Plastic | 1.529 | 58.0 | −2.83 |
| 2 | | 2.0743 | (ASP) | 0.427 | | | | |
| 3 | Lens 2 | 0.9749 | (ASP) | 0.321 | Plastic | 1.587 | 28.3 | 5.19 |
| 4 | | 1.2590 | (ASP) | 0.198 | | | | |
| 5 | Ape. Stop | Plano | | −0.009 | | | | |
| 6 | Lens 3 | 4.3560 | (ASP) | 0.243 | Plastic | 1.529 | 58.0 | 4.98 |
| 7 | | −6.5418 | (ASP) | 0.042 | | | | |
| 8 | Lens 4 | −10.4970 | (ASP) | 0.407 | Plastic | 1.529 | 58.0 | 14.87 |
| 9 | | −4.5574 | (ASP) | 0.049 | | | | |
| 10 | Lens 5 | −5.6666 | (ASP) | 0.205 | Plastic | 1.686 | 18.4 | 61.62 |
| 11 | | −5.0704 | (ASP) | 0.024 | | | | |
| 12 | Lens 6 | 1.5614 | (ASP) | 0.423 | Plastic | 1.529 | 58.0 | 1.95 |
| 13 | | −2.7580 | (ASP) | −0.127 | | | | |
| 14 | Stop | Plano | | 0.425 | | | | |
| 15 | Lens 7 | −0.4793 | (ASP) | 0.295 | Plastic | 1.701 | 14.9 | −3.25 |

TABLE 13-continued

7th Embodiment
f = 1.77 mm, Fno = 2.27, HFOV = 59.7 deg.

| Surface # | | Curvature Radius | | Thickness | Material | Index | Abbe # | Focal Length |
|---|---|---|---|---|---|---|---|---|
| 16 | | −0.7610 | (ASP) | 0.020 | | | | |
| 17 | Lens 8 | 0.9513 | (ASP) | 0.500 | Plastic | 1.529 | 58.0 | 6.16 |
| 18 | | 1.0993 | (ASP) | 0.700 | | | | |
| 19 | Filter | Plano | | 0.120 | Glass | 1.517 | 64.2 | — |
| 20 | | Plano | | 0.188 | | | | |
| 21 | Image | Plano | | — | | | | |

Note:
Reference wavelength is 587.6 nm (d-line).
An effective radius of the stop S1 (Surface 14) is 1.134 mm.

TABLE 14

Aspheric Coefficients

| Surface # | 1 | 2 | 3 | 4 |
|---|---|---|---|---|
| k = | 0.00000E+00 | −4.06488E+00 | 0.00000E+00 | 0.00000E+00 |
| A4 = | 2.47475088E−01 | 1.96243902E−01 | −2.03369923E−01 | 2.16458793E−01 |
| A6 = | −2.68720694E−01 | −1.83208826E−01 | −2.07596853E−01 | −6.95651034E−01 |
| A8 = | 2.59180073E−01 | −1.60337283E−01 | −8.43315146E−01 | 6.04731802E+00 |
| A10 = | −1.93965890E−01 | 5.89260217E−01 | 6.73533706E−01 | −3.19785743E+01 |
| A12 = | 1.08039507E−01 | −7.68862156E−01 | 2.79723725E+00 | 1.30154741E+02 |
| A14 = | −4.30902218E−02 | 6.00639532E−01 | −4.92435933E+00 | −2.29032819E+02 |
| A16 = | 1.17788650E−02 | −2.97922530E−01 | 2.09331150E+00 | 1.49691204E+02 |
| A18 = | −2.07088702E−03 | 9.16245254E−02 | — | — |
| A20 = | 2.08788967E−04 | −1.59563261E−02 | — | — |
| A22 = | −9.08756435E−06 | 1.20723513E−03 | — | — |

| Surface # | 6 | 7 | 8 | 9 |
|---|---|---|---|---|
| k = | 3.37000E+01 | 7.64891E+01 | 9.00000E+01 | 7.54653E+00 |
| A4 = | −6.51115906E−02 | −1.38650617E−01 | −1.49206500E−01 | −5.61672351E−01 |
| A6 = | 2.35309799E−01 | 3.10884767E−01 | 1.95186560E−01 | −2.62038534E+00 |
| A8 = | −9.93103471E−01 | 1.71066665E+00 | 3.39660675E+00 | 1.44543751E+01 |
| A10 = | 3.70947985E+00 | −5.23229747E+00 | −1.56024992E+01 | −3.89675628E+01 |
| A12 = | −5.24988979E+00 | 1.24859085E+00 | 2.94120672E+01 | 5.13135881E+01 |
| A14 = | — | — | −2.56408817E+01 | −2.57402592E+01 |

| Surface # | 10 | 11 | 12 | 13 |
|---|---|---|---|---|
| k = | 0.00000E+00 | 0.00000E+00 | −2.33932E+01 | −6.07542E+01 |
| A4 = | 6.28339090E−02 | −2.75630375E−01 | 3.56630943E−02 | −2.90771806E−01 |
| A6 = | −4.55602317E+00 | −1.18639494E+00 | −1.16812458E+00 | 2.19836909E+00 |
| A8 = | 2.77075382E+01 | 1.19033448E+01 | 5.81086776E+00 | −9.44813169E+00 |
| A10 = | −8.58375905E+01 | −3.57086160E+01 | −1.99969330E+01 | 2.59329001E+01 |
| A12 = | 1.49121781E+02 | 5.42901473E+01 | 4.10447739E+01 | −5.01196935E+01 |
| A14 = | −1.46501234E+02 | −4.39002707E+01 | −5.17292850E+01 | 6.73002527E+01 |
| A16 = | 7.57141574E+01 | 1.74368423E+01 | 3.70107162E+01 | −6.10169263E+01 |
| A18 = | −1.59881845E+01 | −2.61077752E+00 | −1.12652836E+01 | 3.54344940E+01 |
| A20 = | — | — | — | −1.17816415E+01 |
| A22 = | — | — | — | 1.68734531E+00 |

| Surface # | 15 | 16 | 17 | 18 |
|---|---|---|---|---|
| k = | −1.00523E+00 | −2.25410E+00 | −4.98456E+00 | −3.22095E+00 |
| A4 = | 1.20978354E+00 | −4.71640240E−03 | −3.69248178E−02 | −1.40577757E−01 |
| A6 = | −8.86607077E−01 | 9.57183485E−01 | 2.97109788E−02 | 2.04129569E−01 |
| A8 = | 5.73639722E−01 | −1.65659274E+00 | −1.51641120E−01 | −2.02698348E−01 |
| A10 = | −3.01018031E−01 | 1.48083272E+00 | −4.19787276E−02 | 1.24566708E−01 |
| A12 = | −3.20415218E−01 | −7.59548199E−01 | 6.85098620E−02 | −4.89588121E−02 |
| A14 = | 8.38643495E−01 | 1.54888464E−01 | −4.99112720E−02 | 1.19782156E−02 |
| A16 = | −7.33136939E−01 | 5.93064491E−02 | 2.16617593E−02 | −1.53608394E−03 |
| A18 = | 3.28086560E−01 | −4.83684159E−02 | −5.98901492E−03 | −1.39962575E−05 |
| A20 = | −7.51856548E−02 | 1.24040025E−02 | 1.06471348E−03 | 3.98909019E−05 |
| A22 = | 6.97148131E−03 | −1.15602517E−03 | −1.17974632E−04 | −6.48917671E−06 |
| A24 = | — | — | 7.42186886E−06 | 4.70920171E−07 |
| A26 = | — | — | −2.02610714E−07 | −1.35322917E−08 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.77 | f/|R13| + f/|R14| | 6.03 |
| Fno | 2.27 | f/f1 | −0.63 |
| HFOV [deg.] | 59.7 | f/f2 | 0.34 |
| (V1 + V4 + V6 + V8)/ (V2 + V3 + V5 + V7) | 1.94 | f/f3 | 0.36 |
| min(Vi/Ni) | 8.76 | f/f3 + f/f4 + f/f5 | 0.50 |
| (CT1 + CT2 + CT3 + CT4 + CT5 + CT6)/(CT7 + CT8) | 2.39 | f/f4 | 0.12 |
| (CT2 + CT4)/CT3 | 3.00 | f/f5 | 0.03 |
| (T12 + T34)/T23 | 2.48 | f/f6 | 0.91 |
| (T45 + T56)/CT5 | 0.36 | f/f6 + f/f7 + f/f8 | 0.65 |
| (T67 + T78)/|T67 − T78| | 1.14 | f/f6 − f/f7 | 1.45 |
| T45/T56 | 2.04 | f/f7 | −0.55 |
| TL/EPD | 6.07 | f/f8 | 0.29 |
| TL/f | 2.68 | f1/CT1 | −9.42 |
| TL/ImgH | 1.62 | f1/f7 | 0.87 |
| R1/R16 | −5.11 | f12/f | −3.48 |
| R12/f | −1.56 | f7/CT7 | −11.01 |
| R3/f + R4/f | 1.26 | Y11/Y82 | 0.77 |
| R8/f | −2.57 | Yc11/Y11 | 0.27 |
| |f7/f8| | 0.53 | Yc82/Y82 | 0.69 |

8th Embodiment

Figure 15:
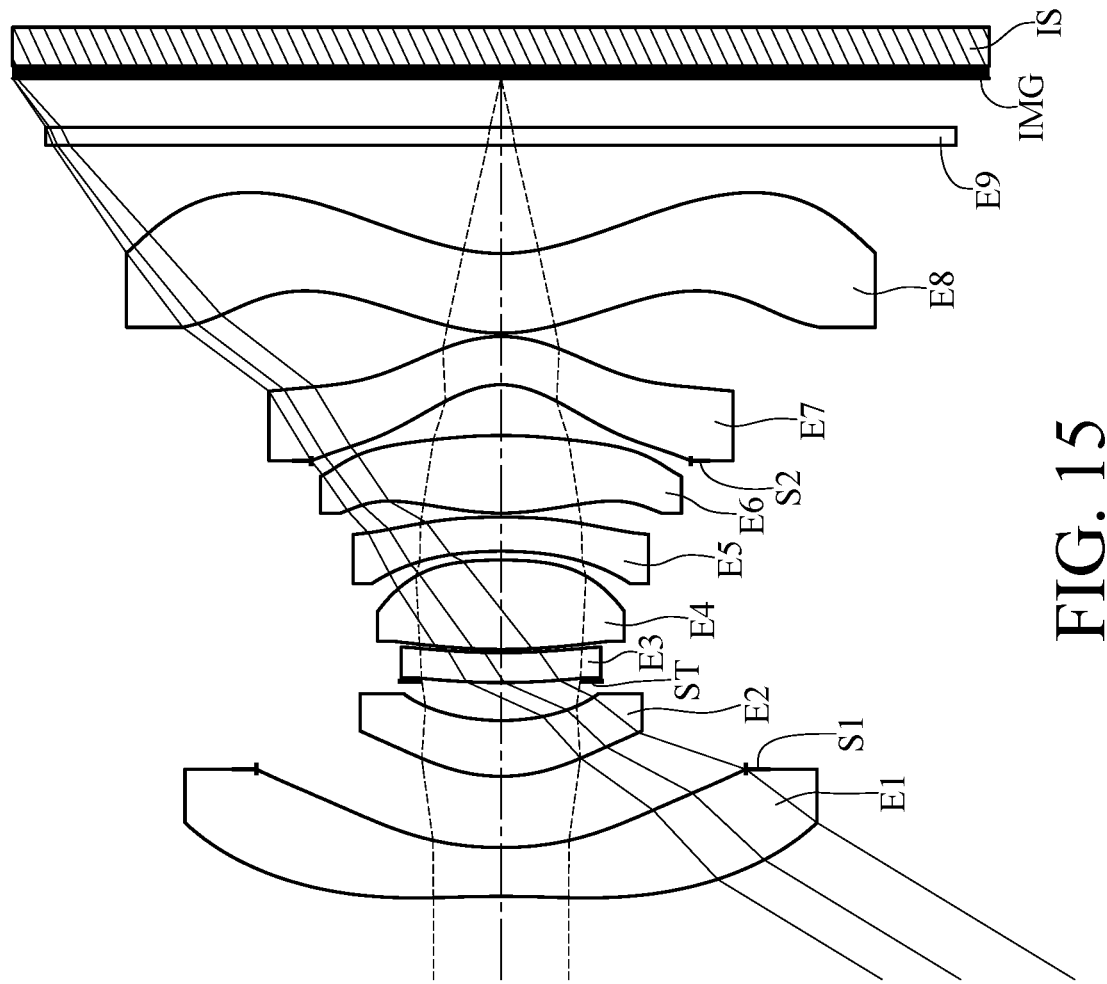
FIG. 15 is a schematic view of an image capturing unit according to the 8th embodiment of the present disclosure.
Figure 16:
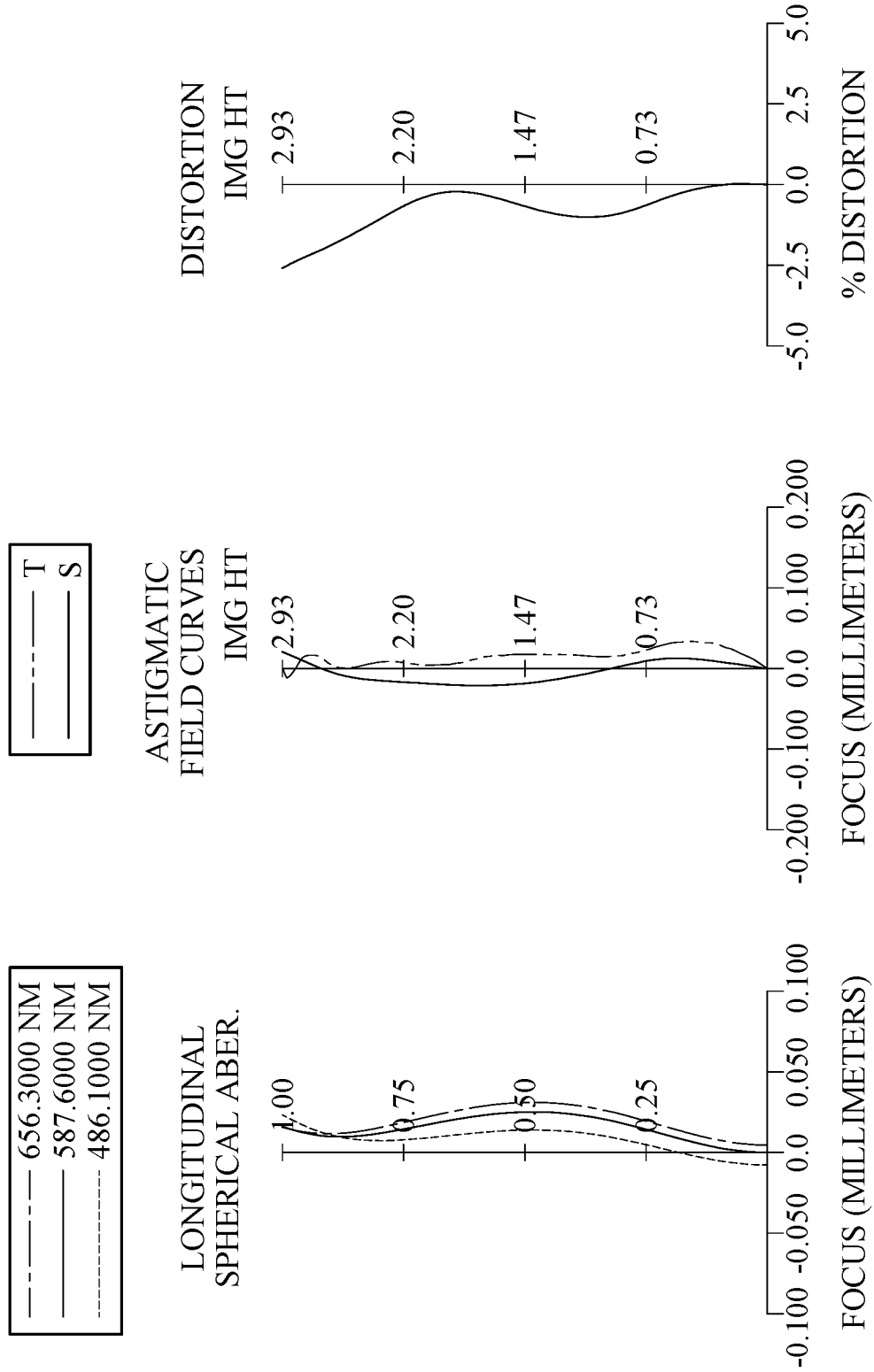
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes the optical imaging lens assembly (its reference numeral is omitted) of the present disclosure and an image sensor IS. The optical imaging lens assembly includes, in order from an object side to an image side along an optical axis, a first lens element E1, a stop S1, a second lens element E2, an aperture stop ST, a third lens element E3, a fourth lens element E4, a fifth lens element E5, a sixth lens element E6, a stop S2, a seventh lens element E7, an eighth lens element E8, a filter E9 and an image surface IMG. The optical imaging lens assembly includes eight lens elements (E1, E2, E3, E4, E5, E6, E7 and E8) with no additional lens element disposed between each of the adjacent eight lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has one inflection point in an off-axis region thereof. The image-side surface of the first lens element E1 has two inflection points in an off-axis region thereof. The object-side surface of the first lens element E1 has one critical point in the off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points in the off-axis region thereof.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point in an off-axis region thereof. The image-side surface of the third lens element E3 has one inflection point in an off-axis region thereof.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has one inflection point in an off-axis region thereof.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric. The image-side surface of the fifth lens element E5 has two inflection points in an off-axis region thereof.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point in an off-axis region thereof. The image-side surface of the sixth lens element E6 has one inflection point in an off-axis region thereof. The object-side surface of the sixth lens element E6 has one critical point in the off-axis region thereof.

The seventh lens element E7 with negative refractive power has an object-side surface being concave in a paraxial region thereof and an image-side surface being convex in a paraxial region thereof. The seventh lens element E7 is made of plastic material and has the object-side surface and the image-side surface being both aspheric. The object-side surface of the seventh lens element E7 has three inflection points in an off-axis region thereof. The image-side surface of the seventh lens element E7 has three inflection points in an off-axis region thereof.

The eighth lens element E8 with positive refractive power has an object-side surface being convex in a paraxial region thereof and an image-side surface being concave in a paraxial region thereof. The eighth lens element E8 is made of plastic material and has the object-side surface and the image-side surface being both aspheric. The object-side surface of the eighth lens element E8 has two inflection points in an off-axis region thereof. The image-side surface of the eighth lens element E8 has two inflection points in an off-axis region thereof. The object-side surface of the eighth lens element E8 has one critical point in the off-axis region thereof. The image-side surface of the eighth lens element E8 has one critical point in the off-axis region thereof.

The filter E9 is made of glass material and located between the eighth lens element E8 and the image surface IMG, and will not affect the focal length of the optical imaging lens assembly. The image sensor IS is disposed on or near the image surface IMG of the optical imaging lens assembly.

The detailed optical data of the 8th embodiment are shown in Table 15 and the aspheric surface data are shown in Table 16 below.

TABLE 15

8th Embodiment
f = 1.83 mm, Fno = 2.25, HFOV = 58.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −5.9099 | (ASP) | 0.293 | Plastic | 1.545 | 56.1 | −2.78 |
| 2 | | 2.0767 | (ASP) | 0.471 | | | | |
| 3 | Stop | Plano | | −0.043 | | | | |
| 4 | Lens 2 | 1.0000 | (ASP) | 0.336 | Plastic | 1.587 | 28.3 | 4.93 |
| 5 | | 1.3383 | (ASP) | 0.236 | | | | |
| 6 | Ape. Stop | Plano | | −0.008 | | | | |
| 7 | Lens 3 | 4.1473 | (ASP) | 0.180 | Plastic | 1.686 | 18.4 | −203.98 |
| 8 | | 3.9568 | (ASP) | 0.020 | | | | |
| 9 | Lens 4 | 3.4718 | (ASP) | 0.537 | Plastic | 1.544 | 56.0 | 2.84 |
| 10 | | −2.6262 | (ASP) | 0.053 | | | | |
| 11 | Lens 5 | −2.2396 | (ASP) | 0.205 | Plastic | 1.669 | 19.5 | −6.77 |
| 12 | | −4.5916 | (ASP) | 0.024 | | | | |
| 13 | Lens 6 | 1.3770 | (ASP) | 0.467 | Plastic | 1.544 | 56.0 | 1.77 |
| 14 | | −2.8257 | (ASP) | −0.153 | | | | |
| 15 | Stop | Plano | | 0.458 | | | | |
| 16 | Lens 7 | −0.4912 | (ASP) | 0.290 | Plastic | 1.686 | 18.4 | −3.58 |
| 17 | | −0.7616 | (ASP) | 0.020 | | | | |
| 18 | Lens 8 | 1.0070 | (ASP) | 0.479 | Plastic | 1.534 | 55.9 | 8.38 |
| 19 | | 1.0843 | (ASP) | 0.650 | | | | |
| 20 | Filter | Plano | | 0.110 | Glass | 1.517 | 64.2 | — |
| 21 | | Plano | | 0.293 | | | | |
| 22 | Image | Plano | | — | | | | |

Note:
Reference wavelength is 587.6 nm (d-line).
An effective radius of the stop S1 (Surface 3) is 1.470 mm.
An effective radius of the stop S2 (Surface 15) is 1.140 mm.

TABLE 16

Aspheric Coefficients

| Surface # | 1 | 2 | 4 | 5 |
|---|---|---|---|---|
| k = | 0.00000E+00 | −4.03746E+00 | 0.00000E+00 | 0.00000E+00 |
| A4 = | 2.30628830E−01 | 1.92443890E−01 | −1.87234896E−01 | 1.70919161E−01 |
| A6 = | −2.35487020E−01 | −1.99742960E−01 | −4.77280992E−02 | −3.30661451E−02 |
| A8 = | 2.12006406E−01 | 3.45398360E−02 | −1.15088550E+00 | −2.20368285E+00 |
| A10 = | −1.47685630E−01 | 3.68736995E−02 | 1.34146237E+00 | 1.97592749E+01 |
| A12 = | 7.62155846E−02 | 3.40419491E−02 | 7.33955494E−01 | −7.34146626E+01 |
| A14 = | −2.79982449E−02 | −9.79596435E−02 | −1.66439437E+00 | 1.64538249E+02 |
| A16 = | 7.01006710E−03 | 8.03930928E−02 | 4.50984237E−01 | −1.41222035E+02 |
| A18 = | −1.12395533E−03 | −3.32863837E−02 | — | — |
| A20 = | 1.03216727E−04 | 7.06305483E−03 | — | — |
| A22 = | −4.10696995E−06 | −6.09299369E−04 | — | — |

| Surface # | 7 | 8 | 9 | 10 |
|---|---|---|---|---|
| k = | 8.90278E+00 | −3.70636E+01 | −3.06994E+01 | 2.37246E+00 |
| A4 = | −5.34871522E−02 | −6.58606703E−02 | −6.18117849E−02 | −4.68118815E−01 |
| A6 = | 2.13991145E−01 | 4.34403707E−01 | 4.83415307E−01 | −2.20334449E+00 |
| A8 = | −1.76635459E+00 | −1.50312624E+00 | −1.47048704E+00 | 9.18446877E+00 |
| A10 = | 5.16015456E+00 | 2.33694840E+00 | 2.09932008E+00 | −1.84938230E+01 |
| A12 = | −8.56463887E+00 | −2.42548927E+00 | −1.44311639E+00 | 1.87144050E+01 |
| A14 = | — | — | — | −7.70293067E+00 |

| Surface # | 11 | 12 | 13 | 14 |
|---|---|---|---|---|
| k = | 0.00000E+00 | 0.00000E+00 | −2.21671E+01 | −6.61119E+01 |
| A4 = | 1.72071449E−01 | −4.97163198E−01 | −2.08321675E−02 | −1.98681138E−01 |
| A6 = | −4.02438629E+00 | 1.33297391E+00 | −1.91499071E−01 | 1.27111177E+00 |
| A8 = | 2.07719893E+01 | −6.31390376E−01 | 5.61523689E+00 | −5.43314132E+00 |
| A10 = | −5.85970970E+01 | −2.36223644E+00 | −3.25518772E+00 | 1.54349560E+01 |
| A12 = | 9.68658781E+01 | 2.94641561E+00 | 7.85115612E+00 | −3.15991881E+01 |
| A14 = | −9.23050305E+01 | 1.59438124E+00 | −1.07949407E+01 | 4.44383441E+01 |
| A16 = | 4.58420288E+01 | −3.94311402E+00 | 8.33510971E+00 | −4.12286934E+01 |

TABLE 16-continued

| Aspheric Coefficients | | | | |
|---|---|---|---|---|
| A18 = | −8.99682064E+00 | 1.53119703E+00 | −2.66507810E+00 | 2.38881173E+01 |
| A20 = | — | — | — | −7.73984258E+00 |
| A22 = | — | — | — | 1.05815836E+00 |

| Surface # | 16 | 17 | 18 | 19 |
|---|---|---|---|---|
| k = | −9.92399E−01 | −2.16429E+00 | −5.99446E+00 | −3.57111E+00 |
| A4 = | 1.30857787E+00 | 8.34953357E−03 | −9.01267937E−02 | −1.82612047E−01 |
| A6 = | −1.86820692E+00 | 9.60609298E−01 | 2.12685185E−01 | 3.58924401E−01 |
| A8 = | 4.10919627E+00 | −2.01989866E+00 | −4.27120508E−01 | −4.99787039E−01 |
| A10 = | −7.85866910E+00 | 2.55174896E+00 | 4.72197476E−01 | 4.48952091E−01 |
| A12 = | 1.02625897E+01 | −2.21550393E+00 | −3.44784622E−01 | −2.76935561E−01 |
| A14 = | −8.96432021E+00 | 1.29708869E+00 | 1.75935910E−01 | 1.20939690E−01 |
| A16 = | 5.09753100E+00 | −4.93747362E−01 | −6.40170543E−02 | −3.77537463E−02 |
| A18 = | −1.78043343E+00 | 1.16208780E−01 | 1.66866414E−02 | 8.36390539E−03 |
| A20 = | 3.42542704E−01 | −1.53064755E−02 | −3.05982858E−03 | −1.28205788E−03 |
| A22 = | −2.75879320E−02 | 8.61421133E−04 | 3.74317822E−04 | 1.29028293E−04 |
| A24 = | — | — | −2.72482171E−05 | −7.65340014E−06 |
| A26 = | — | — | 8.84844293E−07 | 2.02320370E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 1.83 | f/|R13| + f/|R14| | 6.12 |
| Fno | 2.25 | f/f1 | −0.66 |
| HFOV [deg.] | 58.6 | f/f2 | 0.37 |
| (V1 + V4 + V6 + V8)/(V2 + V3 + V5 + V7) | 2.65 | f/f3 | −0.01 |
| min(Vi/Ni) | 10.90 | f/f3 + f/f4 + f/f5 | 0.37 |
| (CT1 + CT2 + CT3 + CT4 + CT5 + CT6)/(CT7 + CT8) | 2.62 | f/f4 | 0.64 |
| (CT2 + CT4)/CT3 | 4.85 | f/f5 | −0.27 |
| (T12 + T34)/T23 | 1.96 | f/f6 | 1.03 |
| (T45 + T56)/CT5 | 0.38 | f/f6 + f/f7 + f/f8 | 0.74 |
| (T67 + T78)/|T67 − T78| | 1.14 | f/f6 − f/f7 | 1.54 |
| T45/T56 | 2.21 | f/f7 | −0.51 |
| TL/EPD | 6.05 | f/f8 | 0.22 |
| TL/f | 2.69 | f1/CT1 | −9.50 |
| TL/ImgH | 1.68 | f1/f7 | 0.78 |
| R1/R16 | −5.45 | f12/f | −3.53 |
| R12/f | −1.55 | f7/CT7 | −12.34 |
| R3/f + R4/f | 1.28 | Y11/Y82 | 0.84 |
| R8/f | −1.44 | Yc11/Y11 | 0.27 |
| |f7/f8| | 0.43 | Yc82/Y82 | 0.67 |

9th Embodiment

Figure 17:
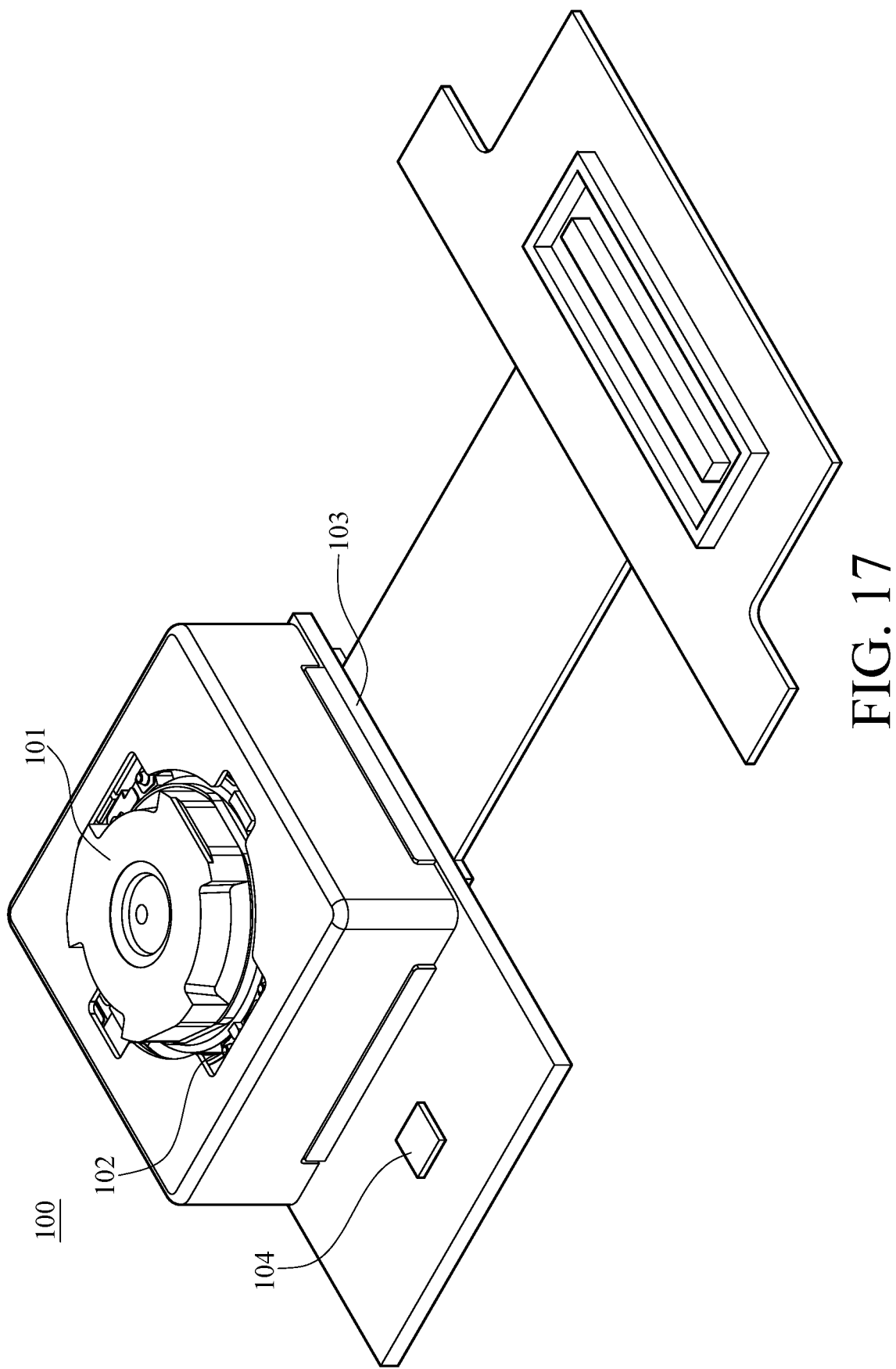
FIG. 17 is a perspective view of an image capturing unit according to the 9th embodiment of the present disclosure.

FIG. 17 is a perspective view of an image capturing unit according to the 9th embodiment of the present disclosure. In this embodiment, an image capturing unit 100 is a camera module including a lens unit 101, a driving device 102, an image sensor 103 and an image stabilizer 104. The lens unit 101 includes the optical imaging lens assembly disclosed in the 1st embodiment, a barrel and a holder member (their reference numerals are omitted) for holding the optical imaging lens assembly. However, the lens unit 101 may alternatively be provided with the optical imaging lens assembly disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the optical imaging lens assembly to provide higher image quality.

The image stabilizer 104, such as an accelerometer, a gyro sensor and a Hall Effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

10th Embodiment

Figure 18:
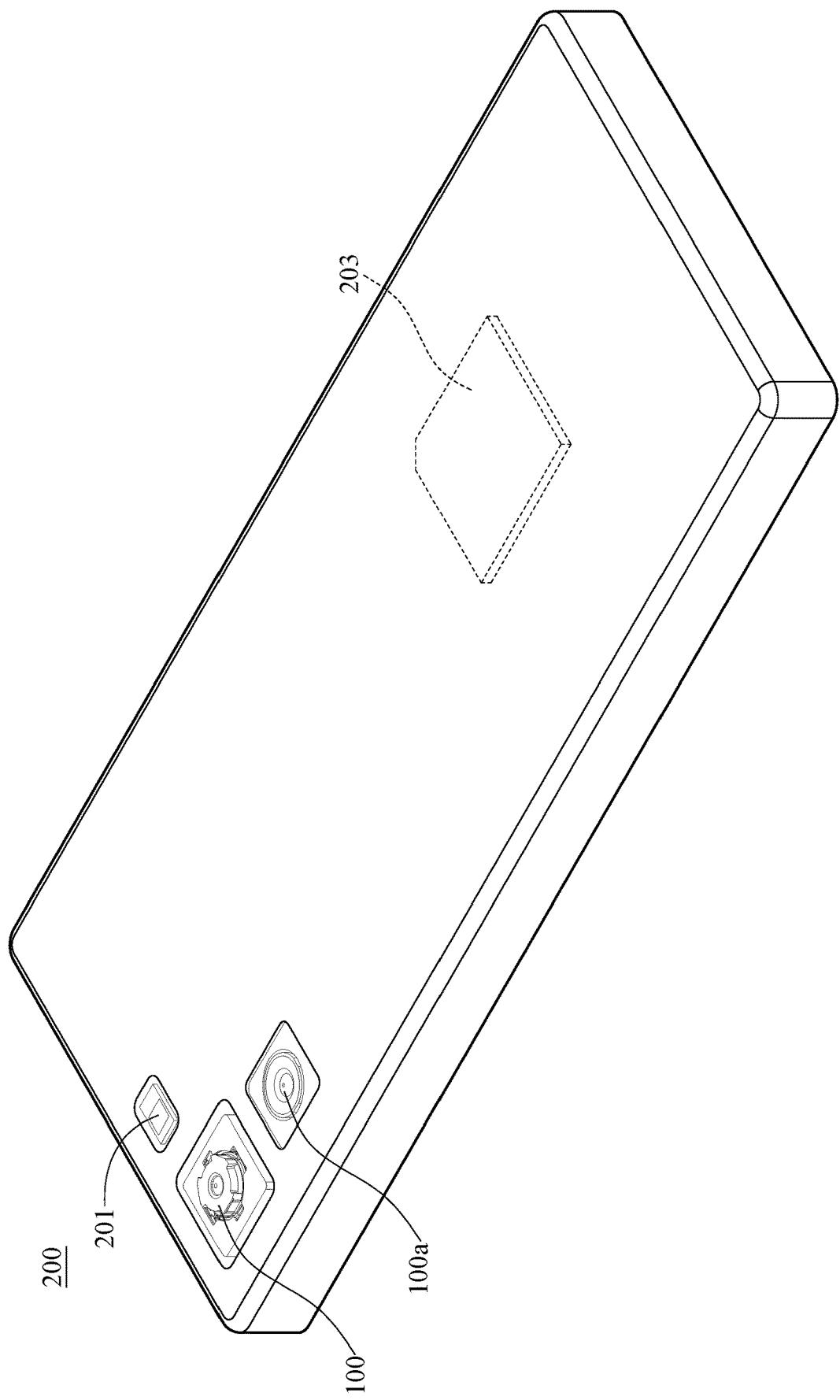
FIG. 18 is one perspective view of an electronic device according to the 10th embodiment of the present disclosure.
Figure 19:
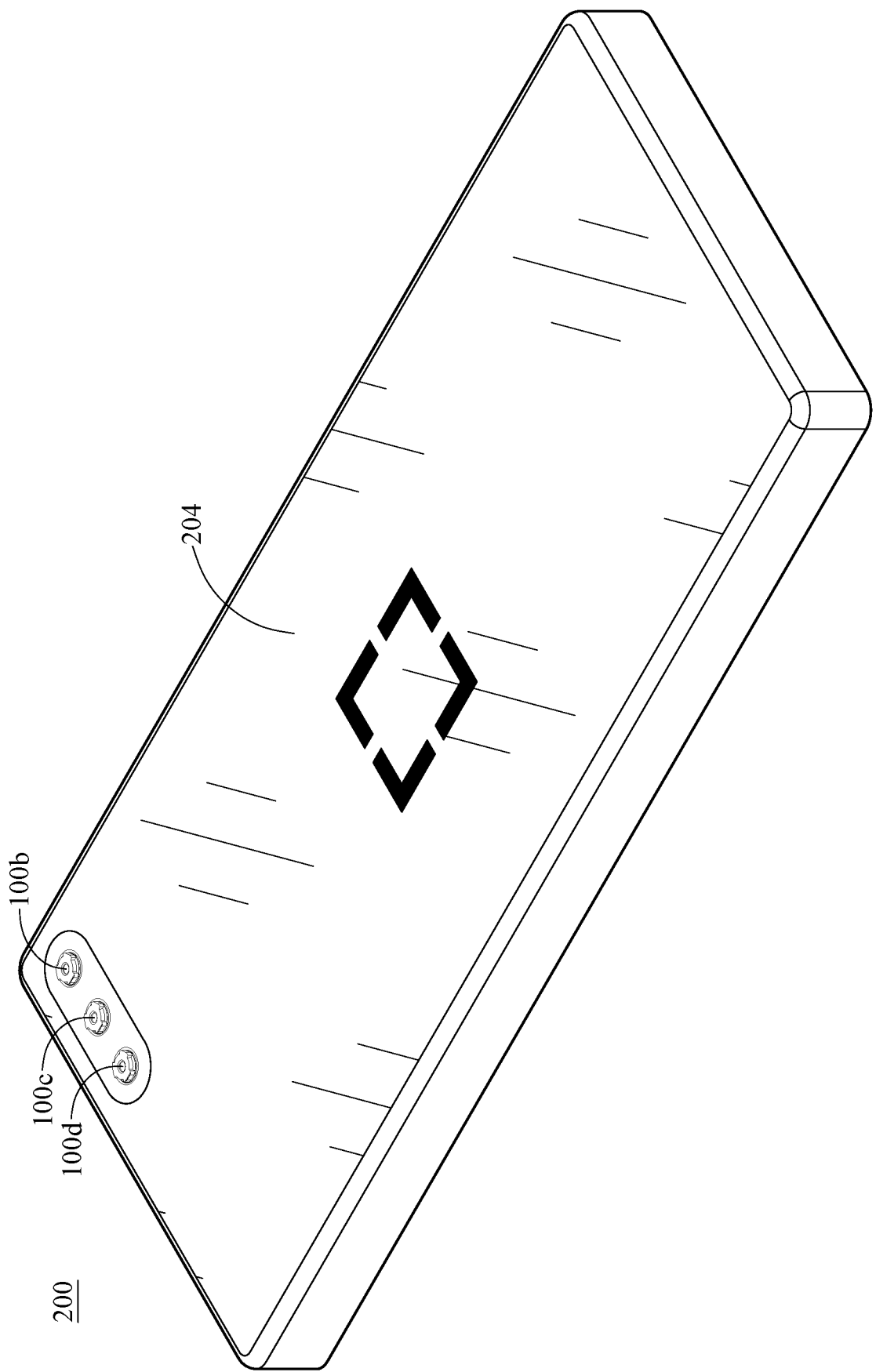
FIG. 19 is another perspective view of the electronic device in FIG. 18.
Figure 20:
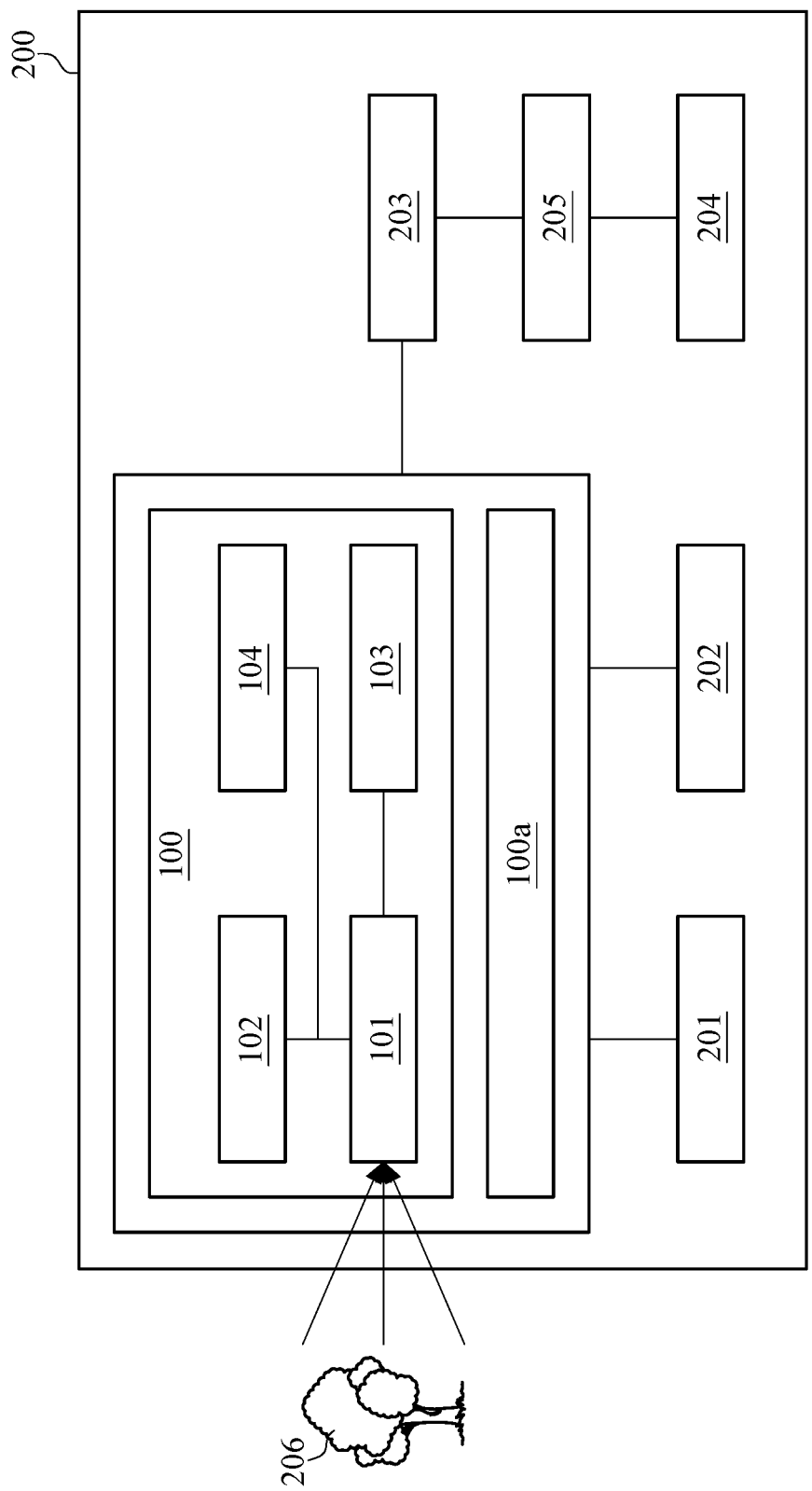
FIG. 20 is a block diagram of the electronic device in FIG. 18.

FIG. 18 is one perspective view of an electronic device according to the 10th embodiment of the present disclosure. FIG. 19 is another perspective view of the electronic device in FIG. 18. FIG. 20 is a block diagram of the electronic device in FIG. 18.

In this embodiment, an electronic device 200 is a smartphone including the image capturing unit 100 disclosed in the 9th embodiment, an image capturing unit 100a, an image capturing unit 100b, an image capturing unit 100c, an image capturing unit 100d, a flash module 201, a focus assist module 202, an image signal processor 203, a display module 204 and an image software processor 205. The image capturing unit 100 and the image capturing unit 100a are disposed on the same side of the electronic device 200 and each of the image capturing units 100 and 100a has a single focal point. The focus assist module 202 can be a laser rangefinder or a ToF (time of flight) module, but the present disclosure is not limited thereto. The image capturing unit 100b, the image capturing unit 100c, the image capturing unit 100d and the display module 204 are disposed on the opposite side of the electronic device 200, and the display module 204 can be a user interface, such that the image capturing units 100b, 100c, 100d can be front-facing cameras of the electronic device 200f or taking selfies, but the present disclosure is not limited thereto. Furthermore, each of the image capturing units 100a, 100b, 100c and 100d can include the optical imaging lens assembly of the present disclosure and can have a configuration similar to that of the image capturing unit 100. In detail, each of the image capturing units 100a, 100b, 100c and 100d can include a lens unit, a driving device, an image sensor and an image stabilizer, and each of the lens unit can include an optical lens assembly such as the optical imaging lens assembly of the present disclosure, a barrel and a holder member for holding the optical lens assembly.

The image capturing unit 100 is a wide-angle image capturing unit, the image capturing unit 100a is an ultra-wide-angle image capturing unit, the image capturing unit 100b is a wide-angle image capturing unit, the image capturing unit 100c is an ultra-wide-angle image capturing unit, and the image capturing unit 100d is a ToF image capturing unit. In this embodiment, the image capturing units 100, 100a, 100b and 100c have different fields of view, such that the electronic device 200 can have various magnification ratios so as to meet the requirement of optical zoom functionality. In addition, the image capturing unit 100d can determine depth information of the imaged object. In this embodiment, the electronic device 200 includes multiple image capturing units 100, 100a, 100b, 100 c and 100d, but the present disclosure is not limited to the number and arrangement of image capturing units.

When a user captures images of an object 206, the light rays converge in the image capturing unit 100 or the image capturing unit 100a to generate images, and the flash module 201 is activated for light supplement. The focus assist module 202 detects the object distance of the imaged object 206 to achieve fast auto focusing. The image signal processor 203 is configured to optimize the captured image to improve image quality. The light beam emitted from the focus assist module 202 can be either conventional infrared or laser. In addition, the light rays may converge in the image capturing unit 100b, 100c or 100d to generate images. The display module 204 can include a touch screen, and the user is able to interact with the display module 204 and the image software processor 205 having multiple functions to capture images and complete image processing. Alternatively, the user may capture images via a physical button. The image processed by the image software processor 205 can be displayed on the display module 204.

11th Embodiment

Figure 21:
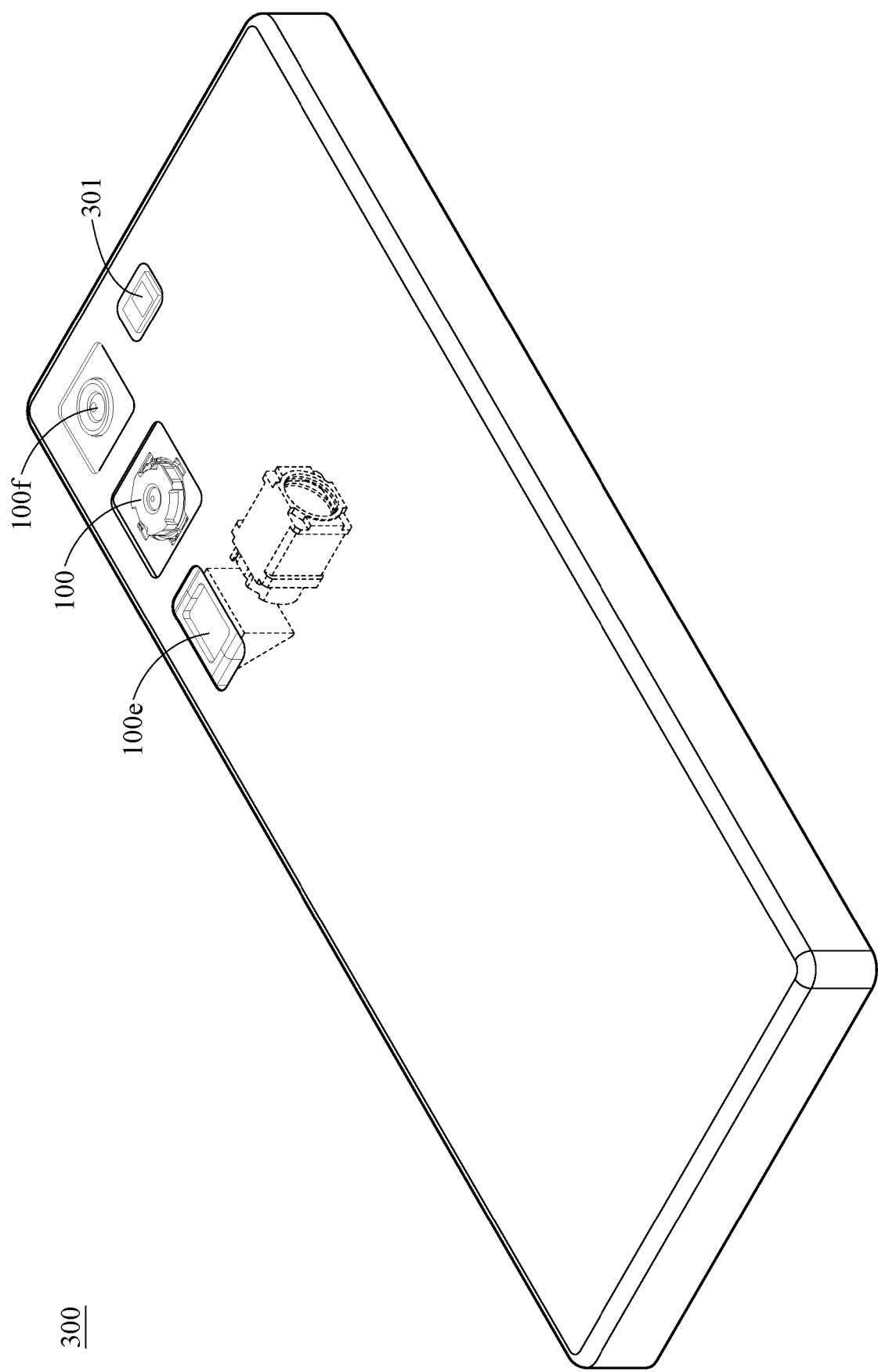
FIG. 21 is one perspective view of an electronic device according to the 11th embodiment of the present disclosure.

FIG. 21 is one perspective view of an electronic device according to the 11th embodiment of the present disclosure.

In this embodiment, an electronic device 300 is a smartphone including the image capturing unit 100 disclosed in the 9th embodiment, an image capturing unit 100e, an image capturing unit 100f, a flash module 301, a focus assist module, an image signal processor, a display module and an image software processor (not shown). The image capturing unit 100, the image capturing unit 100e and the image capturing unit 100f are disposed on the same side of the electronic device 300, while the display module is disposed on the opposite side of the electronic device 300. Furthermore, each of the image capturing units 100e and 100f can include the optical imaging lens assembly of the present disclosure and can have a configuration similar to that of the image capturing unit 100, and the details in this regard will not be provided again.

The image capturing unit 100 is a wide-angle image capturing unit, the image capturing unit 100e is a telephoto image capturing unit, and the image capturing unit 100f is an ultra-wide-angle image capturing unit. In this embodiment, the image capturing units 100, 100e and 100f have different fields of view, such that the electronic device 300 can have various magnification ratios so as to meet the requirement of optical zoom functionality. Moreover, the image capturing unit 100e can be a telephoto image capturing unit having a light-folding element configuration, such that the total track length of the image capturing unit 100e is not limited by the thickness of the electronic device 300. Moreover, the light-folding element configuration of the image capturing unit 100e can be similar to, for example, one of the structures shown in FIG. 24 to FIG. 26, which can be referred to foregoing descriptions corresponding to FIG. 24 to FIG. 26, and the details in this regard will not be provided again. In this embodiment, the electronic device 30 includes multiple image capturing units 100, 100e and 100f, but the present disclosure is not limited to the number and arrangement of image capturing units. When a user captures images of an object, light rays converge in the image capturing unit 100, 100e or 100f to generate images, and the flash module 301 is activated for light supplement. Further, the subsequent processes are performed in a manner similar to the above-mentioned embodiment, so the details in this regard will not be provided again.

12th Embodiment

Figure 22:
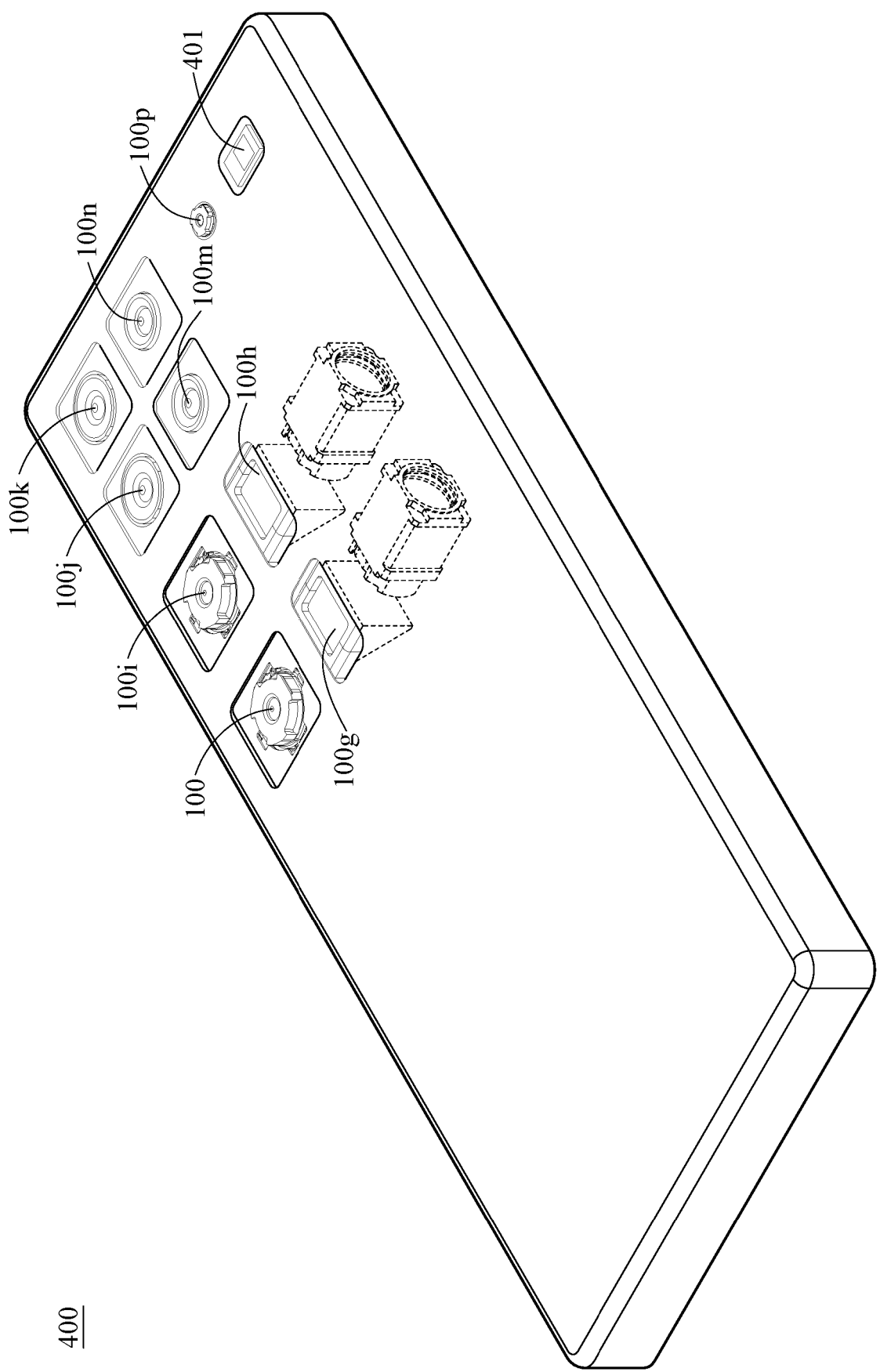
FIG. 22 is one perspective view of an electronic device according to the 12th embodiment of the present disclosure.

FIG. 22 is one perspective view of an electronic device according to the 12th embodiment of the present disclosure.

In this embodiment, an electronic device 400 is a smartphone including the image capturing unit 100 disclosed in the 9th embodiment, an image capturing unit 100g, an image capturing unit 100h, an image capturing unit 100i, an image capturing unit 100j, an image capturing unit 100k, an image capturing unit 100m, an image capturing unit 100n, an image capturing unit 100p, a flash module 401, a focus assist module, an image signal processor, a display module and an image software processor (not shown). The image capturing units 100, 100g, 100h, 100i, 100j, 100k, 100m, 100n and 100p are disposed on the same side of the electronic device 400, while the display module is disposed on the opposite side of the electronic device 400. Furthermore, each of the image capturing units 100g, 100h, 100i, 100j, 100k, 100m, 100n and 100p can include the optical imaging lens assembly of the present disclosure and can have a configuration similar to that of the image capturing unit 100, and the details in this regard will not be provided again.

The image capturing unit 100 is a wide-angle image capturing unit, the image capturing unit 100g is a telephoto image capturing unit, the image capturing unit 100h is a telephoto image capturing unit, the image capturing unit 100i is a wide-angle image capturing unit, the image capturing unit 100j is an ultra-wide-angle image capturing unit, the image capturing unit 100k is an ultra-wide-angle image capturing unit, the image capturing unit 100m is a telephoto image capturing unit, the image capturing unit 100n is a telephoto image capturing unit, and the image capturing unit 100p is a ToF image capturing unit. In this embodiment, the image capturing units 100, 100g, 100h, 100i, 100j, 100k, 100m and 100n have different fields of view, such that the electronic device 400 can have various magnification ratios so as to meet the requirement of optical zoom functionality. Moreover, each of the image capturing units 100g and 100h can be a telephoto image capturing unit having a light-folding element configuration. Moreover, the light-folding element configuration of each of the image capturing unit 100g and 100h can be similar to, for example, one of the structures shown in FIG. 24 to FIG. 26, which can be referred to foregoing descriptions corresponding to FIG. 24 to FIG. 26, and the details in this regard will not be provided again. In addition, the image capturing unit 100p can determine depth information of the imaged object. In this embodiment, the electronic device 400 includes multiple image capturing units 100, 100g, 100h, 100i, 100j, 100k, 100m, 100n and 100p, but the present disclosure is not limited to the number and arrangement of image capturing units. When a user captures images of an object, the light rays converge in the image capturing unit 100, 100g, 100h, 100i, 100j, 100k, 100m, 100n or 100p to generate images, and the flash module 401 is activated for light supplement. Further, the subsequent processes are performed in a manner similar to the abovementioned embodiments, and the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the optical imaging lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising eight lens elements, the eight lens elements being, in order from an object side to an image side along an optical path, a first lens element, a second lens element, a third lens element, a fourth lens element, a fifth lens element, a sixth lens element, a seventh lens element and an eighth lens element, and each of the eight lens elements having an object-side surface facing toward the object side and an image-side surface facing toward the image side;

wherein the object-side surface of the first lens element is concave in a paraxial region thereof, the object-side surface of the first lens element has at least one inflection point in an off-axis region thereof, the object-side surface of the second lens element is convex in a paraxial region thereof, the image-side surface of the sixth lens element is convex in a paraxial region thereof, the seventh lens element has negative refractive power, the image-side surface of the eighth lens element is concave in a paraxial region thereof, the image-side surface of the eighth lens element has at least one inflection point in an off-axis region thereof, and at least one of the object-side surface and the image-side surface of at least one of the second lens element, the third lens element, the fourth lens element, the fifth lens element, the sixth lens element and the seventh lens element is aspheric;

wherein an axial distance between the sixth lens element and the seventh lens element is T67, an axial distance between the seventh lens element and the eighth lens element is T78, an f-number of the optical imaging lens assembly is Fno, a curvature radius of the image-side surface of the sixth lens element is R12, a focal length of the optical imaging lens assembly is f, and the following conditions are satisfied:

$1.0<(T67+T78)/|T67-T78|<6.0$;

$1.0<Fno<3.0$; and $-1.8<R12/f<-0.10$.

2. The optical imaging lens assembly of claim 1, wherein the axial distance between the sixth lens element and the seventh lens element is T67, the axial distance between the seventh lens element and the eighth lens element is T78, and the following condition is satisfied:

$1.0<(T67+T78)/|T67-T78|<3.0$.

3. The optical imaging lens assembly of claim 2, wherein the axial distance between the sixth lens element and the seventh lens element is T67, the axial distance between the seventh lens element and the eighth lens element is T78, and the following condition is satisfied:

$1.0<(T67+T78)/|T67-T78|<1.5$.

4. The optical imaging lens assembly of claim 1, wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, and the following condition is satisfied:

$1.2<(V1+V4+V6+V8)/(V2+V3+V5+V7)<3.2$.

5. The optical imaging lens assembly of claim 1, wherein an axial distance between the fourth lens element and the fifth lens element is T45, an axial distance between the fifth lens element and the sixth lens element is T56, an axial distance between the object-side surface of the first lens element and an image surface is TL, the focal length of the optical imaging lens assembly is f, an entrance pupil diameter of the optical imaging lens assembly is EPD, and the following conditions are satisfied:

$1.0<T45/T56<3.0$;

$1.2<TL/f<4.5$; and $3.0<TL/EPD<6.5$.

6. The optical imaging lens assembly of claim 1, wherein at least one of the object-side surface and the image-side surface of at least one of the second lens element, the third lens element, the fourth lens element, the fifth lens element, the sixth lens element and the seventh lens element has at least one inflection point in an off-axis region thereof;

wherein the focal length of the optical imaging lens assembly is f, a focal length of the sixth lens element is f6, a focal length of the seventh lens element is f7, and the following condition is satisfied:

$1.4 < f/f6 - f/f7 < 4.0$.

7. The optical imaging lens assembly of claim 1, wherein the first lens element has negative refractive power;

wherein a focal length of the first lens element is f1, a focal length of the seventh lens element is f7, and the following condition is satisfied:

$0.78 \leq f1/f7 < 5.00$.

8. The optical imaging lens assembly of claim 1, wherein the first lens element has negative refractive power, and the sixth lens element has positive refractive power;

wherein the focal length of the optical imaging lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the eighth lens element is f8, and the following conditions are satisfied:

$-0.90 < f/f1 < -0.10$;

$-0.50 < f/f2 < 0.70$;

$-1.0 < f/f3 < 1.0$;

$-1.0 < f/f4 < 1.2$;

$-0.80 < f/f5 < 0.80$;

$0.70 < f/f6 < 2.4$;

$-1.60 < f/f7 < -0.40$; and $-0.50 < f/f8 < 0.50$.

9. The optical imaging lens assembly of claim 1, wherein a curvature radius of the object-side surface of the first lens element is R1, a curvature radius of the image-side surface of the eighth lens element is R16, and the following condition is satisfied:

$-6.0 < R1/R16 < 0$;

wherein a vertical distance between a critical point on the object-side surface of the first lens element and an optical axis is Yc11, a maximum effective radius of the object-side surface of the first lens element is Y11, and at least one convex critical point on the object-side surface of the first lens element in the off-axis region satisfies the following condition:

$0.10 < Yc11/Y11 < 0.50$.

10. The optical imaging lens assembly of claim 1, wherein the sixth lens element has positive refractive power;

wherein the curvature radius of the image-side surface of the sixth lens element is R12, the focal length of the optical imaging lens assembly is f, and the following condition is satisfied:

$-0.55 < R12/f < -0.15$.

11. An image capturing unit, comprising:
the optical imaging lens assembly of claim 1; and
an image sensor disposed on an image surface of the optical imaging lens assembly.

12. An electronic device, comprising:
the image capturing unit of claim 11.

* * * * *